Jan. 24, 1956

J. H. GRUVER 2,731,910

MACHINE FOR FEEDING AND TREATING LITHOGRAPHIC
ADDRESS PRINTING PLATES

Filed Aug. 28, 1952

INVENTOR.
John H. Gruver
BY
Wallace and Cannon
ATTORNEYS

Fig. 2

Jan. 24, 1956
J. H. GRUVER
2,731,910
MACHINE FOR FEEDING AND TREATING LITHOGRAPHIC
ADDRESS PRINTING PLATES
Filed Aug. 28, 1952
25 Sheets-Sheet 3
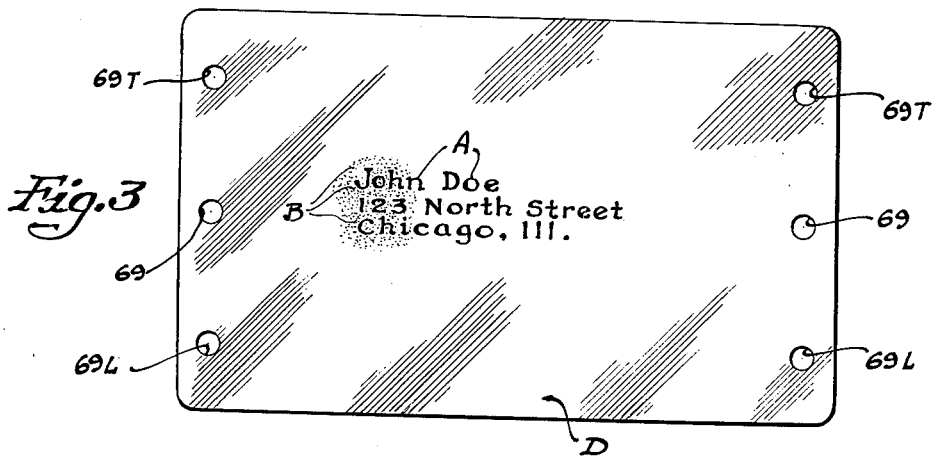
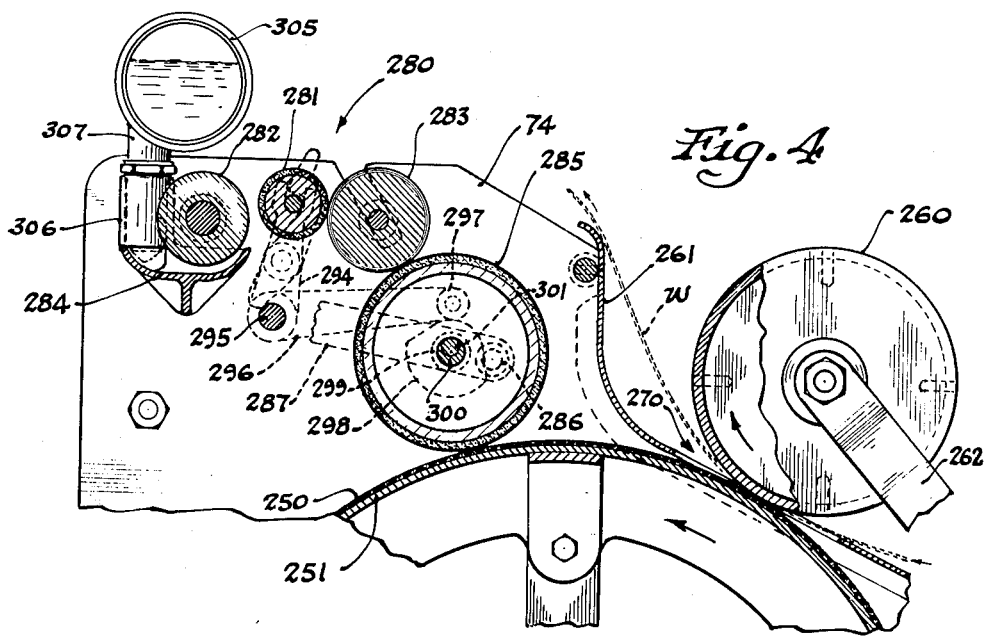
INVENTOR
John H. Gruver
BY Wallace and Cannon
ATTORNEYS

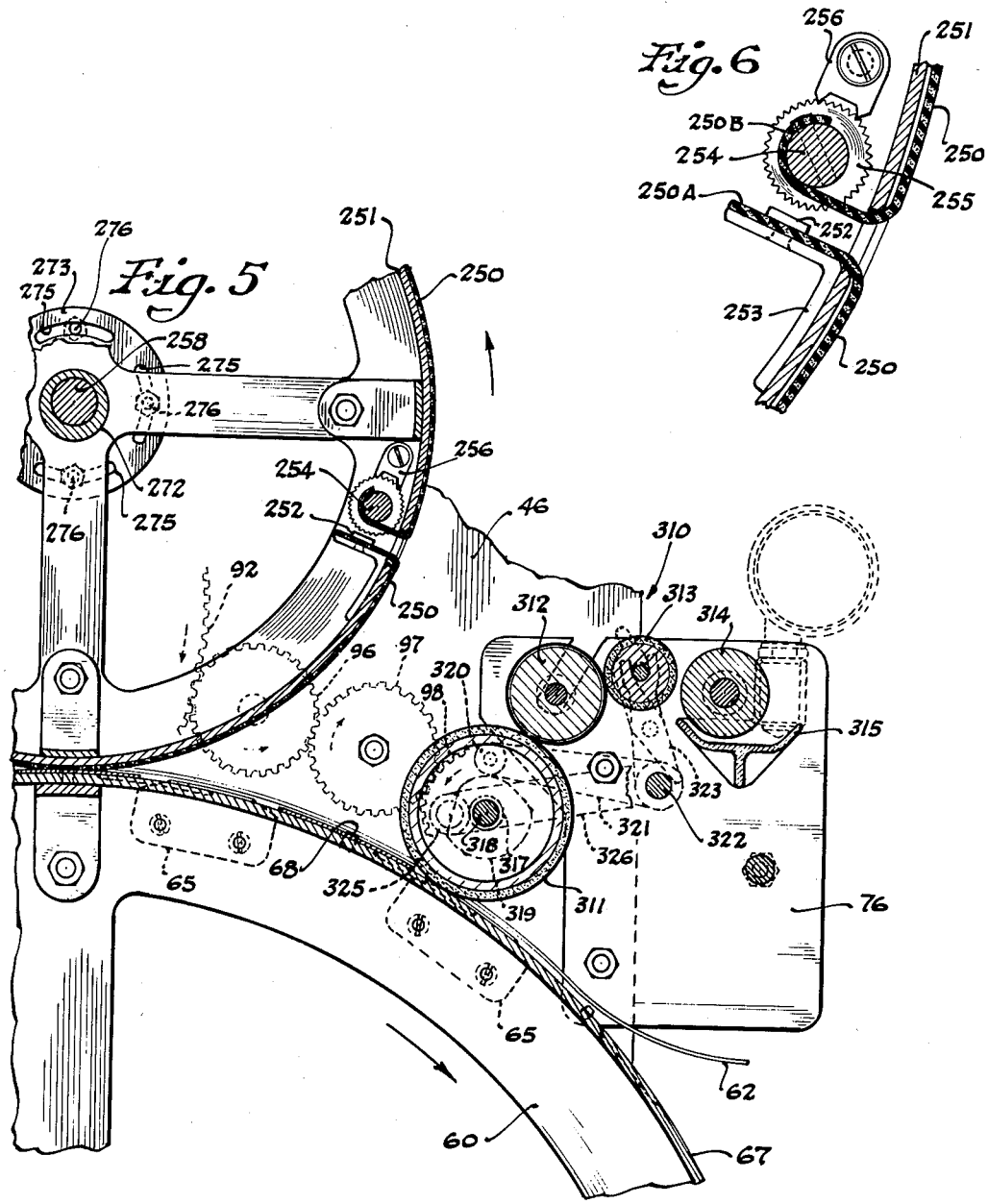

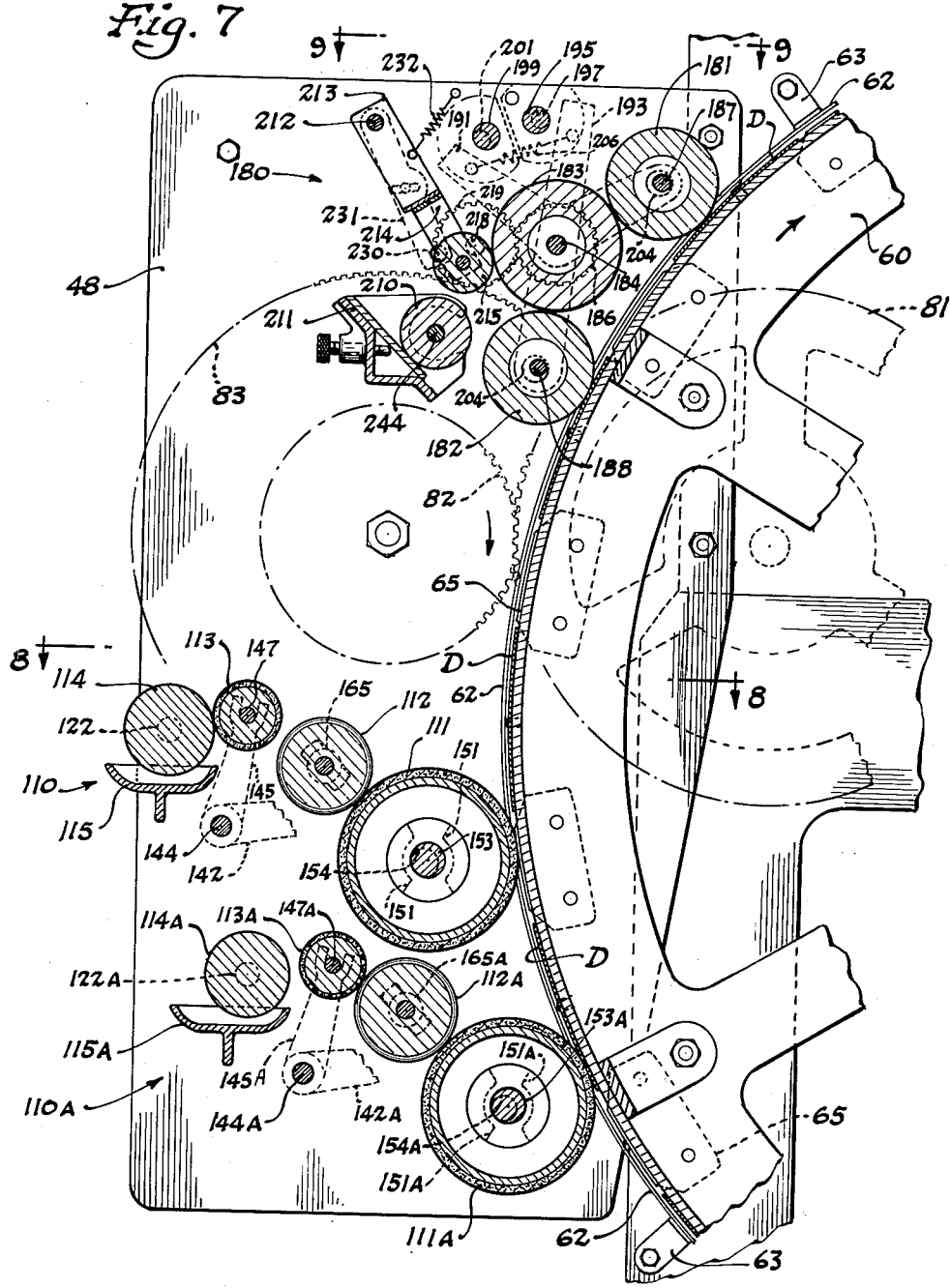

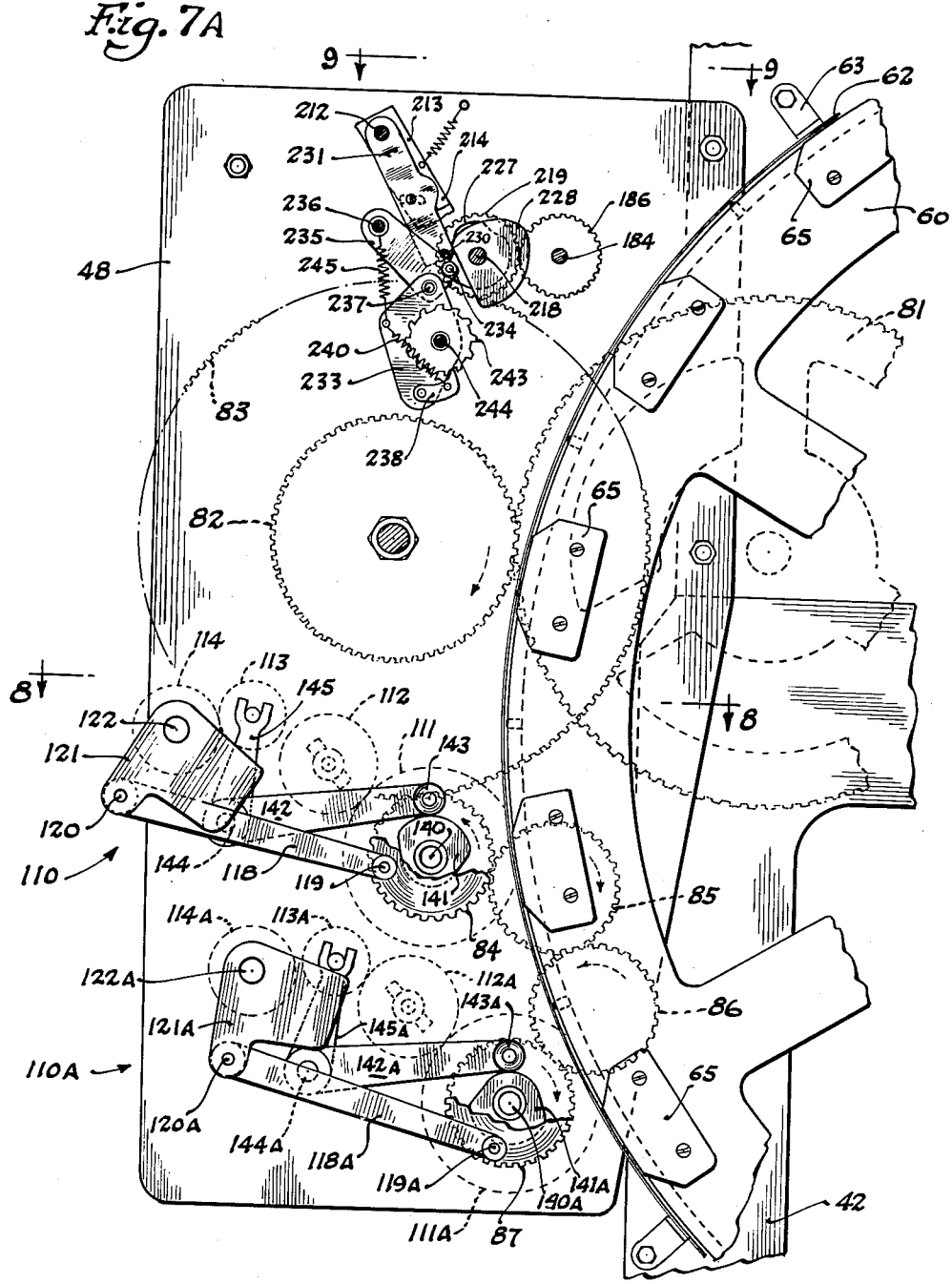

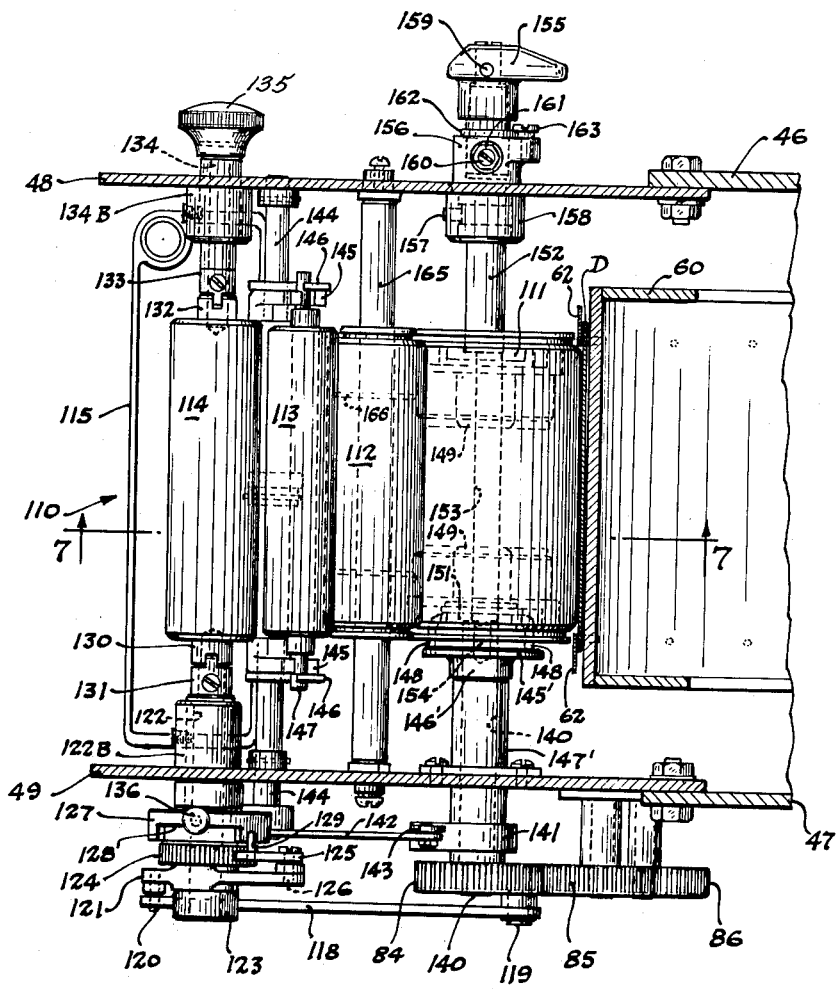

Jan. 24, 1956  J. H. GRUVER  2,731,910
MACHINE FOR FEEDING AND TREATING LITHOGRAPHIC
ADDRESS PRINTING PLATES
Filed Aug. 28, 1952  25 Sheets-Sheet 8

INVENTOR
John H. Gruver
BY Wallace and Cannon
ATTORNEYS

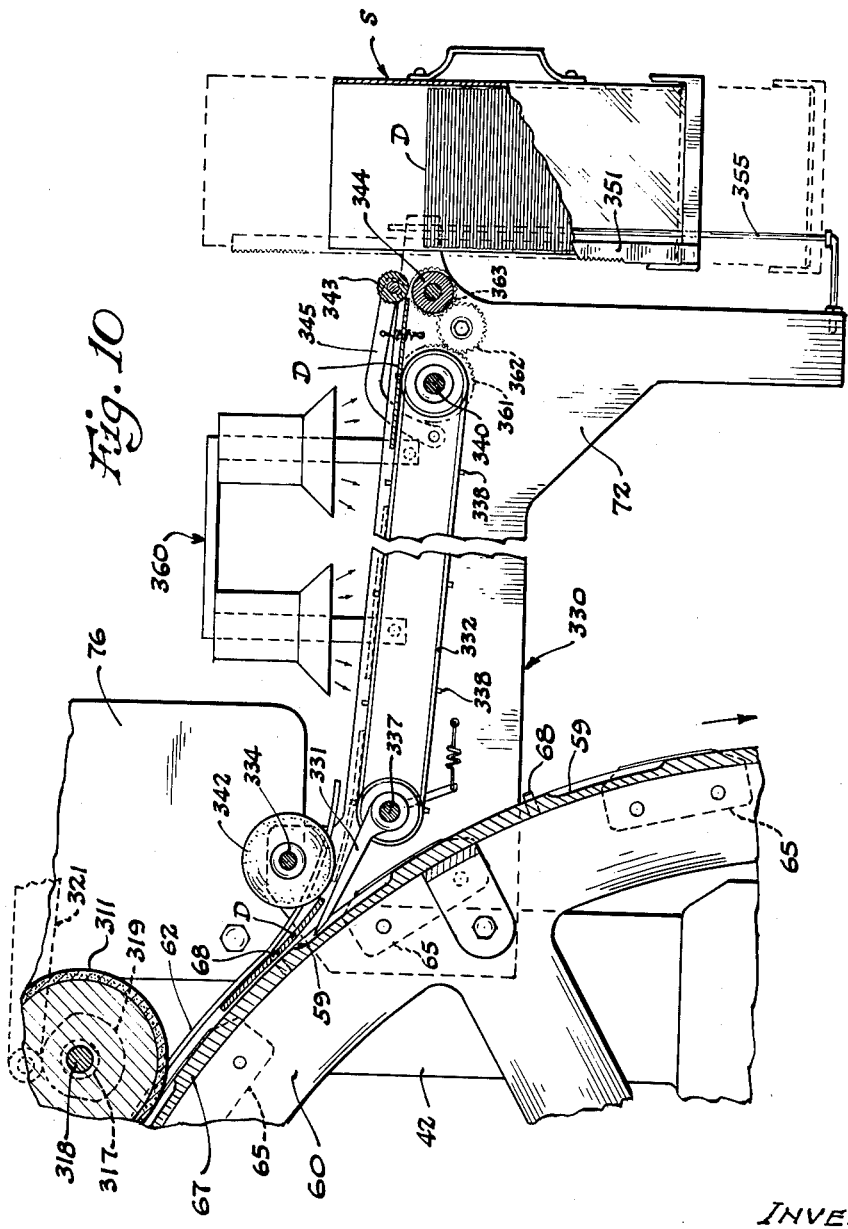

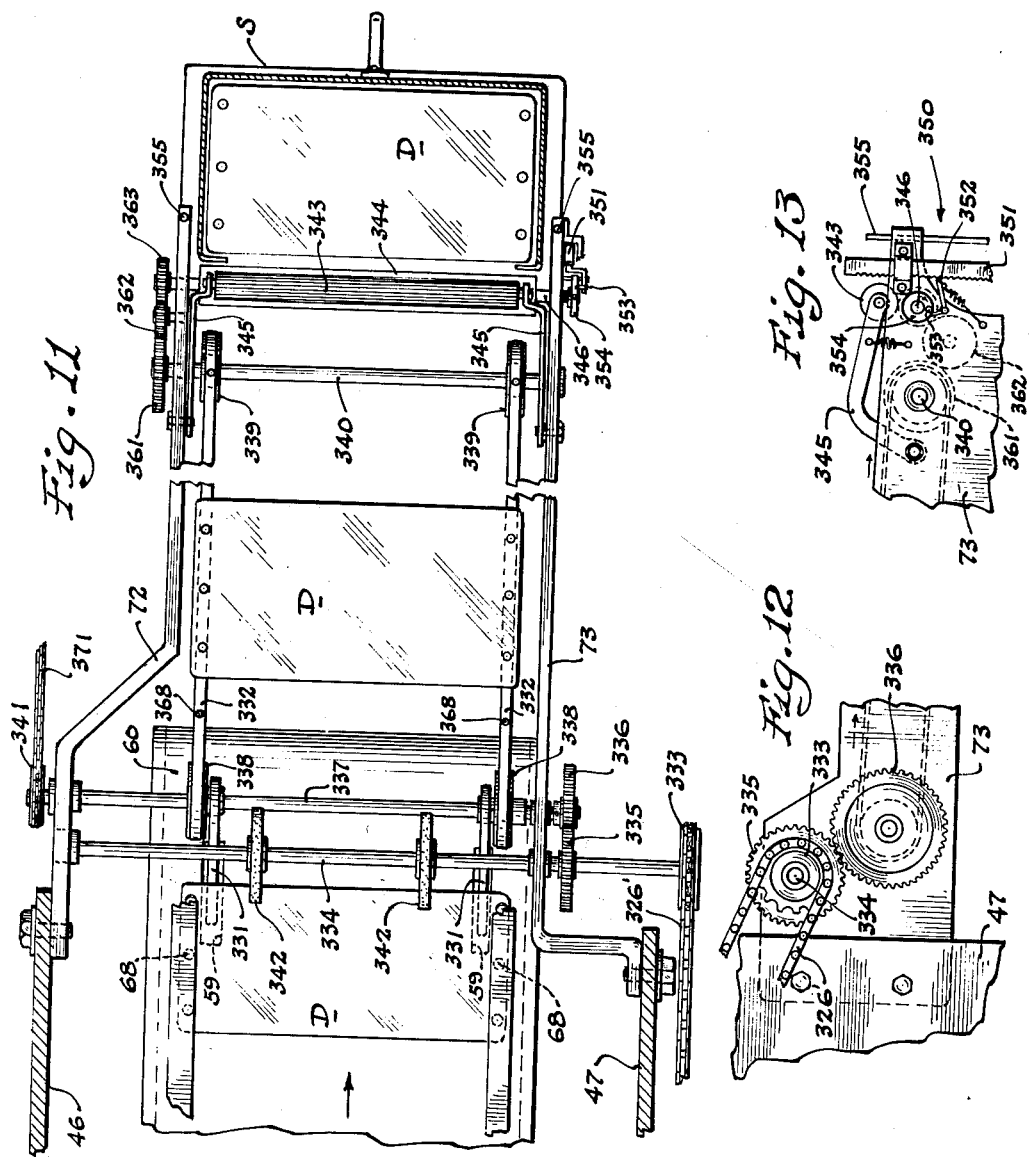

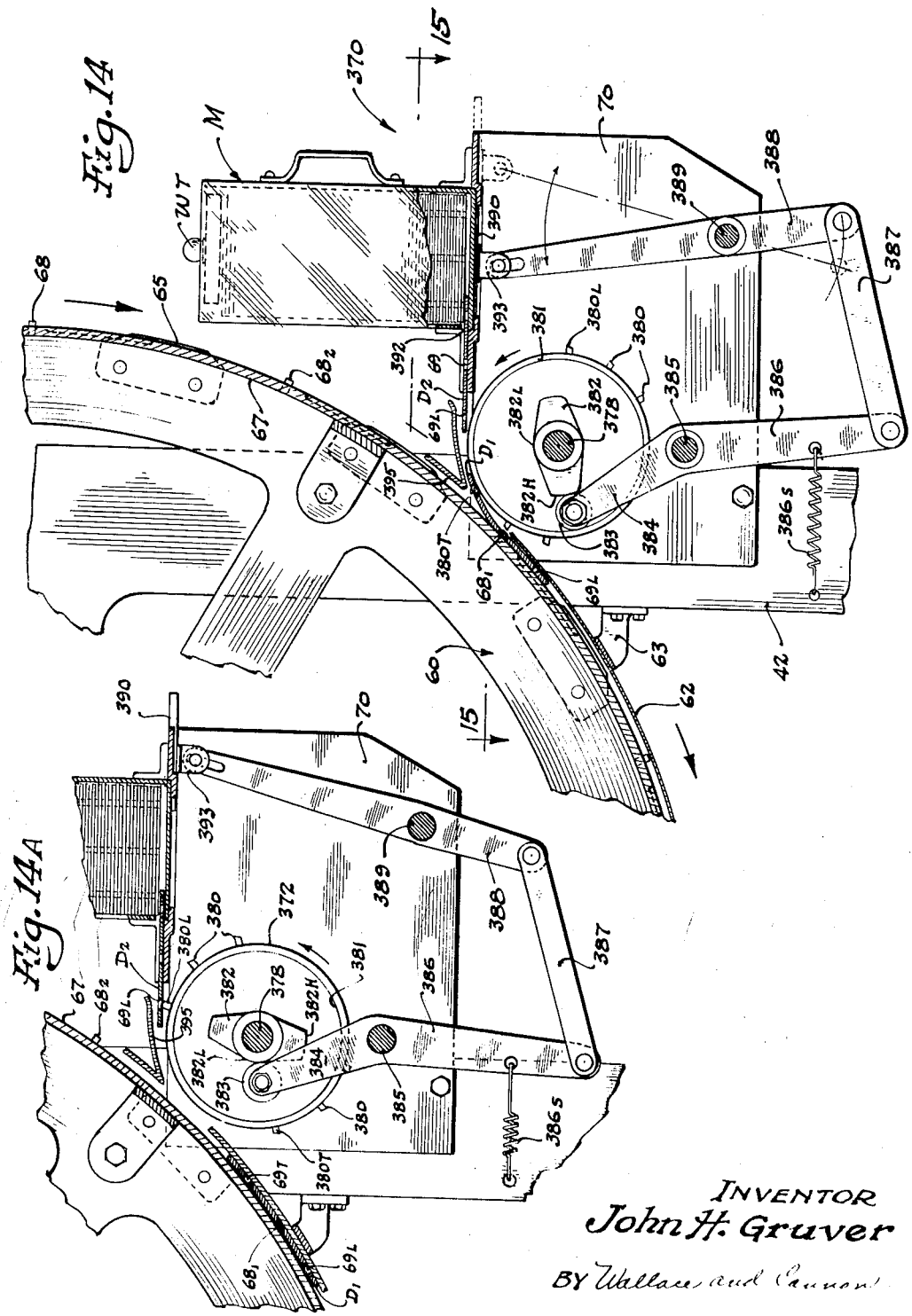

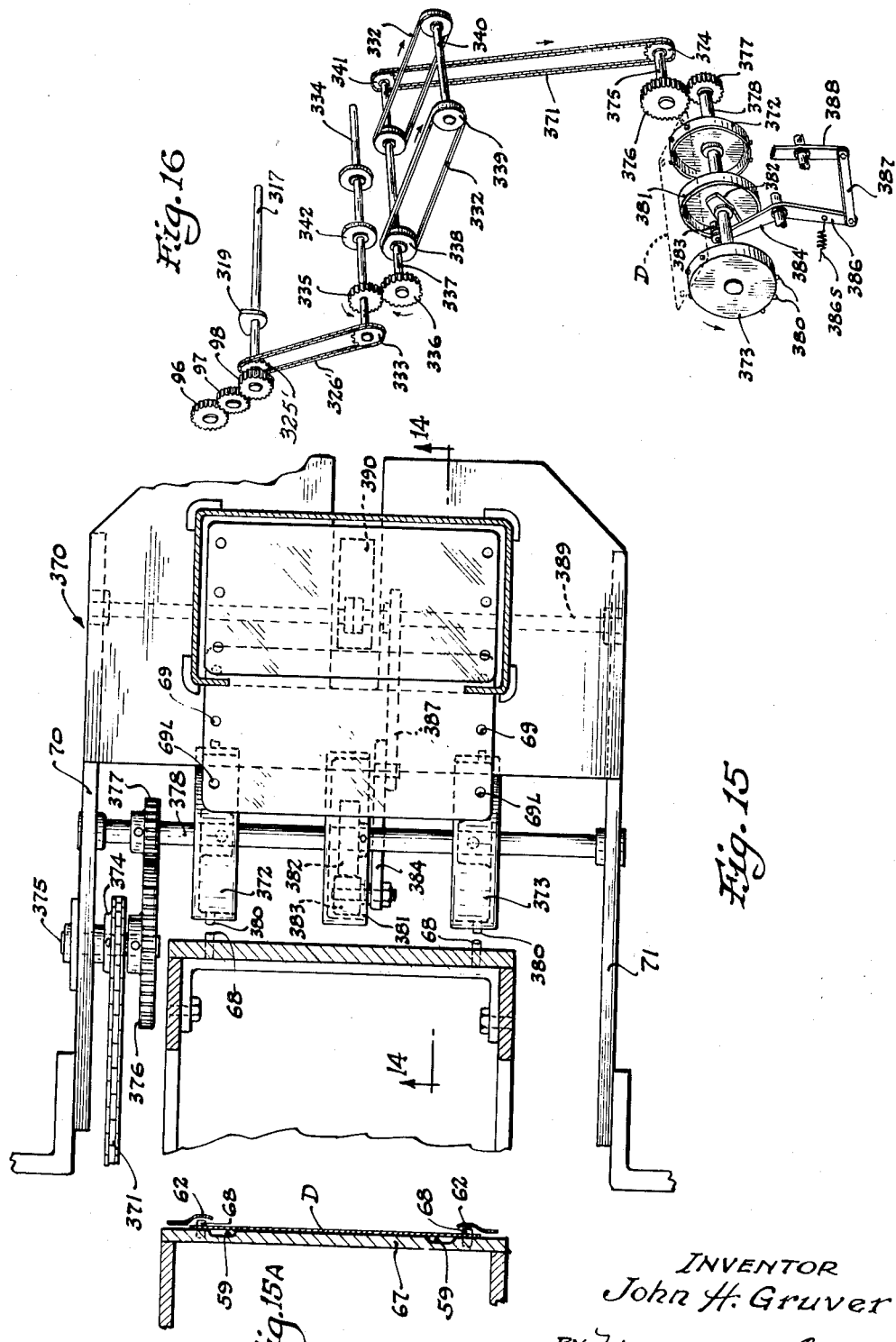
Jan. 24, 1956
J. H. GRUVER
2,731,910
MACHINE FOR FEEDING AND TREATING LITHOGRAPHIC ADDRESS PRINTING PLATES
Filed Aug. 28, 1952
25 Sheets—Sheet 12
INVENTOR
John H. Gruver
BY Wallace and Cannon
ATTORNEYS

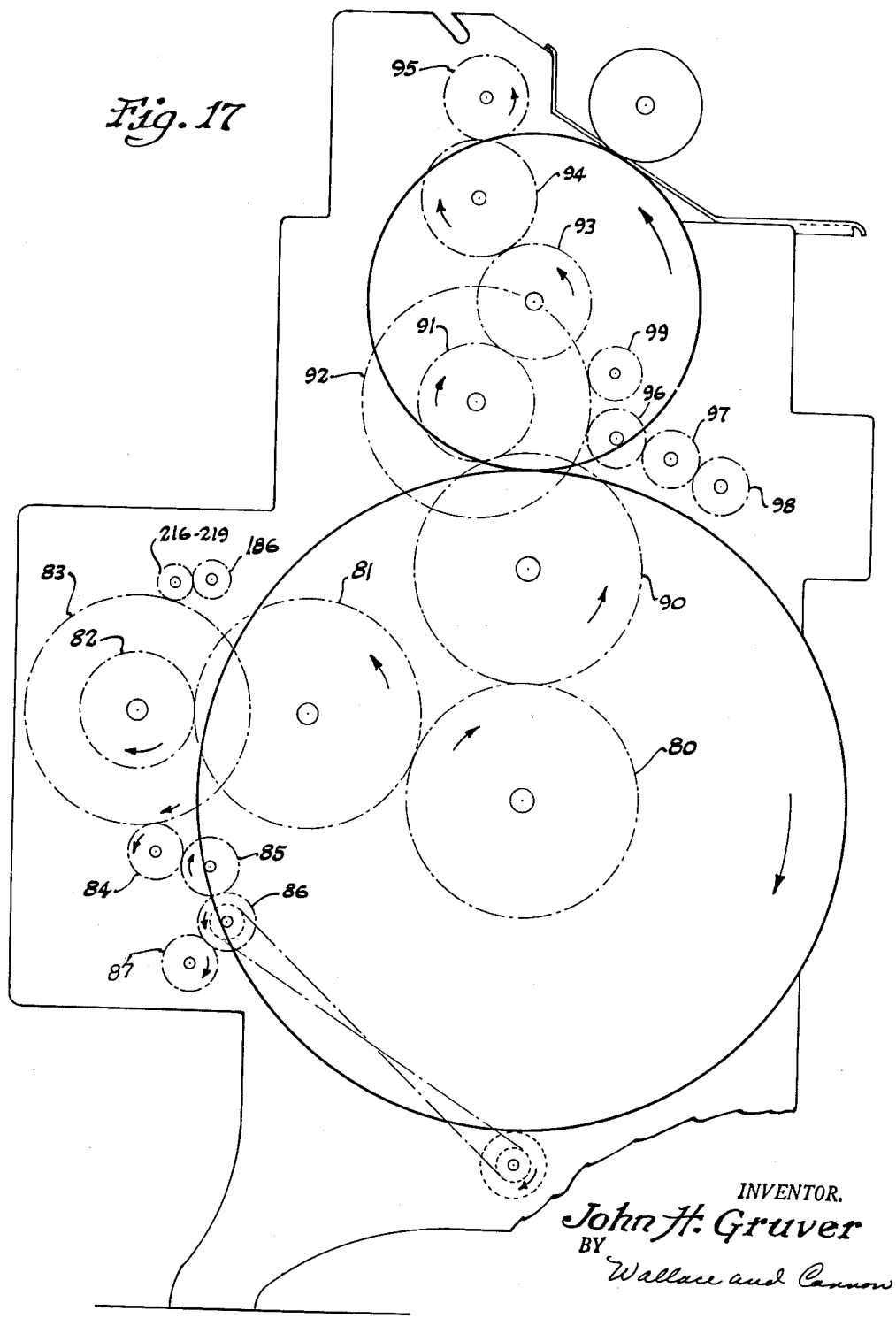

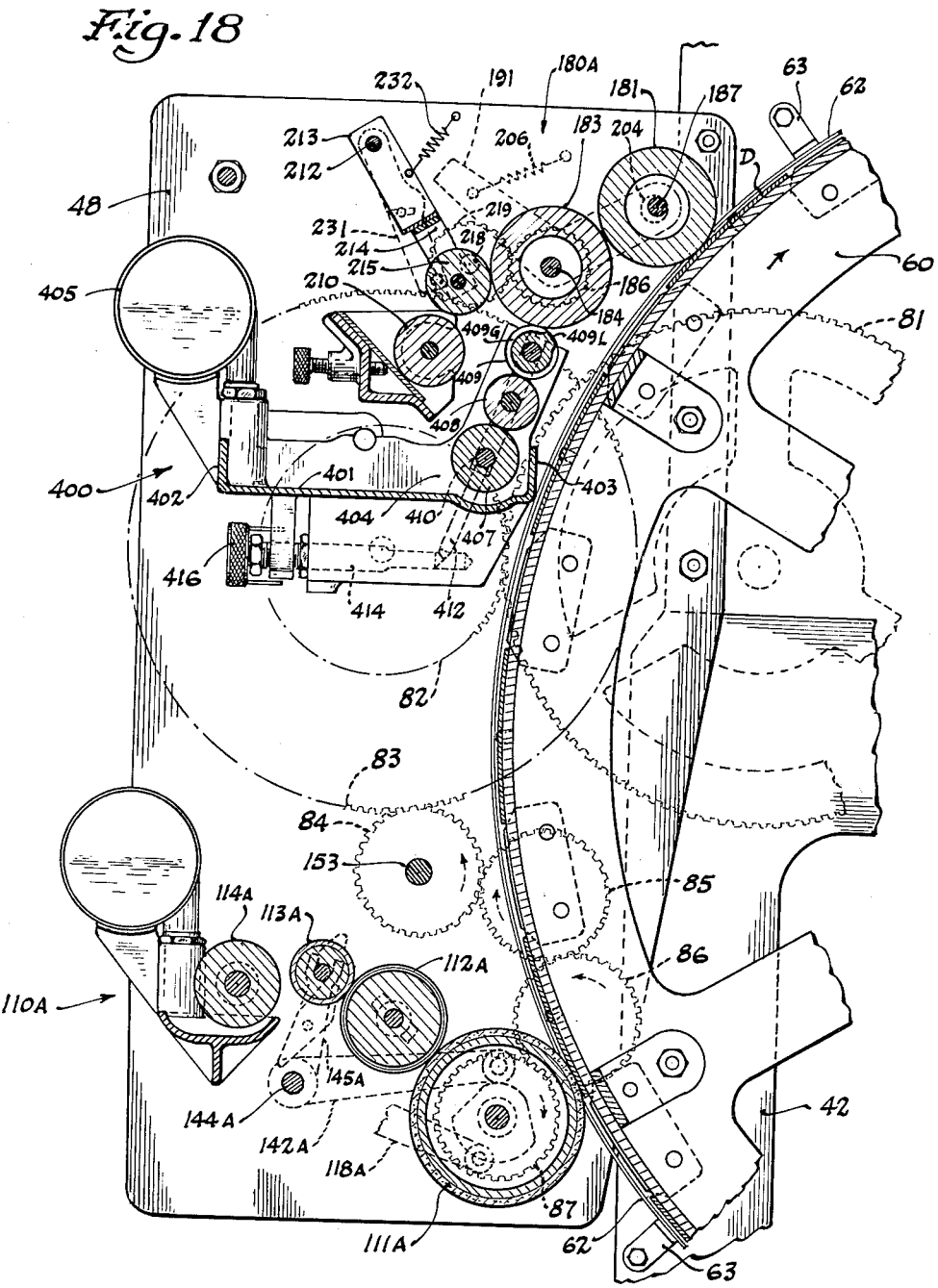

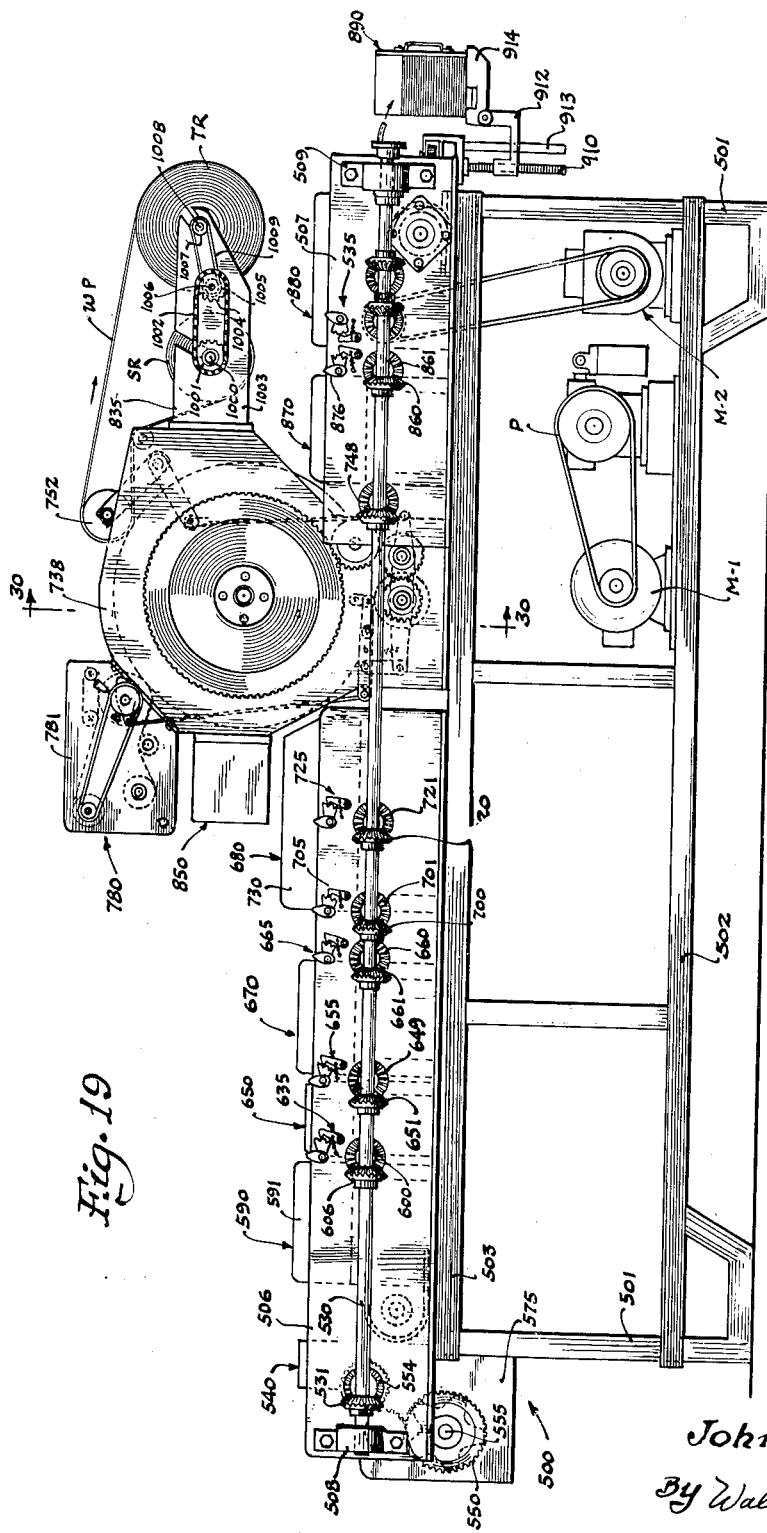

Jan. 24, 1956  
J. H. GRUVER  
2,731,910  
MACHINE FOR FEEDING AND TREATING LITHOGRAPHIC ADDRESS PRINTING PLATES  
Filed Aug. 28, 1952  
25 Sheets-Sheet 16
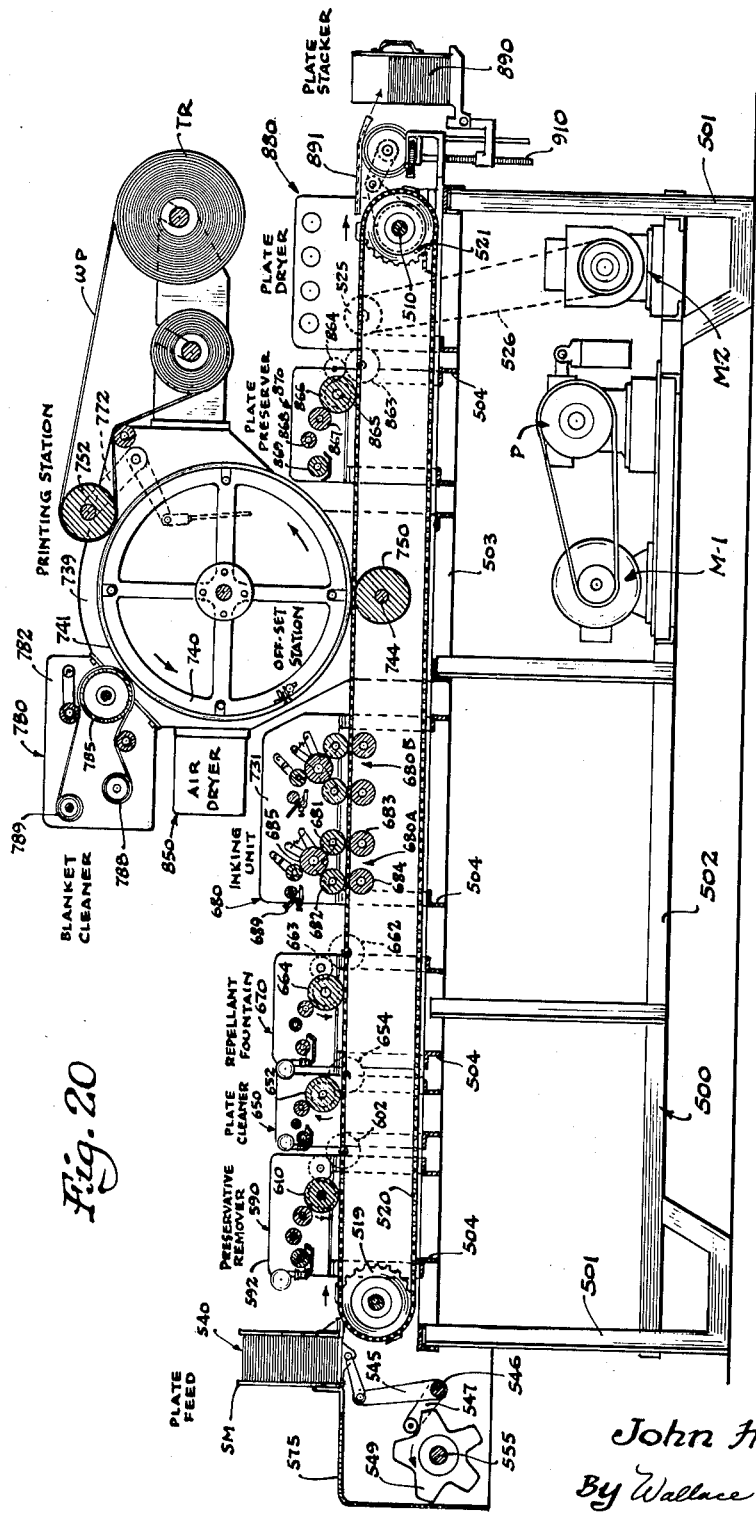
Inventor  
John H. Gruver  
By Wallace and Cannon  
Attorneys Jan. 24, 1956 J. H. GRUVER 2,731,910
MACHINE FOR FEEDING AND TREATING LITHOGRAPHIC
ADDRESS PRINTING PLATES
Filed Aug. 28, 1952 25 Sheets-Sheet 17

Inventor
John H. Gruver
By Wallace and Cannon
Attorneys

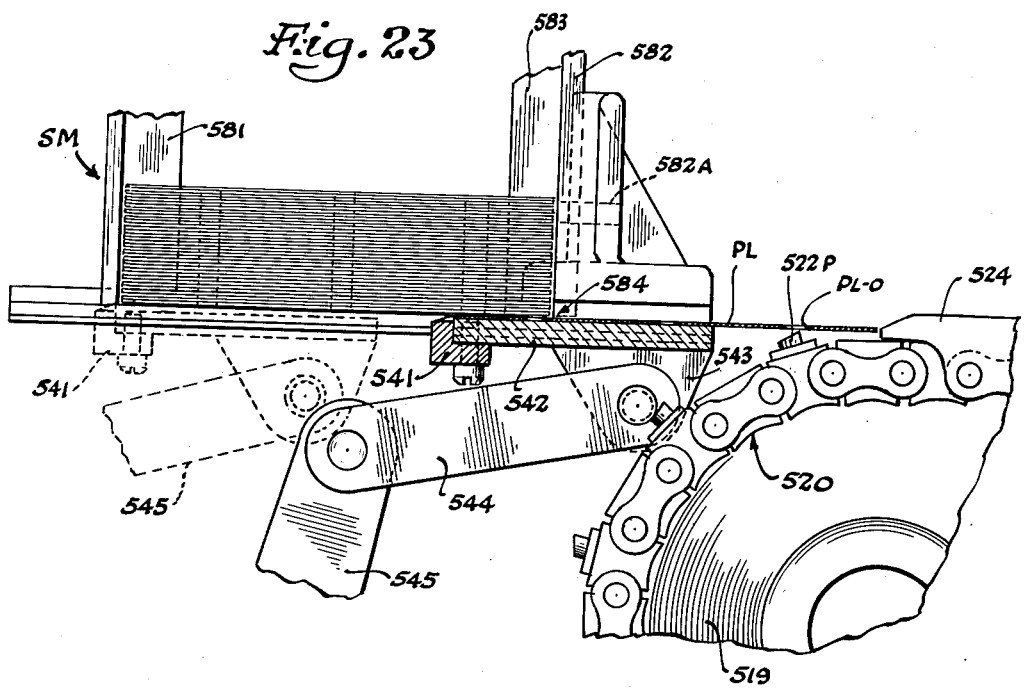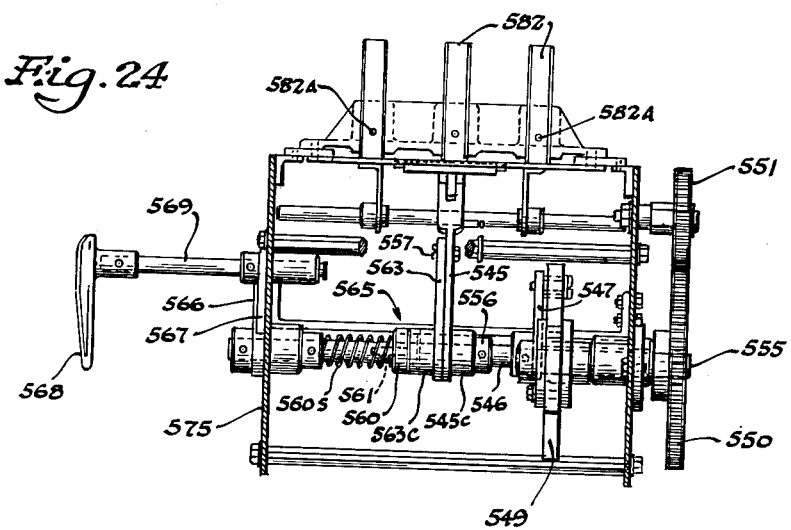

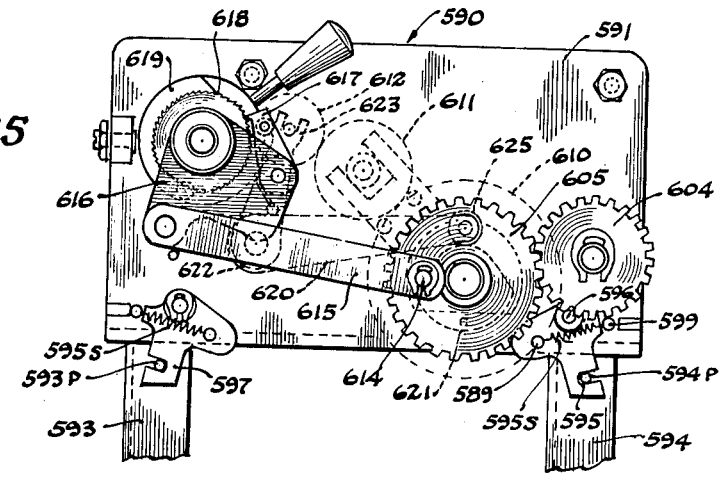
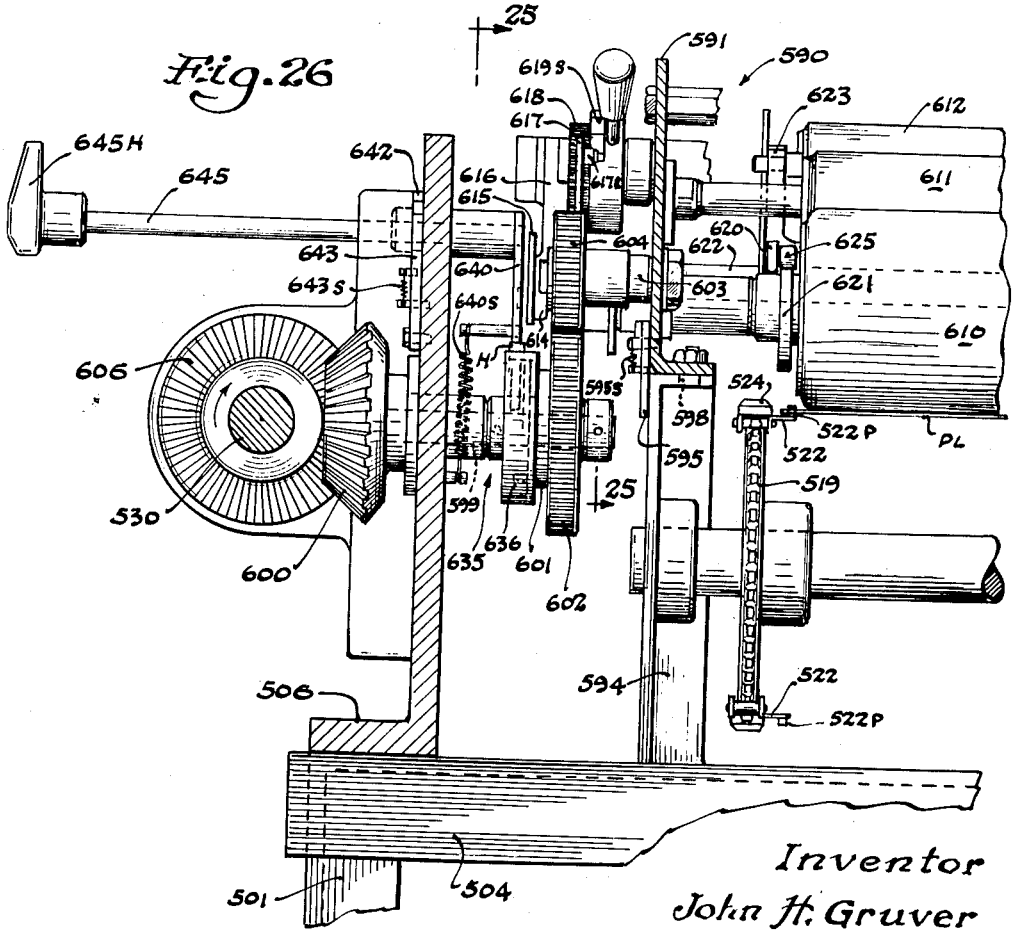

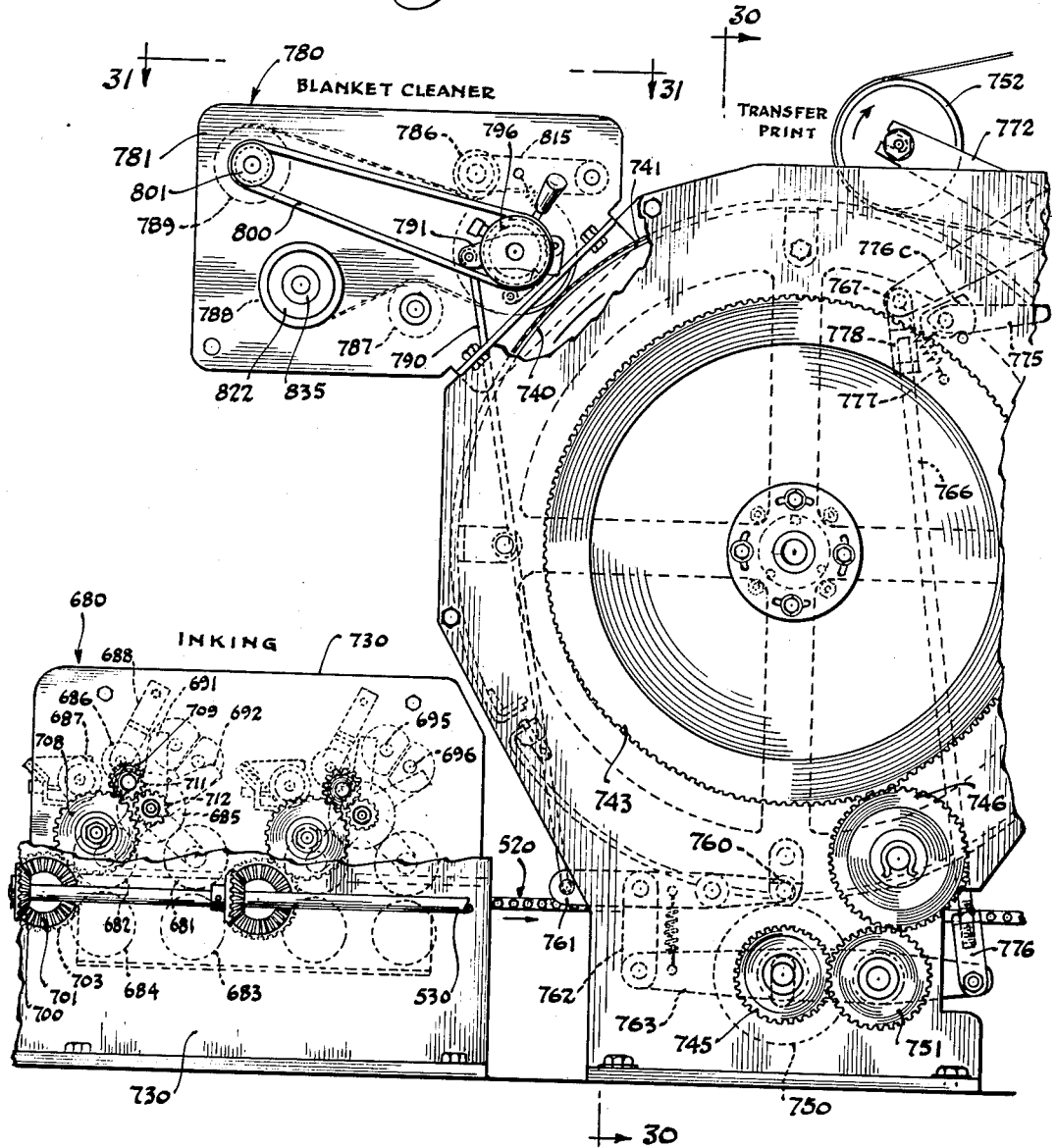

Jan. 24, 1956

J. H. GRUVER 2,731,910

MACHINE FOR FEEDING AND TREATING LITHOGRAPHIC
ADDRESS PRINTING PLATES

Filed Aug. 28, 1952

Inventor
John H. Gruver
By Wallace and Cannon
Attorneys

Jan. 24, 1956   J. H. GRUVER   2,731,910
MACHINE FOR FEEDING AND TREATING LITHOGRAPHIC
ADDRESS PRINTING PLATES
Filed Aug. 28, 1952   25 Sheets-Sheet 22

Inventor
John H. Gruver
By Wallace and Cannon
Attorneys

Inventor
John H. Gruver
By Wallace and Cannon
Attorneys

Jan. 24, 1956
J. H. GRUVER
2,731,910
MACHINE FOR FEEDING AND TREATING LITHOGRAPHIC
ADDRESS PRINTING PLATES
Filed Aug. 28, 1952
25 Sheets-Sheet 24
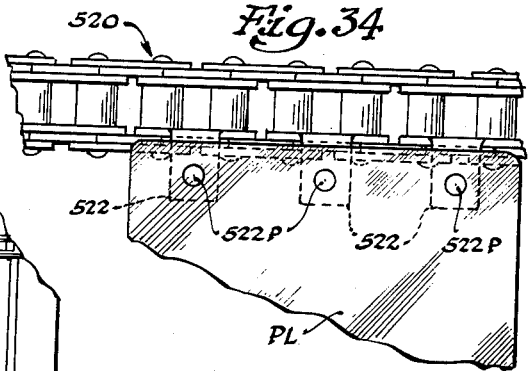
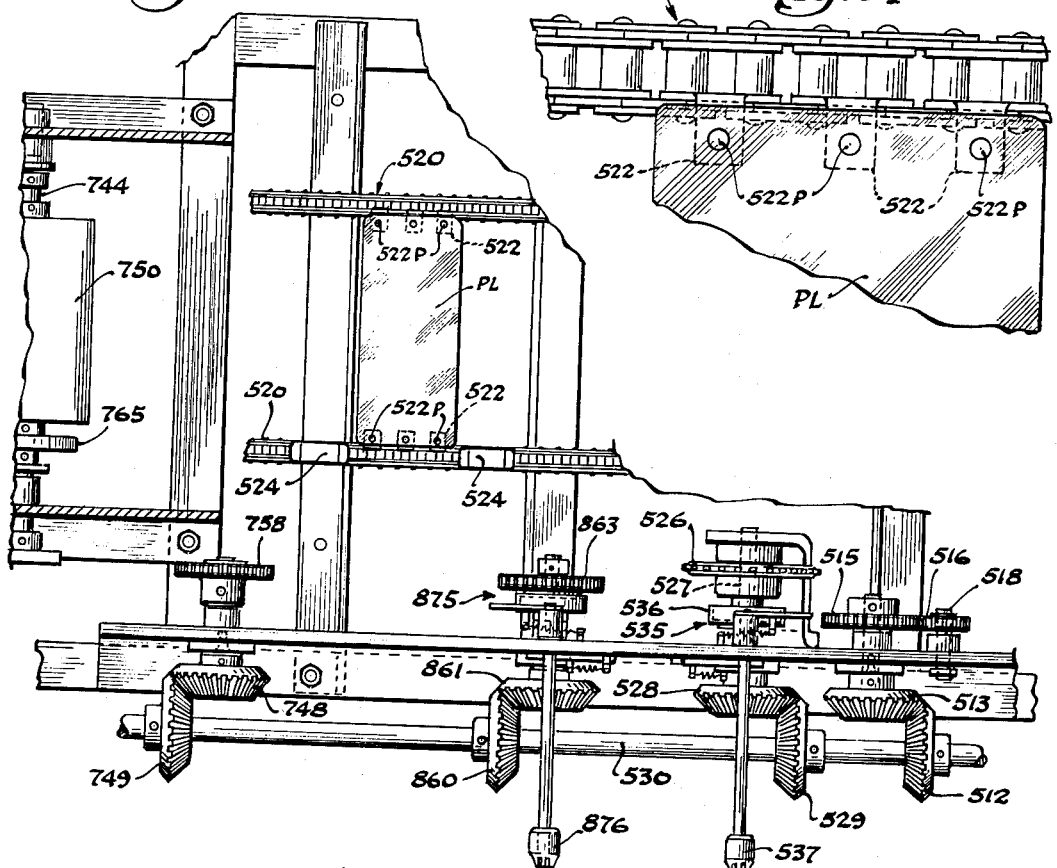
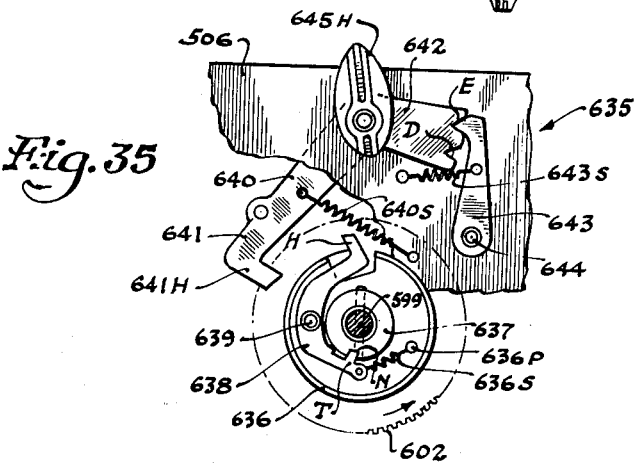
Inventor
John H. Gruver
By Wallace and Cannon
Attorneys Inventor
John H. Gruver
By Wallace and Cannon
Attorneys

United States Patent Office 2,731,910
Patented Jan. 24, 1956

2,731,910

MACHINE FOR FEEDING AND TREATING LITHOGRAPHIC ADDRESS PRINTING PLATES

John H. Gruver, Cleveland Heights, Ohio, assignor to Addressograph-Multigraph Corporation, Wilmington, Del., a corporation of Delaware Application August 28, 1952, Serial No. 306,876

20 Claims. (Cl. 101—47)

This invention relates to printing machines and is concerned with printing machines of the character in which impressions are taken from individual printing devices that are passed one by one through the machine.

Printing machines of the aforesaid character as heretofore known have utilized printing devices wherein the printing characters have been formed either as embostures on metallic printing plates, or have been formed on suitable stencil paper carried in a supporting frame so as to impart strength to the stencil paper. With respect to the prior printing machines of the type wherein the printing devices were afforded by embossed metal printing plates, the cost production of such embossed printing plates has been somewhat objectionable, and in addition, the volume or size of such metallic printing plates has introduced problems in respect to the handling and storage thereof. In respect to printing machines of the aforesaid character wherein the printing devices are of the stencil type, the quality of the printed impressions has been objectionable, and the useful life of the stencils has often been relatively short. In view of these and kindred objections, it is the primary object of the present invention to enable printing of the general character heretofore produced by printing machines of the aforesaid character to be accomplished through the use of printing devices which utilize the lithographic principle so as to not only simplify the problems of production and storage of the printing devices, but also to produce printed impressions of high quality from printing plates that are relatively inexpensive.

A further and related object of the present invention is to enable printing devices utilizing the lithographic principle to be processed in a printing machine without individual handling, thus eliminating the possibility of impairing the printing surface. In this connection, other objects of the invention are to subject the printing plates, while still in the machine, to a treatment with a preservative subsequent to the point in the machine whereat the plates effect reproduction, and also to embody in the same machine a means effective to remove such preservative during a subsequent printing run utilizing the preserved plates. Another and related object is to retract the printing plates from the conveyor which so transports the plates through the machine that the plates need not be touched.

In the present instance, the printing plates are each to be advanced in a line through the machine and are each to engage a blanket at a transfer station to off-set images thereon. Therefore, another object is to maintain the blanket perfectly clean so that the same will be receptive to the transfer of images at all times and to assure that the printing plates may be automatically advanced from one storage into the machine for use and then conveyed to another storage after use and after being preserved.

Still another object of the invention is to handle the material to be printed in an economical manner and to do this in a manner whereby the blanket may also be cleaned economically and automatically.

More specifically, it is an object of the present invention to enable a series of printing devices carrying lithographically reproduceable images to be fed by one from storage through a printing machine so as to be first prepared for the taking of impressions therefrom, to take such impressions, and to thereafter condition the printing devices for return to storage.

Yet a further object is to constitute and arrange the parts in a printing machine employing the lithographic principle so as to enable the machine to feed, clean, moisten, ink, preserve, and retract printing devices in one cycle of operation and which, during the same cycle, will transfer the design or image carried by each particular printing device to an off-set or transfer blanket synchronized with reconditioning means therefor.

A further object of the present invention is to afford a novel lithographic printing machine that is relatively inexpensive of manufacture and construction and which performs essential operations in a facile and exacting manner to produce printed impressions of high quality.

Other and further objects of the present invention will be apparent from the following description and claims and are illustrated in the accompanying drawings which, by way of illustration, show preferred embodiments, and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Figure 2:
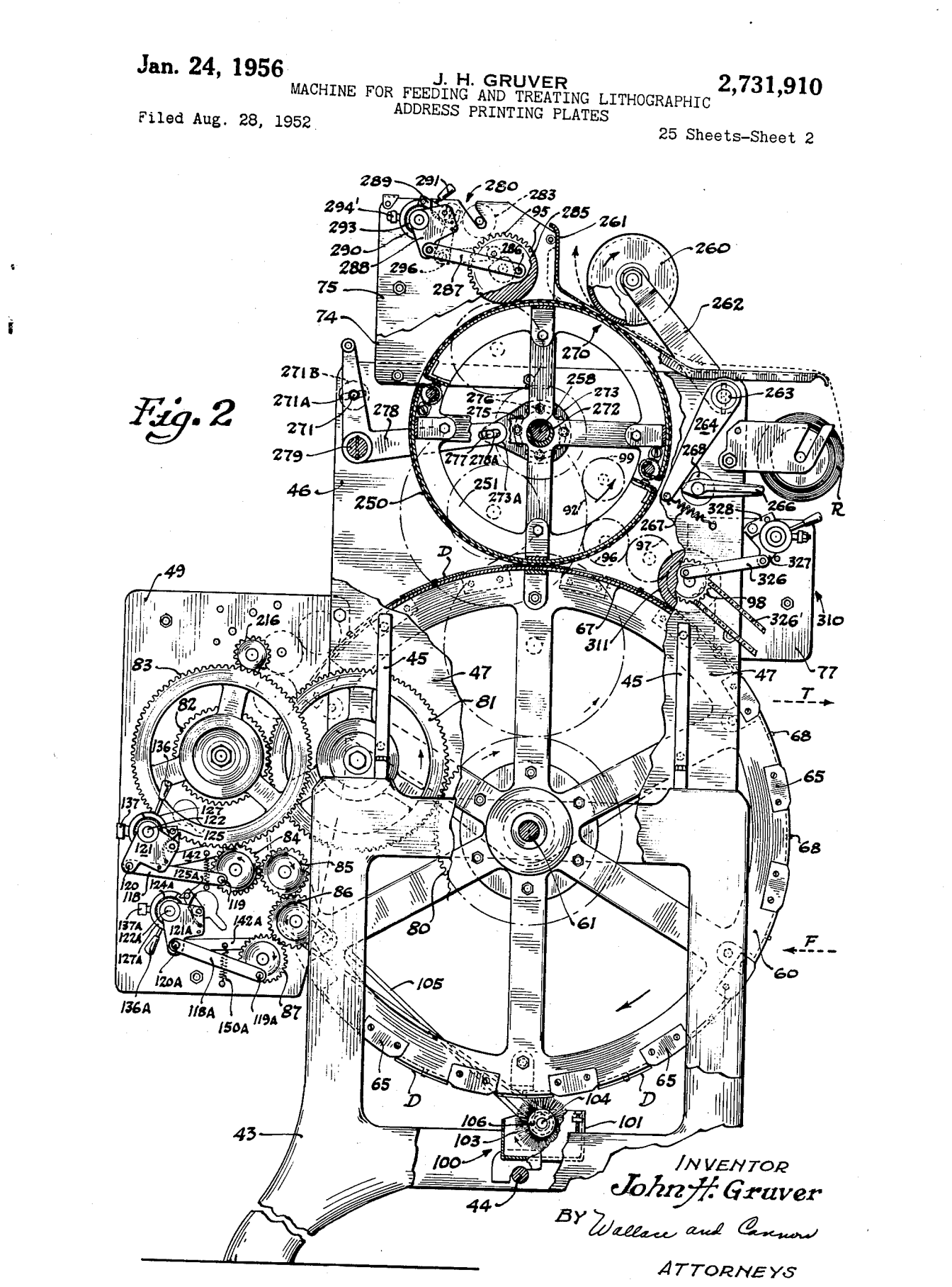

Fig. 2 is a vertical sectional view taken through the machine shown in Fig. 1 so as to illustrate the relationship of several of the units of the machine;

Fig. 3 is a plan or face view of a printing device adapted for use in the machine illustrated in Figs. 1 and 2;

Fig. 4 is a fragmental sectional view illustrating on an enlarged scale the structural characteristics of the blanket cleaning unit shown in Fig. 2;

Fig. 5 is a vertical sectional view illustrating the structural details of the unit in the machine whereby the printing devices are conditioned for storage;

Fig. 6 is an enlarged fragmentary portion of Fig. 5 illustrating on an enlarged scale the means for securing the blanket in position on the blanket roll;

Fig. 7 is a fragmental sectional view of Fig. 2 illustrating details of the units which are respectively operable to clean and moisten the printing devices and to apply ink thereto;

Fig. 7A is a diagrammatic elevation view illustrating the relationship between the actuating and driving means for the units shown in Fig. 7;

Fig. 8 is a fragmental plan view taken substantially on the line 8—8 of Fig. 7, but adding certain parts shown in Fig. 7A to further illustrate details of the means for driving the cleaning and moistening units of the present machine, and showing certain drive members disposed somewhat differently than in Fig. 7A so as to illustrate certain mechanical relationships;

Fig. 10 is a fragmental side elevational view of the unit in the machine which removes or retracts the printing devices from the plate cylinder and stacks the same in a storage magazine;

Fig. 11 is a plan view of the mechanism shown in Fig. 10;

Figs. 12 and 13 are fragmental elevational views illustrating various details of the structure shown in Figs. 10 and 11;

Fig. 14 is a fragmental vertical sectional view illustrating details of the printing device feed or supply mechanism;

Fig. 14A is a view similar to Fig. 14 but showing the parts in the feeding mechanism at a different stage in a cycle of operation;

Fig. 15 is a plan view of the mechanism illustrated in Fig. 14, being taken substantially on the line 15—15 of Fig. 14;

Fig. 15A is a fragmentary sectional view of the plate cylinder illustrating the manner in which the plates are held in position;

Fig. 16 is a schematic perspective view of the drive means used to drive the plate feed means;

Fig. 17 is a diagrammatic view illustrating the drive connections embodied in the machine;

Fig. 18 is a sectional view similar to Fig. 7 but showing a modified form of an inking unit;

Fig. 19 is a side elevational view of another machine embodying the principles and features of the present invention;

Fig. 20 is a schematic sectional view taken through the machine of Fig. 19;

Fig. 23 is fragmental detail sectional view illustrating on an enlarged scale the means for feeding printing plates to the conveyor mechanism;

Fig. 24 is a sectional view looking into the back of the machine and being taken on the line 24—24 of Fig. 22;

Fig. 25 is a detail elevational view taken on the line 25—25 of Fig. 26;

Fig. 26 is a fragmental sectional view illustrating on an enlarged scale a portion of the machine shown in Fig. 21 and being taken substantially on the line 26—26 of Fig. 21;

Fig. 27 is a fragmentary elevational view on an enlarged scale of another portion of the machine shown in Fig. 19;

Fig. 33 is a fragmental plan view on an enlarged scale illustrating another portion of the machine shown in Fig. 19;

Fig. 34 is a fragmental detail view of the means for transporting the printing devices from one end to the other of the machine shown in Fig. 19;

Fig. 35 is a fragmental plan view of a clutch;

For purposes of disclosure, one form of the invention is herein illustrated in Figs. 1–18 as embodied in a rotary offset printing press wherein printed impressions are made from printing devices D of the character illustrated in Fig. 3 as such printing devices are passed one by one through the machine from a supply magazine M. In the form herein illustrated, the printed impressions are made in succession on a web W that is withdrawn from a roll of paper R so that the web W may constitute a mailing strip or the like, but it will be recognized that such strip list constitutes but one form of printed product that may be produced in accordance with the practice of the present invention, it being clear that other types of sheet feeding or supply mechanism may be afforded such, for example, as an individual sheet supply or feeding means which will advance individual sheets into printing position.

The printing machine of the present invention, which may be either rotary or flat-bed in form, is lithographic in character, and in the particular embodiments illustrated, the lithographic principle is used in that a greasy image A, Fig. 3 is formed in a direct reading relationship on the lithographic surface of a printing device D so as to be surrounded by non-imaged areas B of the printing device; and in the machine, this image A is effective, after being inked, to produce a reverse image on a transfer blanket which then transfers the image in a direct reading relationship on to the sheet such as web W. The printing device as D may be of any desired character that affords a greasy, image-receptive or lithographic surface, and in this respect etched or anodized aluminum foil plates may be conveniently employed.

Figure 1:
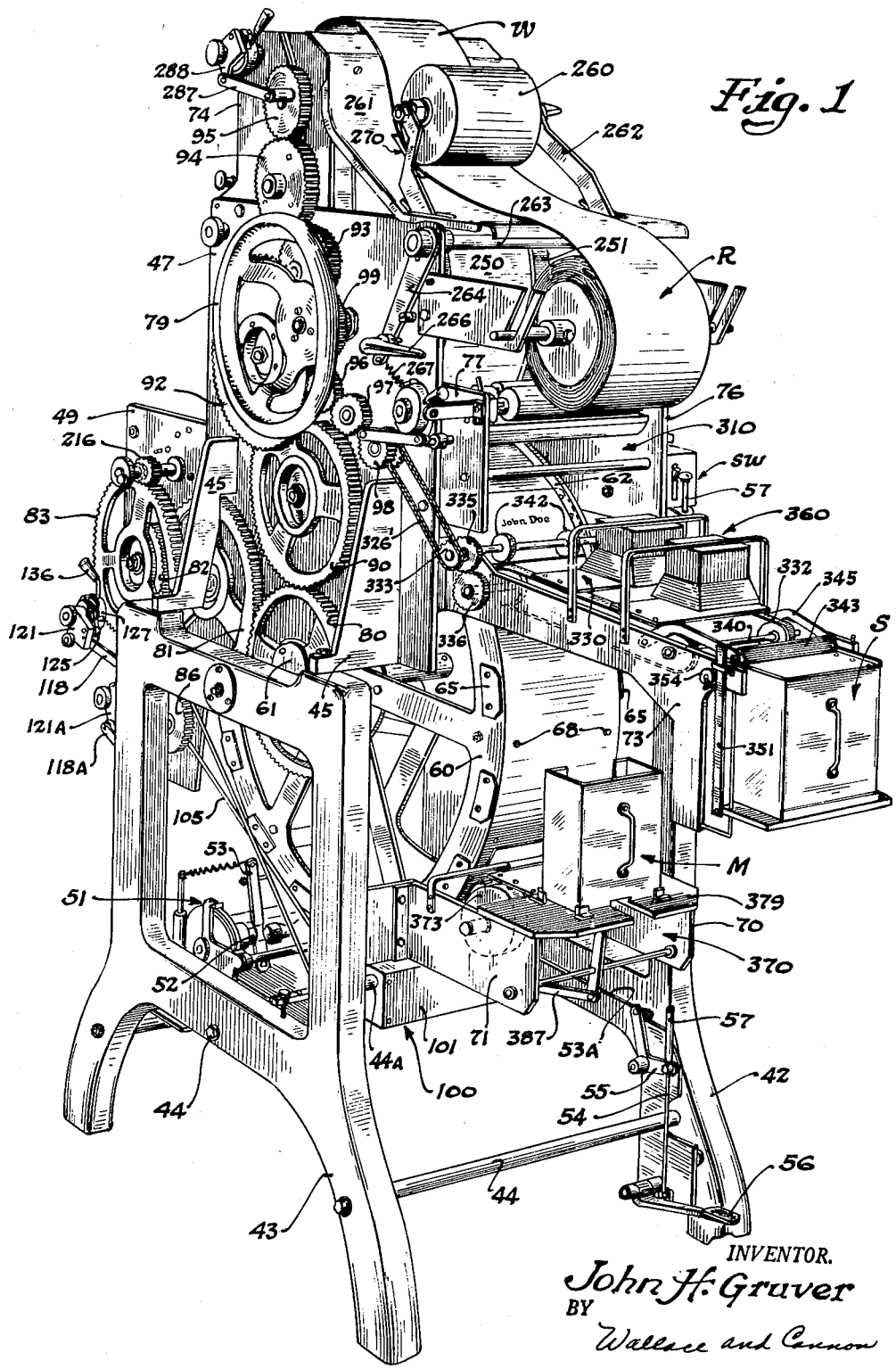
Fig. 1 is a perspective view of a printing machine embodying the features of the invention.

In the form of the invention illustrated in Figs. 1 through 18, the printing devices as D are withdrawn from the magazine M, Fig. 1 and are advanced by a carriage or plate-carrying means in the form of a plate cylinder 60 along a path that extends from the magazine M past a series of preparing and treating units which condition the lithographic printing devices for the taking of impressions therefrom, and the printing devices as D are then brought into rolling contact with a transfer blanket 250, Fig. 2, that is carried on a rotatable blanket cylinder. The image that is thus formed or off-set on to the blanket is carried by such blanket into rolling contact with the advancing sheet material as W which is pressed against the blanket by an impression roller or cylinder 260 so that the reverse image previously off-set on to the blanket is transferred in a direct reading relation onto the web W. The location of the impression cylinder thus defines the printing position or station of the machine. After the impression has been made on the web W in this manner, such printing devices continue movement along the aforesaid path and are treated with a preservative such as gum arabic at a preservative unit 310 and thereafter may be heated and dried subsequent to being retracted from the aforesaid path for transmittal to a storage magazine S. In view of the fact that the present invention affords means whereby printing devices of the aforesaid character are to be continuously processed without manually handling the lithographic printing plates, a cleaning unit 100 is located in a position adjacent the plate cylinder to scrub the aforesaid preservative from the image-reproducing face of the printing devices as the first step in conditioning the plates for printing. This plate cleaning unit is adapted to scrub the printing devices with a solution that will dissolve the preservative coating, and since it is preferable to have the greasy lithographic image, generally indicated at A in Fig. 3, in a relatively soft condition for printing, it may be advisable to admix glycerine with the solution. A moisture unit 110, Fig. 7, is adapted to apply ink-repelling material to the non-imaged areas B of the printing devices following removal of the preservative coating therefrom, and an inking unit or train 180 is adapted to thereafter apply a coating of ink to the imaged areas A of the printing devices. These latter two units are also located adjacent the rotatable plate cylinder, and in this manner the printing devices are conditioned for transferring the image onto the transfer blanket. After the desired impression has been taken from the blanket at the printing station, continued rotation of the blanket cylinder causes the reverse image on the blanket to be brought into the path of a constantly rotating blanket cleaning means, Fig. 4, whereat the blanket is progressively cleaned so as to remove successive images therefrom and to condition the blanket for continuous reception of new images as successive printing devices are brought into contact therewith.

In the form illustrated in Figs. 1–18, the aforesaid path of movement of the printing devices is generally arcuate in character, but it will be recognized that this circular or arcuate characteristic is not essential in every instance since the primary requirements are that the printing devices travel along a continuous path between the supply magazine and the storage magazine so as to have the requisite treating and conditioning operation performed thereon and to off-set an image to the transfer means such as a transfer blanket.

Thus, in the embodiment of the invention herein illustrated in Figs. 1–18, the printing devices are successively mounted upon a relatively large drum or plate cylinder 60 which serves as a printing device carrier and which is mounted for rotative movement on a central mounting or supporting shaft 61 that extends between a pair of main upstanding frame members 42 and 43. As indicated in Fig. 2, printing devices are fed to and positioned on the plate cylinder 60 along a line generally indicated by the arrow F leading from the supply magazine M, and the printing devices are continuously withdrawn from the plate cylinder 60 along the line generally indicated by the arrow T to the storage magazine S. The manner in which such feeding and withdrawing of printing devices is accomplished will be pointed out hereinafter. The frame members 42 and 43 are rigidly connected by means including transverse tie bars 44, and these frame members are adapted to rest upon the floor. The printing device carrier that is thus afforded by the plate cylinder 60 is relatively narrow as will be evident in Fig. 1, being designed for the reception of conventional sized printing devices of the type adapted to print addresses or the like. It will be appreciated, however, that changes can be made for the utilization of other types of plates or printing devices as desired.

The plate cylinder 60 is constantly driven at a uniform speed during operation of the machine in a clockwise direction as viewed in Figs. 1 and 2 by means including a drive motor (not shown) disposed adjacent frame member 42 in a position to be connected by means of a belt and pulley to that remote end of a drive shaft 52 which is hidden when viewed from the position of Fig. 1. A clutch, generally indicated at 51, is positioned adjacent the other end of the shaft 52, and a belt drive (not shown) is afforded between the driven member of the clutch and drive shaft 61, and in this manner the motor will drive drum 60 when clutch 51 is engaged. In order that the clutch may be engaged and disengaged to control operation of the machine, a series of linkages 53, 53A, and 54 are run through a bell crank 55 and terminate at a foot pedal 56. If desired, an additional link or rod 57 may be run up along the frame member 42 and connected to a switch SW whereby the motor itself may also be placed under control of the foot pedal in a known manner. This driving and actuating arrangement for the machine constitutes no part of the present invention, and, therefore, any convenient or suitable driving arrangement may be used.

The printing device carrier that is afforded by the plate cylinder 60 includes an outer cylindrical wheel 67, and about the outer face of this wheel are a plurality of spaced plate holders or retaining elements, in the present instance comprising uniformly spaced and vertically projecting mounting pins 68 that extend from the outer face of the cylindrical wheel 67. One such pin is provided adjacent each side edge of the wheel 67, and such pairs of aligned pins 68 each define a plate holding position on the plate cylinder 60. The pins as 68 are adapted to extend through central locating openings 69 that are formed in each of the printing plates as D as will be evident in Fig. 3. In the present instance, additional openings 69L and 69T are provided in the printing devices adjacent each corner thereof, but these latter openings are not utilized in connection with the mounting of the printing device holders afforded by the pins 68, but serve a purpose that will be pointed out hereinafter.

When a printing device as D is placed in position on one of the sets of plate holding pins as 68, this is accomplished by means of a printing device feeding-and-positioning mechanism best shown in Figs. 14 and 14A that is associated with the magazine M. The particular way in which this feeding mechanism functions will be described in detail hereinafter. For present purposes, therefore, it may be assumed that one or more printing devices as D are placed in position on the plate cylinder 60 with the pins 68 extending through the central openings 69 of the printing devices, and such printing devices then move with the drum 60 so as to be disposed in opposed relation to a pair of arcuate retaining channels 62, Figs. 14 and 15A, that are disposed along either side of the plate cylinder. It may also be pointed out that such retaining channels are fixed in position as by brackets 63 secured to the frame member 42 as shown in Fig. 14, and that the retaining channels 62 are discontinuous along a line extending from the plate withdrawing or retracting unit 330, Fig. 10, to the plate feeding unit 370, Fig. 14. The arrangement is such that the retaining channels 62 hold the printing devices in position against the outer face of the wheel 67 of the drum 60.

In the course of advancing movement of the plate cylinder 60, the printing devices shall each move past a plurality of conditioning and treating units so that the greasy image A carried thereby is prepared for effecting ink transfer from the particular printing device on to a transfer blanket, and the printing device is thereafter treated for storage prior to the time that it is removed from the carrier 60 by the printing device withdrawing means. In this connection, it may herein be pointed out that the blanket cylinder 251 is mounted on a shaft 258, Fig. 2, that extends between a pair of mounting plates or frames 46 and 47 that are supported by brackets as 45 secured to the frame members 42 and 43. The plates as 47 are disposed in spaced vertical planes on opposite sides of the plate cylinder 60, and these plates are utilized to support many of the elements of the present machine as will be pointed out below.

For purposes of better understanding, it will be assumed that the rotary machine illustrated in Figs. 1–18 is in continuous operation and that under such conditions printing devices as D are being continuously fed along the line F, Fig. 2, to the rotating plate cylinder 60 which is driven by the motor (not shown) in a clockwise direction as viewed in Fig. 1. In other words, the manner in which the plate feeding mechanism is effective to load the plate cylinder will be considered later in connection with the plate retracting mechanism, and likewise with the gear drive which emanates from the main drive shaft 61 to which the plate cylinder 60 is fixed. As the printing plates D are first advanced on to the plate cylinder, they are in a preserved condition in that a coating as gum arabic is adherent to the printing face thereof. Consequently, the plates are first subjected to a scrubbing action at a preservative removing unit generally indicated at 100, Figs. 1 and 2. This unit comprises a tank 101 carried on a central one of the cross bars 44 and a supplemental cross bar 44A. Positioned within the tank 101, a drum-like brush 103 is rotatably supported on a shaft 104 that is supported in the ends of the tank, and this brush is adapted to scrub the printing plates D with a solution of a known type which is effective to dissolve or otherwise loosen the preservative coating adherent thereto. The brush 103 is driven in a clockwise direction by means including a belt 105 and a pulley 106, such belt being driven in the appropriate direction from a driven member of another plate treating unit to be described below. The printing plates D on the plate cylinder 60, it will be recalled, are retained in position by the pairs of mounting pins 68 and the retaining channels 62 in which the side edges of the plates are disposed, and it should be pointed out that the bristles on the brush 103 preferably run across the surface of the plate in a direction opposite to the advancing movement of the plates so that the cleansing action of the brush 103 will be more effective.

Since the present invention employs the lithographic principle of reproduction, it will be appreciated that the scrubbing action of the brush 103 and the solution employed should not be so strong as to impair the usual greasy image underlying the preservative coating, and in this connection it is desirable that a softener as glycerine for the greasy image be available at unit 100. After the greasy image A and the lithographic surface B associated with each of the plates have been exposed at the preservative removing station 100, the printing plates are next advanced clockwise with the drum 60 to two other plate treating units, Figs. 7 and 7A whereat the plates are further conditioned for reproduction. The first of these units, 110A is adapted to apply nothing more than clear water to the plates so that any residual preservative or preservative-removing solution may be purged; and the other or upper one of these units, 110, is adapted to apply an ink repellant solution of a known type to the non-imaged areas B of the plates, which areas must be maintained in an ink rejecting condition. In a mechanical sense, the two units 110 and 110A are identical in that they each comprise a stationary fountain, a fountain roller, a periodically shifting and freely rotatable ductor roller, a distributor roller, and a form roller which cantacts the printing face of printing plates and which frictionally drives the distributor roller. Ratchet means are effective to rotate the fountain roller step-wise in the fountain, and cam means are effective to rock the ductor roller so that it alternately contacts the fountain roller and then the distributor roller. Thus since the two units 110A and 110 are similar, the latter alone will be considered in detail, the suffix "A" being used to designate identical parts in the unit 110A; and it may be pointed out at this time that the unit shown in Fig. 4 which is effective to clean the transfer blanket and the unit shown in Fig. 5 which is effective to apply a coating of preservative to the printing plates after the ink image has been transferred therefrom onto the blankets are also similar to the plate conditioning unit 110.

It should also be called to attention that in order to more clearly illustrate the cooperative aspects of the various parts of the units 110 and 110A, certain operating members are shown as being disposed slightly differently in the several corresponding figures.

The units 110 and 110A are housed within a pair of mounting frames or plates 48 and 49 which extend from and are supported at the rear of the upstanding frames 46 and 47 that support the blanket cylinder. The details of construction and arrangement are illustrated in Figs. 7, 7A, and 8, the overall association with the other units of the printing machine being illustrated in Figs. 1 and 2. As a means for driving the moving parts of the units 110 and 110A, a large gear 80 is fast on the main drive shaft 61 which mounts the plate cylinder 60, and this gear meshes with a gear 81 which drives a smaller gear 82. The gears 81 and 82 are intermediate or transmitting gears and hence can be carried on stub shafts journalled in the frame members 47 and 49 respectively. Each of the gears 80, 81 and 82 lies in the same plane as best shown in Fig. 1 and a third large gear 83 is off-set relative thereto, this latter gear being fixed to the same stub shaft which supports the smaller associated gear 82 so that the gears 82 and 83 rotate clockwise together. Lying in the same plane as gear 83 and driven thereby, is a gear train of smaller gears 84, 85, 86, and 87, gears 84 and 87 being associated, respectively with the units 110 and 110A in that these gears each constitute a means for driving the form rollers as well as drive links and arms that control operation of the fountain and ductor rollers. On the other hand, the gears 85 and 86 of this gear train are transmitting gears and therefore can be carried on stub shafts journalled in the frame plate 49 as shown in Fig. 8. Since gear 85 will be rotated clockwise, gear 86 will be rotated counterclockwise and hence can function as a convenient pulley drive for the belt 105 which is adapted to rotate the brush 103 in a clockwise direction as opposed to the path of advancing movement of the printing plates on the carrier 60.

As noted hereinabove, the units 110 and 110A are mechanically identical, the exception being that gear 84 rotates counter-clockwise while gear 87 rotates clockwise, and considering unit 110 alone there is, Fig. 7, a form roller 111, a distributor roller 112, a ductor roller 113, and a fountain roller 114, the latter being partially submerged in a fountain 115. The form roller 111 rotates in a counter-clockwise direction with the gear 84 and is adapted to apply a continuous film of repellent solution to the non-imaged areas of the printing plates as the latter are advanced by the plate cylinder 60 into the path of the continuously rotating form roller 111. In contrast to the freely rotatable condition of the ductor roller 113 which is rocked first in one direction and then in another by a means to be considered below, the fountain roller 114 is intermittently rotated step-wise in the fountain 115 by means including a drive link 118, Fig. 7A, which is journalled at one end on a pin 119 fixed eccentrically to the gear 84 so that the link 118 tends to be reciprocated back and forth by gear 84 as the latter is rotated counter-clockwise by the large transmitting gear 83. The other end of the reciprocable link 118 is journalled on a pin 120 fixed to a rocking pawl carrier 121 that is freely journalled at one end of a shaft 122, the latter being supported in the frame plate 49 as by a bushing bearing 122B as shown in Fig. 8. Fast on shaft 122 on the side of the pawl carrier 121 away from a retaining boss 123, is a ratchet 124 adapted to be actuated step-wise by a pawl 125 that is spring urged toward the ratchet as shown in Fig. 2, the pawl 125 being journalled on a pin 126 which projects from a side of the pawl carrier 121. As a means for regulating the effective stroke of the pawl 125 during counter-clockwise rocking movement of the pawl carrier 121, an adjustable shroud plate 127 is suitably journalled relative to shaft 122. The periphery of the shroud plate 127 is partly cut away as shown in Fig. 8 so as to afford an arcuate recess or slot 128, and the forward end of the pawl 125 carries a roller 129 that is adapted to ride on the raised or outside portion of the shroud plate 127. The diameter of the shroud plate 127 is such that when roller 129 is in a position such as shown in Fig. 8, the pawl 125 is held disengaged from the ratchet 124. However, the length of the roller 129 is such that it lies within the lateral boundaries of recess 128 in the shroud plate 127, and it will be seen that once the carrier 121 has been rocked counter-clockwise by the reciprocable drive link 118 to such an extent that the roller 129 overlies the recess 128, pawl 125 is spring urged downwardly to the slot 128 and thereupon into engagement with ratchet 124, and continued movement of the link 118 to the right as viewed in Figs. 2 and 7A, causes the ratchet 124, and therefore its shaft 122, to turn counter-clockwise. Shaft 122 extends on in to the housing defined by the frame plates 48 and 49 as shown in Fig. 8 and terminates in a bearing at one end of the fountain roller 114. As a means for rotating the fountain roller 114 with the ratchet 124, a collar 130 projects from and is fixed to one end of the fountain roller, this collar being keyed to a sleeve 131 which in turn is fixed to the rotatable shaft 122 as by a set screw.

In order that the fountain roller 114 can be rotated manually when required, the other end is also formed with a collar 132 which is keyed to a sleeve 133, the sleeve in turn being fixed to a shaft 134 that is received in the collar 132. The shaft 134 is supported for rotation in the frame plate 48 and terminates exteriorly of the frame plate 48 at a knob 135 which is fixed to shaft 134 whereby the fountain roller 114 can be manually rotated with ease by positioning the shroud plate 127 so that the roller 129 holds pawl 125 away from ratchet 124. Shaft 134 turns in a bushing bearing 134B.

Thus, it will be seen that as the counter-clockwise rotation of gear 84 is effective to reciprocate the drive link 118 of the plate conditioning unit 110 toward the right as viewed in Fig. 2 to rock the pawl carrier 121 counter-clockwise about the shaft 122, the roller 127 on the pawl 125 eventually rides off the raised portion of the shroud plate 127 whereupon pawl 125 engages ratchet 124. Continued movement of the drive link 118 toward the right causes pawl 125 to impart a counter-clockwise movement to the ratchet 124; and in turn shaft 122 and sleeve 131 rotate the fountain roller 114 counter-clockwise in the fountain 115. It will also be clear that once the eccentric pin 119 carried by the gear 84 is effective to reciprocate the drive link 118 toward the left as viewed in Fig. 2 to rock pawl carrier 121 clockwise about shaft 122, the pawl 125 slips clockwise back over the ratchet 124, shaft 122 remaining stationary during such return movement, and the roller 129 carried by the pawl 125 eventually rides up on the raised portion of the shroud plate 127 whereupon the pawl 125 again assumes a non-engaged position relative to the ratchet 124.

The fountain roller 114A of the unit 110A is rotated in a similar manner through a drive link 118A and an associated pawl carrier 121A. Though the gear 87 rotates clockwise in contrast to the counter-clockwise movement of gear 84, the links 118 and 118A still describe the same general type of left and right reciprocable movements inasmuch as it will be clear that the pawls are effective to rotate the ratchets during reciprocation to the right of the drive links 118 and 118A. It will be appreciated that certain of the moving parts described above are shown in somewhat different positions for purposes of clarity of disclosure.

Mention was made of the fact that the shroud plates 127 and 127A are adjustable. In this regard, it will be observed that the angle through which the pawl carriers 121 and 121A rock is determined by the length of the reciprocable strokes of the links 118 and 118A, the latter movements of course being predetermined by the diameter of the gears 84 and 87 and the location of the eccentric pins 119 and 119A carried thereby. Therefore, since the extent of rocking motion of the pawl carriers 121 and 121A is constant, the position of the recesses as 128 in each of the shroud plates relative to the pawl carriers determines the time at which the rollers as 129 ride off the raised portions of the shroud plates and engage the ratchets as 124. As a means for thus relatively locating the recesses as 128, each of the shroud plates is provided with a handle 136, 136A and a screw lock diagrammatically illustrated at 137, 137A, Fig. 2, such locks being adapted to bear against the raised portions of the shroud plates 127 and 127A to hold the latter in position on the sleeves which surround the shafts 122 and 122A. By loosening a lock as 137, the corresponding shroud plate can be turned by the handle as 136 to locate the recess as 128 relative to the corresponding pawl and pawl carrier, and in this manner the extent of rotation of the fountain roller 114 or 114A as the case may be, and therefore the quantity of liquid relayed from the fountain 115 or 115A to the ductor roller, can be regulated.

In addition to means controlling operation of the fountain rollers, the gears 84 and 87 also constitutes means that control rocking movement of the ductor rollers 113 and 113A through cam actuated drive arms 142 and 142A.

Thus, as best shown in Figs. 7 and 8, a shaft 140 which rotates with the gear 84 also has fixed thereto a symmetrical cam 141; that is to say, the cams 141 and 141A each rotate as the associated gears 84 and 87 rotate. Carried at one end on the arms 142, 142A are cam followers or rollers 143, 143A that are adapted to ride on the associated cams 141, 141A, and as shown in Fig. 2, the arms 142, 142A are urged toward the cams as by springs 150, 150A.

The other ends of the drive arms 142, 142A are each fixed to a corresponding rock shaft 144, 144A, and as shown in Fig. 8 these rock shafts extend between and are supported in the frame plates 48 and 49. Carried on each of the rock shafts 144 and 144A are yoke members as 145 which receives pins as 147 projecting from either end of the ductor rollers 113, 113A so that the ductor rollers are freely rotatable in the yoke members. As a means for preventing the ductor rollers from creeping out of the yokes during frictional rotation thereof, hook locks as 146 are pivoted on the yoke members at either end in position to embrace the pins and hold the same within the yokes. The cams 141, 141A and the springs 150, 150A, Fig. 2, effect periodic rocking movement of the ductors between the fountain rollers 114, 114A and the distributor rollers 112, 112A as follows. Mechanical operation is the same with both ductors, and considering unit 110A alone and referring to Figs. 7 and 7A, it will be observed that the ductor roll 113A is shown as being in engagement with the distributor roll 112A, cam follower 143A being urged into engagement with the low part of cam 141A by spring 150A, Fig. 2. As gear 87 rotates clockwise forcing link 118A for the fountain roller 114A to the left, the high part of cam 141A is brought clockwise around toward the follower 143A and eventually cams the follower upwardly of gear 87 and against the action of spring 150A, concomitant upward movement of arm 142A causing the rock shaft 144A to rock counter-clockwise. Accordingly, as shaft 144A rocks counter-clockwise, the yoke member 145A carries the ductor 113A toward the fountain roller 114A, the ductor contacting the fountain roller and being frictionally rotated clockwise thereby at about the time link 118A completes its left-hand movement under the influence of gear 87 and the eccentric pin 119A. It is desirable of course that the ductor 113A remain in contact with the fountain roller 114A during such time as the latter is actuated in order that an effective distribution of liquid be had in the roller train embodied in the unit 110A. This is to say, the ductors 113 and 113A should be rocked into sustained engagement with the fountain rollers during such time as the pawls 125 and 125A are stroked counter-clockwise by the right-hand movements of the drive links 118 and 118A. Such sustained engagement can be assured by properly configuring the high parts of the cams 141 and 141A. Continued clockwise rotation of the gear 87 now brings the low part of cam 141A back around toward the follower 143A, whereupon spring 150A is effective to draw the arm 142A radially inwardly relative to the shaft 140, and the ductor 113A is rocked away from the fountain roller 114A and eventually into engagement with the distributor roller 112A. As will be apparent from the description later to follow, the distributor roller 112A is rotated frictionally by the constantly rotating form roller 111A, and it will be seen therefore that the ductor and distributor rollers effect relay of liquid from the fountain to the form roller. Unit 110A is adapted, it will be recalled, to apply nothing more than clear water, if desired, to the lithographic printing plates D being advanced by the plate cylinder 60 from the preservative removing unit 100 into the path of the constantly driven form roller 111A. Such treatment of the printing plates D at unit 110A is designed to remove loose or residual foreign matter which may yet be adherent to the plates, thus conditioning the lithographic printing plates for further treatment at the next plate-treating unit 110. In this connection, it may herein be pointed out that the form roller 111A rotates in a clockwise direction with the gear 87 so that the scavenging action on the printing plates at unit 110A is opposed to the directional movement of such plates as they are advanced clockwise with cylinder 60 from the path of the constantly rotating form roller 111A into the path of the constantly rotating form roller 111 at unit 110 where a film of repellent solution of a known type is applied to the non-imaged, ink-rejecting areas of the lithographic printing plates D.

Operation of the ductor 113 of unit 110 is substantially the same as that for the ductor roller 113A described above, the only differences being that cam 141 is carried counter-clockwise with the shaft 140 and, as shown in Fig. 7, engagement of the cam follower 143 with the high part of cam 141 locates the ductor 113 against the fountain roller 114.

The form rollers 111 and 111A are driven through the gears 84 and 87 respectively. As shown in Fig. 8, the shaft 140 which carries both the gear 84 and cam 141 extends on into the housing defined by the frame plates 48 and 49, and is journalled in a bushing 147' that is supported in the frame plate 49. Fast on the inner end of the shaft 140 is a collar 146' which is formed with a disc 145', and it will be seen therefore that the disc 145' is driven counter-clockwise by gear 84 through the shaft 140. As a means for driving the form roller 111, the disc 145' is formed with a pair of flanges or fingers as 148 which are bent radially inwardly of the disc 145', and these driven elements 148 each engage sides of a segmented drive plate 151 which is fast on one end of the form roller 111. The form rollers are reversible in that there is a plate as 151 at either end, such plates being integral with plugs 149 that are inserted in and retained in place at the opposite ends of the form rollers 111 and 111A. The plugs 149 are each provided with bores and hence also constitute bearings free to turn on the supporting shafts as 153 of the form rollers 111 and 111A.

It will be observed that the form roller 111 is not directly driven by the shaft 140, but rather indirectly by the flanges 148, and this is so in order that the form roller may be adjustable relative to the printing plates D. Thus, the form roller 111 is freely journalled about a shaft 153, one end of which has an enlarged eccentric extension 152. The other end of the shaft 153 is formed with an eccentric stub 154 of reduced diameter that is journalled in one end of the drive shaft 140, the two eccentric portions 152 and 154 of the shaft 153 being on a common center. Eccentric portion 152 extends through the frame plate 48, being journalled in an eccentric bushing 156, and terminates at a handle 155 which is fixed thereon by an Allen screw 159. In turn, the eccentric bushing 156 is centered in a bushing 158 that is fast on the frame plate 48, the eccentric bushing 156 being locked against rotation as by an Allen screw 157. By loosening the Allen screw 159, the end of the shaft terminating at the handle 155 can be rotated slightly by a suitable tool so that the form roller will be moved as a body slightly toward or away from the plate cylinder 60 thereby adjusting and regulating the form roller pressure on the printing plates D. The adjusted position is maintained by means of a spring-urged detent (not shown) carried in the eccentric bushing 156.

It sometimes happens that the pressure exerted at opposite ends of the form rollers is uneven resulting in an unequal treatment of the printing surface of a particular printing plate. This condition may be remedied by loosening the Allen screw 157 in the bushing 158 and turning the eccentric bushing 156 so as to bring the end of the form roller 111, corresponding to the eccentric portion 152 of shaft 153, into line with the other end of the form roller corresponding to the eccentric stub 154. In this connection, it should be mentioned that the surfaces of the form roller 111 and the ductor roller 113 are of a soft or yieldable composition as, for instance, mulletin cloth and felt. The surface of the distributor roller 112 is preferably of linen, whereas the fountain roll 114 is preferably of a material capable of being knurled in order to assure an effective relay of fountain solution to the ductor.

In order that the shaft 153 which supports the form roller 111 can be withdrawn therefrom for lubrication, the eccentric bushing 156 mounts a spring-urged detent (not shown) which can be adjusted through a set screw 160 and a lock nut 161. This detent is adapted to engage one of a plurality of indentations in the periphery of the eccentric portion 152 of shaft 153 which is journalled within the eccentric bushing 156. A flange 162 rotatable with the supporting shaft for the form roller is formed with an opening (not shown), and when the handle 155 is turned against the aforesaid detent, Allen screw 157 being in engagement, to a point where the opening in the flange 162 is aligned with a retaining shoulder stud 163, the shaft may be withdrawn as a body from out of the form roller 111.

As shown in Fig. 8, bearings as 166 formed internally of the distributor roller 112 are free to rotate on a shaft 165 that is supported between the frame plates 48 and 49, and it will be seen that the distributor roller can be driven frictionally by the constantly rotating form roller 111 with which it is engaged.

It will be recalled the printing plates or devices as D are located in spaced relation with respect to one another on the outer peripheral portion or wheel 67 of the plate cylinder 60 by means of pairs of upstanding pins 68 that engage oppositely disposed openings 69, Fig. 3, centrally located in the sides of the printing plates, and also by means of a retaining channel 62 on either side of the plate cylinder 60. These retaining channels 62 slightly overlap the edges of the printing plates so as to prevent their radial displacement from the plate cylinder 60 and of course are of such size as to permit the form rollers 111 and 111A to bear against the printing areas of the plate.

After the printing plates have been scrubbed at the unit 100 and subsequently advanced into the paths of the form rollers 111 and 111A at units 110 and 110A respectively, the plates are next carried by the plate cylinder 60 clockwise as viewed in Figs. 7 and 7A to an inking unit 180, Figs. 7, 7A, 9, and 9A where the image areas thereof are inked and thus finally conditioned for transfer onto the blanket cylinder.

Figure 9:
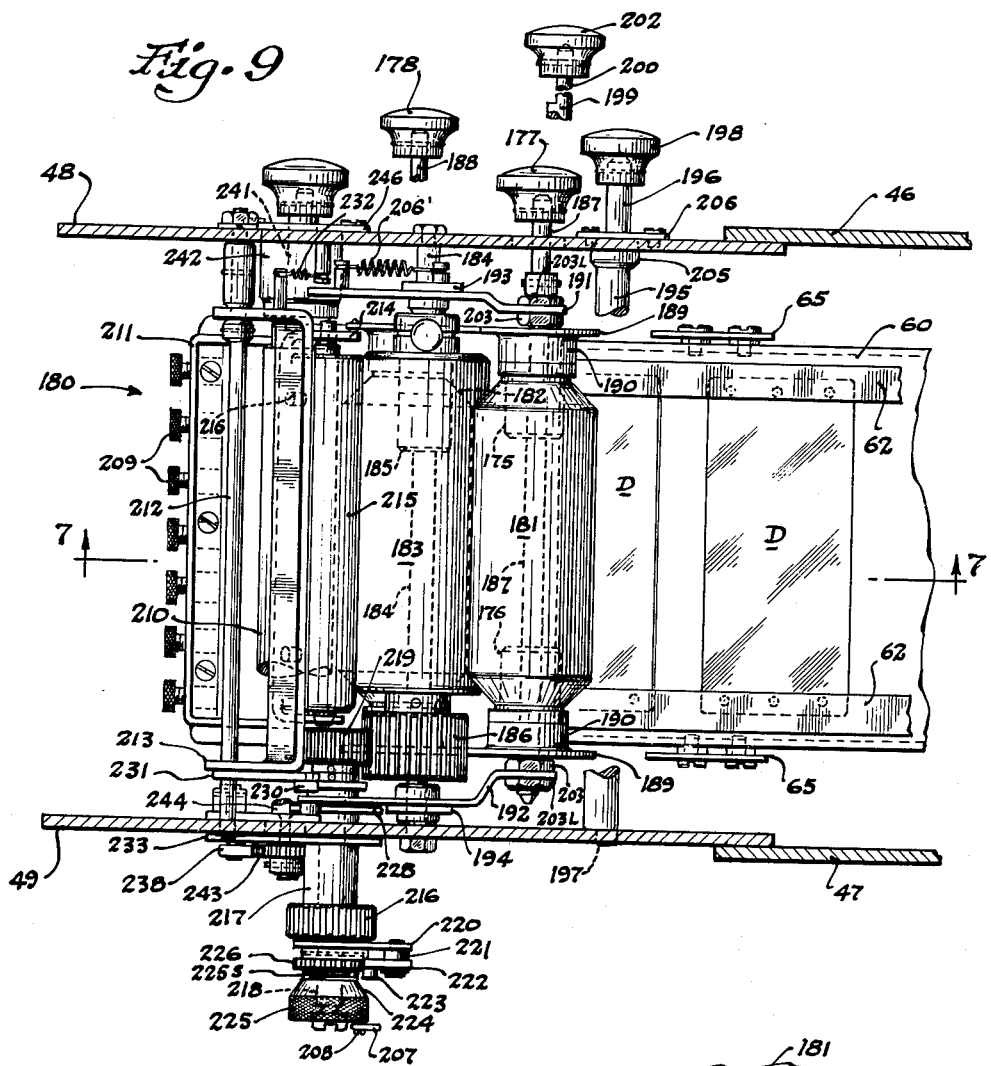
Fig. 9 is a fragmental plan view illustrating on an enlarged scale further details of the inking unit, being expanded substantially out along the line 9—9 of Fig. 7 so as to show more clearly the manner in which the actuating and driving means for the ink unit are associated with the inking rollers.
Figure 9A:
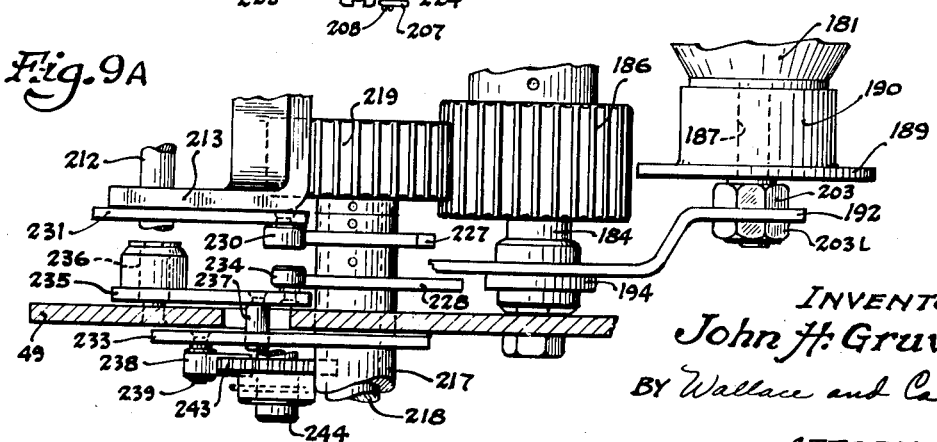
Fig. 9A is a fragmental plan view on a further enlarged scale of certain of the operating mechanisms associated with the inking unit shown in Fig. 9.

The inking unit 180 comprises a pair of form rollers 181 and 182 that are frictionally driven through an oscillating roller 183, the latter being adapted to be driven clockwise as viewed in Fig. 7 by means of a clutch controlled gear 186 in a manner to be described below. The oscillator 183 is shifted back and forth by a reversal mechanism of a known type including a spiral groove formed in a supporting shaft 184 and a dog (not shown) carried by the oscillating roller which dog is adapted to ride in the groove. As shown in Fig. 9 the oscillator 183 is formed internally at one end with a sleeve 185 and this sleeve receives the aforesaid shaft 184 extending between the frame plates 48 and 49 so that shaft 184 is centrally located relative to the distributor roller 183. The gear 186 and sleeve 185 are both pinned to shaft 184, and consequently rotation of the gear 186 is imparted to the oscillator roller 183. In turn, the form rollers 181 and 182 which are adapted to be driven through the oscillator 183 as shown in Fig. 7 are journalled on shafts 187 and 188 respectively. The shafts 187 and 188 are provided with knobs 177 and 178 whereby these shafts may be withdrawn from the form rollers, but instead of being supported in the frame plates 48 and 49, the shafts 187 and 188 are each rotatably supported at the ends of adjustable arms whereby the pressure of the form rollers 181 and 182 against the printing plates D may be regulated. In this connection it may be noted that the form rollers are provided with internal bearings as 175 and 176 which turn on the supporting shafts as 187. Thus, related pairs of arms 191 and 192, 193 and 194 are pivotable about opposite ends of the shaft 184 which supports the oscillator roller 183. Referring to Fig. 7, it will be seen that when the supporting arms as 193 for the form roller 182 are rocked clockwise about the shaft 184 the pressure exerted by the form roller 182 against the printing plates as D is lessened, and conversely. On the other hand, when the supporting arms as 191 for the form roller 181 are rocked clockwise about the shaft 184, the pressure exerted by the form roller 181 against the printing plates is increased and conversely. Such adjustment of the form rollers 181 and 182 is accomplished as follows. Adjacent the top of the frame plates 48 and 49 and extending therebetween are a pair of locating shafts 195 and 199, one for each of the pairs of arms 191, 192 and 193, 194 respectively. These locating shafts 195 and 199 are each formed at either end with eccentric stubs 196 and 197, 200 and 201, of reduced diameter. The stubs 196 and 200 are each journalled in a corresponding bushing as 205 formed integral with a disc as 206 which is supported in the frame plate 48 and the other or opposite eccentric stubs 197 and 201 are each journalled directly in the opposite frame plate 49. As shown in Fig. 7, the locating shafts 195 and 199 both lie between the arms as 191 and 193, and by turning the related knobs 198 and 202, Fig. 9, one or the other of these locating shafts can be turned toward or away from the arms 191 and 193. A spring as 206′ normally tends to draw the form roller supporting arms toward one another to the extent defined by the relative outside distance between the locating shafts.

In addition to being adjustable bodily relative to the plate cylinder, the form rollers 181 and 182 are each adjustable at one end relative to the plate cylinder 60. Such latter adjustments are made possible by providing eccentric nuts 203 formed with eccentric sleeves 204, Fig. 7, that receive the opposite ends of the form roller supporting shafts 187 and 188. By turning a nut as 203 at one or another end of one or the other form rollers, that end can be moved toward or away from the plate cylinder 60. Lock nuts 203L are associated with the nuts 203 and it will be observed that the ends of the arms 191, 192 and 193, 194 constitute the fixed means relative to which the eccentric means 203—204 may be turned.

Since the printing plates D are spaced from one another on the periphery of the plate cylinder 60, it is desirable that the spaces on the plate cylinder between the printing plate be maintained free of ink. Thus, spaced apart plates 65 are secured to either side of the plate cylinder 60 between successive pairs of printing plates D, and as shown in Fig. 9 the tops of these plates 65 project beyond the outer periphery of the plate cylinder 60 so as to be adapted to engage discs or raised portions 189 on collars 190 carried by the form rollers. In this manner, the form rollers 181 and 182 may be held away from the plate cylinder during the time that a new printing plate is being advanced into the path of the particular form roller.

Ink is relayed from a fountain roller 210 to the oscillating roller 183 through a ductor 215 that is mounted for rocking or shifting movement therebetween, the fountain roller 210 being partly submerged in a fountain 211. The fountain 211 is of a known type in that a scraper blade (not shown) is adapted to be adjusted relative to the periphery of the fountain roller 210 by means of a plurality of thumb screws 209 that can be turned in or out to position the blade for an even ink distribution. It is herein appropriate to point out that for purposes of more clearly illustrating structural embodiments, some of the parts shown in Fig. 9 have been separated and stretched out along a horizontal line in relation to the plate cylinder 60 of Fig. 7, the true operative relationship being shown in Fig. 7.

Positioned above the fountain 211 and extending between the frame plates 48 and 49 is a rod 212 that rotatably supports a first yoke member 213. In turn, the yoke 213 supports a second yoke member 214 as by rivets, pins at either end of the ductor roller 215 being journalled in the arms of the yoke member 214 so that when the yoke 213 is shifted or rocked on the rod 212 similar movement is imparted to the ductor. The movement of the ductor between the oscillating roller 183 and the fountain roller 210, as well as movement of the latter in the fountain 211, is under control of a common drive shaft 218, and clutch means are afforded whereby the drive to shaft 218 can be interrupted at will. Moreover, since the form rollers 181 and 182 can be completely disengaged relative to the plate cylinder 60 by means of the locating shafts 195 and 199 as above described, simultaneous disengagement of the clutch means therewith interrupts all movement in the inking unit 180.

As shown in Fig. 9, a gear 216 is located outside the frame plate 49 in a position to mesh with and be driven counterclockwise by the transmitting gear 83, Fig. 1. The gear 216 is journalled on a bushing 217 that is supported in the frame plate 49 and carries a plate 220 which rotates therewith. Fixed to the plate 220 is a pin 221 on which is journalled a pawl 222. Pawl 222 is normally spring-urged into a positive drive engagement with a ratchet 226 fixed to the drive shaft 218 so that as gear 216 is rotated counter-clockwise on bushing 217 by the transmitting gear 83, the drive shaft 218 is also driven counter-clockwise by means of pawl 222 and the associated ratchet 226. The drive shaft 218 is journalled in the bushing 217, and at the end thereof away from the ratchet 226 terminates at a gear 219 fixed thereto, the latter being meshed with the gear 186 which drives the oscillating roller 183 clockwise. Also fixed to the shaft 218 for rotation therewith are a pair of cams 227 and 228 that are adapted respectively to operate the ductor roller 215 and the fountain roller 210, and it is these two cams together with the gear 219, all fixed to the drive shaft 218, which constitute the main driving elements for the rollers comprising the ink train in unit 180.

As shown in Fig. 9, pawl 222 is provided with a roller 223 which normally assumes a limit position defined by pawl 222 drivingly engaging ratchet 226. On the outer end of the drive shaft 218 is a knob 225 spring-urged outwardly of and away from the ratchet by a spring 225S, and this knob is formed with a cam surface 224 which is adapted to engage roller 223 and thereby cam the pawl 222 out of engagement with ratchet 226. Thus it will be seen that the knob 225 and roller 223 constitute a clutch which, when disengaged as by pressing knob 225 in toward the ratchet 226, interrupts the drive to shaft 218. Interruption of the drive to shaft 218 is manifest in the pawl 222 being held away from the ratchet 226 with its roller 223 riding continuously about the cam surface 224 of knob 225, and under such conditions the two operating cams 227 and 228 which control movement of the ductor and fountain rollers to be described below, as with the gear 219, no longer receive a drive from the shaft 218. Consequently, when the form rollers 181 and 182 are lifted away from the plate cylinder 60 by turning the locating shafts 199 and 195 counterclockwise through substantially 180° as viewed in Fig. 7, all rollers in the inking unit 180 remain stationary. As a means for holding the clutch in, a catch 207 is pivotable on a pin 208 that is made fast to a side of the knob 225, and when the latter is pressed in against the action of spring 225S the catch 207 can be turned into an associated groove formed in shaft 218.

Considering now the operating cam 227 for the ductor roller 215, this cam is associated with a roller 230 journalled on a plate 231 which is fixed to the yoke member 213, and it will be recalled that the yoke member 213 is rotatable on the shaft 212 and carries another yoke member 214, the latter which supports the ductor 215. The ductor roller 215 is normally urged into contact with the oscillator 183 by means of a spring 232 tensioned between a pin fixed to the frame plate 48 and another pin fixed to the yoke member 213 as shown in Fig. 9. The cam 227 is symmetrical, and as shown in Fig. 7 the high portion thereof is adapted to engage the roller 230 during a counter-clockwise rotation with shaft 218 to cause the ductor roller to be shifted out of engagement with the oscillator and into engagement with the fountain roller 210 as against the action of spring 232.

Considering now the operation of the fountain roller 210, this roller is journalled on a shaft 241, Fig. 9, which is received in a bushing 242. The bushing 242 is integral with a disc 246 which is supported in the frame plate 48 so that the mounting of the shaft 241 is similar to that for the shaft 134 of the fountain roller 114 previously considered. The fountain roller 210 is rotated step-wise in the fountain 211 and about the shaft 241 by means including another shaft 244 which is driven by a ratchet 243 fixed at one end thereto. That is to say, the shaft 244 is adapted to drive the fountain roller 210 by means including sleeves (not shown) similar to the sleeves 130 and 131, described above in connection with the fountain roller 114. Ratchet 243 and therefore the shaft 244 is driven in a counter-clockwise direction when viewed from Fig. 7A as follows. Associated with the eccentric cam 228 is a follower 234 journalled at one end of an arm 235. In turn, the arm 235 is free to rock about a pin 236 that is supported in the frame plate 49. Positioned on the outside of the frame plate 49 is a pawl carrier 233 that is adapted to rock on one end of the shaft 244 and to this end is connected to the rocking arm 235 by means of a pin 237, the latter being extended through a slot provided in the frame plate 49. A pawl 238 is pivotably mounted on a pin 239 extending outwardly of the pawl carrier 233, and is urged into engagement with the ratchet 243 by a spring 240. It will be seen therefor that as the high part of the eccentric cam 228 is carried counter-clockwise by shaft 218 and engages the associated roller 234, arm 235 rocks clockwise on the pin 236 whereupon the pawl carrier 233 is carried counter-clockwise about shaft 244 by pin 237. Such movement of the pawl carrier is imparted to ratchet 243 and therefore shaft 244 through the associated pawl 238, and the fountain roller 210 accordingly is turned counter-clockwise in the fountain. As shown in Fig. 7A, the high parts of both of the cams 227 and 228 are substantially registered so that the ductor roller 215 engages the fountain roller 210 at about the time the latter is turned in the fountain 211, such engagement between these rollers being sustained throughout the time that the high parts of the cams 227 and 228 engage their respective followers 230 and 234. On the other hand, when the low part of cam 228 is presented to the follower 234 as shown in Fig. 7, a spring 245 is effective to rotate the pawl carrier 233 clockwise on shaft 244, pawl 233 skips back over the ratchet 243, and pin 237 which interconnects the pawl carrier and arm 235 returns the latter to its initial position as defined by the ductor roller 215 contacting the distributor roller 183.

The ink-receptive, greasy image A, Fig. 3, of the printing plates having been coated with ink at unit 180 subsequent to coating the non-printing areas with a repellent solution, the plates are in condition for off-setting ink on to a resilient transfer blanket 250 carried on a blanket cylinder 251, Fig. 2, which is rotating constantly in a counter-clockwise direction. The blanket 250 is of a type well known in the art in that it is adapted to roll into contact with an inked lithographic printing plate as D, whereupon the ink carried by the plate as D is transferred or offset on to the smooth, slightly yieldable, ink-receptive surface of the blanket 250. Since the greasy image A on the printing plates is in direct reading relationship, it will be appreciated that the offset images carried by the blanket 250 will be mirror or reverse. Images are offset successively and continuously as successive inked printing plates are advanced by the plate cylinder 60 into tangential contact with the blanket 250, such offset images being spaced apart on the blanket accordingly as the plates D are spaced on the plate cylinder. In this connection it should be herein pointed out that I have found that optimum results are obtained by using a blanket cylinder having substantially half the diameter of the plate cylinder. Thus, if the plate cylinder 60 is designed to carry 16 printing plates as D, the blanket cylinder 251 should be adapted to make a complete revolution for every half revolution of the plate cylinder 60, and in this manner each half of the blanket 250 normally carries four off-set images.

The blanket 250 is divided into halves, one end, as 250A of each half, Figs. 2 and 6, being slipped over a retaining means as a rivet 252 that is carried on a flange 253 made fast to the inner side of the blanket cylinder 251. The other end as 250B of each half is connected to a shaft as 254 which can be turned by a key in a known manner. The shaft as 254 carries a ratchet 255 that is adapted to be held in position by means as a dog 256, and it will be seen that by loosening dog 256 relative to ratchet 255 the shaft 254 can be turned to tension the blanket 250 that is associated therewith.

Considering now the drive means for the blanket cylinder station, it will be recalled that attention was earlier directed to the main drive gear 80 which rotates clockwise with the plate cylinder 60. Referring to Fig. 1, it will be observed that the gear 80 is in mesh with a transmitting gear 90, the latter being meshed with a smaller transmitting gear 91, Fig. 2, which has a shaft common to a larger transmitting gear 92. Thus it will be seen that the two transmitting gears rotate clockwise together. Gear 91 is meshed with a gear 93, the latter being fast on a shaft 258 which drives the blanket cylinder 251 counter-clockwise as viewed in Fig. 2; and since the blanket cylinder 251 is to be rotated twice for each rotation of the plate cylinder 60, gears 80 and 90 have twice as many teeth as the gears 91 and 93. It may be herein pointed out that gear 92 constitutes a drive for a gear train 96—97—98 which will be considered later in connection with the unit which applies a coating of preservative to the printing plates subsequent to their contacting the transfer blanket 250. Also, and referring to Fig. 1, it will be noted that the gears 80, 90, 91 and 93 lie in the same vertical plane relative to the printing machine, whereas the gears 92, 96, 97 and 98 are spaced away therefrom in a different vertical plane.

As will be clear from Fig. 2, images are off-set from the printing plates as D on to the transfer blanket 250 at a point where the advancing path of the printing plates is substantially parallel to that of the blanket, the pressure of the latter being so adjusted, by means to be described below, as to assure effective rolling contact with the inked printing plates. Successive ink images thus offset on to the transfer blanket 250 advance with the rotating blanket cylinder 251 toward a printing station generally indicated at 270, Figs. 1, 2 and 4. A guard plate 261 is afforded for the blanket cylinder, and this plate is formed with an opening that generally locates the printing station 270 whereat copy material such as a web W is advanced from a roll R into printing position beneath an impression cylinder 260 that presses the web W firmly against the image-carrying surface of the blanket 250. In this manner, the off-set images on blanket 250 are transferred in a direct reading relationship on to the under surface of the web W, the latter being frictionally advanced by the blanket 250 for reception of successive images in accordance with advancing counter-clockwise movement of the blanket cylinder 251.

As shown in Figs. 1 and 2, the impression cylinder 260 is supported from a pair of arms 262 that are fast on a rock shaft 263, the latter being supported between the frame plates 47 and 48. Also, fast on the rock shaft 263 at one end thereof is an arm 264 that is urged counter-clockwise by a spring 267 so that the impression cylinder 260 is accordingly urged toward the blanket cylinder 251. As a means for regulating the force of the impression cylinder against the blanket 250, a handle 266 is fast on a shaft to which is fixed a cam 268 that is disposed behind the lower extension of arm 264, and it will be seen that by turning handle 266 clockwise as viewed in Fig. 1, cam 268 will be brought to bear against the lower extension of arm 264 so that the impression cylinder 260 will thereby be carried away from the blanket 250.

One of the most troublesome problems in lithographic printing is maintaining the printing surface of the transfer blanket in a clean condition, and this problem is especially acute in those instances where the blanket receives and prints dissimilar data. Such problems are engendered not only by flecks of dried ink on the blanket but also by "ghost" images that remain after printing, and accordingly the present invention embodies a blanket cleaning means generally indicated at 280 which is quite similar structurally to the units 110 and 110A previously considered. Thus, as shown in Figs. 2 and 4, the members of the blanket cleaning unit 280 are located in a housing defined by a pair of upstanding frame plates 74 and 75 that are secured to the tops of the frame plates 47 and 48. A ductor roller 281 is adapted to rock between a fountain roller 282 and a distributor roller 283 to relay blanket cleaning solution of a known type from a fountain 284 to a form roller 285. As shown in Fig. 1, the drive means for the unit 280 emanate from a gear 95 that is meshed with a transmitting gear 94, the latter in turn being driven clockwise by the gear 93 which drives the blanket cylinder 251. Gear 95, which is driven counter-clockwise, drives the form roller 285 precisely as gear 84 drives the form roller 111 of unit 110 and also carries an eccentric pin 286 that is connected to one end of a drive link 287. At the other end, link 287 is secured to a shiftable plate 288 which carries a pawl 289, the latter being spring-urged toward a ratchet 293 that is adapted to drive the fountain roller 282 stepwise in the fountain 284 precisely as ratchet 124 drives fountain roller 114, Fig. 8, in the fountain 115. A shroud plate 290 is adjustable relative to the pawl carrier 288 by means of a handle 291 and a lock screw assembly 294'.

The ductor roller 281 is journaled in a yoke 294 which is fast on a rock shaft 295, and shifting of the ductor between the fountain roller 282 and the distributor 283 is controlled by an arm 296. At one end, arm 296 is fast on a rock shaft 295 and this arm is actuated up and down to turn shaft 295 first in one direction and then in another precisely as the arms 118, 118A, Fig. 7A, turn the shafts 144, 144A. The other end of arm 296 carries a cam follower 297 that cooperates with a cam 298 fast on a shaft 299, the latter being rotatable counter-clockwise with gear 95, Fig. 2. The arm 296 is normally spring-urged toward the cam 298 so that when the low part of the latter engages the follower 297 as shown in Fig. 4, the ductor 281 engages the distributor roller 283. On the other hand, when the high part of the cam 298 is disposed beneath the follower 297, the ductor 281 is rocked counter-clockwise as viewed in Fig. 4 into engagement with the fountain roller, such rocking of the ductor occurring at about the time link 287 is reciprocated toward the right by pin 286. As with the form rollers 111 and 111A, the form roller 285 can be adjusted relative to the blanket 250 by means including an eccentric shaft 300—301, Fig. 4, similar to shaft 153—154, Figs. 7 and 8.

From the foregoing it will be seen that the blanket cleaning unit 280 is similar in every detail, both in the manner of mounting and operation, to the plate moistening unit 110. This similarity is carried further by driving the form roller 285 from gear 95 precisely as the form roller 111, Fig. 8, is driven from gear 84. Moreover, the form roller 285 is adjustable both bodily and at one end relative to the blanket 250 by means similar to those previously considered with respect to the form roller 111 and including a shaft 300 having an eccentric stub 301. As a means for supplying the fountain 284, there is provided a tank or bottle 305 having a conduit 307 which is adapted to be coupled with another conduit 306 of the fountain 284, and it will be clear enough that the fountains 115 and 115A may be supplied in a similar manner.

In order that the blanket cylinder 251 may be adjusted relative to the plate cylinder 60 to thereby regulate the pressure of the blanket 250 on the printing plates as D, the drive shaft 258, Fig. 2, for the blanket cylinder is journalled in eccentric means as eccentric bushings 272 (one not shown) positioned on either side of the blanket cylinder and behind the frame plates 46 and 47. These bushings as 272 are each formed integral with a corresponding plate as 273 that is rotatable relative to the drive shaft 258. The center of rotation of the plates as 273 is determined as by bolts 276 that are positioned in the frame plates 46 and 47, the shanks 276 of these bolts being extended into arcuate slots 275 provided in the rotatable plates as 273 so that the latter can be turned about the drive shaft 258 within limits. The plates as 273 are each provided with projections 273A and pins 277 are fixed to the forward portions thereof so that the eccentric bushings 272 can be adjusted by means of vertical forces applied to the pins 277.

Fast on a shaft 279 that is journably received in the frame plates 46 and 47 is a right-angled arm 278, the end of the horizontal portion of this arm being provided with a slot 278A which receives the pin 277. Another arm (not shown) is fast on the other end of the shaft 279, and the horizontal portion of this other arm is similarly connected to a rotatable plate (not shown) that carries the other eccentric bushing for the drive shaft 258. The vertical portion of arm 278 projects above the frame plates 46 and 47 as shown in Fig. 2, and it will be clear that both eccentric bushings as 272 can be turned simultaneously by moving the arm 278 in one direction or another. Thus, for instance, if arm 278 is shifted clockwise as viewed in Fig. 2, both pins as 277, and therefore both plates as 273, are turned counter-clockwise about either end of the drive shaft 258, and in turn the eccentric bushings as 272 which turn with plates as 273, relocate or adjust the pressure of the blanket cylinder 251 relative to the printing devices D. As a means for holding this adjusted position of the blanket cylinder, each of the arms as 278 may be provided with a pin as 271 which is adapted to ride in a slot as 271A provided in either frame plate 46 and 47, a rotatable lock as 271B of a known type being mounted on these frame plates and adapted to hold the pins as 271 in their adjusted positions.

One of the aspects of the present invention is that lithographic printing plates, as for instance aluminum plates or foils, can be used for literally thousands of individual impressions without the need for replacement or revitalizing the lithographic printing surfaces. Such is partly accounted for by the use of a plate preserving unit 310, Figs. 1, 2 and 5, that is located in position to apply a coating of preservative such as gum arabic to the printing plates D subsequent to the latter offsetting ink images on to the transfer blanket 250. It will be appreciated that the greasy, adherent image A, Fig. 3, is not itself offset on to the blanket 250, but rather the film of ink which is applied to such an image at the unit 180. That is to say, the non-printing areas as B on the plates D receive a bath of ink-repellant or oleophobic material such as water at the unit 110 whereas the images as A, being of a greasy material, reject the repellant; consequently, when ink is applied to the plates D at the unit 180, such clings in a film-like manner only to the images as A remaining adherent to the lithographic printing plates.

As shown in Figs. 1 and 2, the plate preserving unit 310 is housed between a pair of frame plates 76 and 77 supported on the upstanding frame plates 46 and 47 and comprises a form roller 311, a distributor roller 312, a ductor roller 313, and a fountain roller 314 partially submerged in a fountain 315. Since the unit 310 is identical in operation to the blanket cleaning unit 280 and the plate treating units 110 and 110A, it is believed that a discussion of operation is unnecessary, and a description will therefore be had of the various parts only.

As shown in Fig. 5, the form roller 311 is driven counterclockwise by a gear 98 that is carried on a sleeve 317, the latter constituting a drive shaft for the form roller. In this connection, it may be noted that since the form roller 311 is adapted to apply a coating of preservative to the plate D after ink impressions have been lifted or offset from the latter, and since this operation is one that does not normally require perfection insofar as an even or uniform treatment of the surface of the plates D is concerned, it is not necessary to afford eccentric means for adjusting the form roller 311 relative to the printing plates. However, such means, including eccentric projections on a normally stationary shaft 318 on which the form roller shaft 317 is journaled and an eccentric bushing for one end of this shaft, may be afforded if desired or found to be necessary. Gear 98 is driven counterclockwise by the intermeshing gears 96 and 97, gear 96 being driven by the larger intermediate gear 92.

Rotatable with shaft 317 is a cam 319 that cooperates with a follower 320 carried on end of an arm 321, the latter being fast on a rock shaft 322 which is adapted to shift a supporting yoke 323 for the ductor 313 between the distributor roller 312 and the fountain roller 314. Gear 98 carries an eccentric pin 325 to which one end of a drive link 326 is connected, the other end of the drive link 326 being connected to a pawl carrier 327, Fig. 2. Since the fountain roller 314 is turned step-wise in the fountain 315 by means including a ratchet and cooperating pawl 328, Fig. 2, precisely as are the fountain rollers 114 and 114A of units 110 and 110A, it is believed that further explanation in this regard is unnecessary.

As a means for driving the printing machine manually, a hand wheel 79, Fig. 1, is journalled for rotation in the frame plate 47 and carries a gear 99 that is meshed with gear 92. In addition to driving the plate preserving unit 310, gear 92 also constitutes a drive for a plate-retracting station 330, Figs. 1, 10–13, and 15, the members of which are supported between a pair of frame plates 72 and 73 that extend rearwardly from the frame plates 46 and 47 respectively.

As shown in Fig. 10, the plate cylinder 60 is provided with spaced-apart recesses 59 that underlie the leading edge portions of the printing devices D, and the plate retracting unit 330 comprises a pair of finger-like levers 331 that are spring-urged toward the periphery 67 of the plate cylinder 60 so as to intercept the path of the printing plates D advancing from the preservative unit 310. Such fingers are adapted to "pick" the printing plates D off the plate cylinder 60 whereupon the plates are conveyed by a pair of endless bands or belts 332 to a storage magazine S and sequentially deposited therein. Jack means generally indicated at 350, Fig. 13, are adapted to periodically lower the magazine S one step accordingly as the endless bands 332 advance the printing plates from the plate cylinder 60 to the storage magazine. Since the printing plates D have been freshly coated with a preservative at the unit 310, drier means 360 comprising suitable heating and drying elements, Figs. 1 and 10, may be supported above the conveyor bands 332 in position to "set" the preservative coatings on the used printing plates.

As a means for driving the moving parts of the plate retracting unit 330, shaft 317 for the gear 98, Fig. 5, has a sprocket 325', Fig. 16, fixed thereto, and this sprocket drives a chain 326' that in turn drives another sprocket 333. The sprocket 333 is fast on a shaft 334 that is mounted for rotation in the frame plates 72 and 73, and it will be seen that shaft 334 is driven counter-clockwise as viewed in Figs. 1 and 10. Also carried at one end of the driven shaft 334 is a gear 335 that is meshed with a gear 336, the latter being adapted to drive a shaft 337 which extends parallel to shaft 334 in the frame plates 72 and 73. The driven shaft 337 carries a pair of pulleys 338 which are adapted to advance the conveyor belts 332 in a clockwise direction as viewed in Fig. 10 in cooperation with another pair of pulleys 339 carried on a rearward shaft 340. At one end of the shaft 340 is a gear 361 which will be considered later in connection with the jack means 350, and at one end of the shaft 337 is a sprocket 341 that will be considered later in connection with the plate feeding means.

As shown in Fig. 11, the picker levers 331 are journalled on the shaft 337 and are spaced apart from each other a distance slightly less than the distance between the plate mounting pins 68 carried by the plate cylinder 60. As the plate cylinder 60 rotates clockwise as viewed in Fig. 10 to advance the printing plates from the preservative units 310 toward the picker levers 331, the leading edges of the plate first engage the upper surfaces of the latter and are forced therealong in the direction of the conveyor belts 332 by the mounting pins 68 on the plate cylinder, which mounting pins still engage the openings 69, Fig. 3, centrally located at opposite sides of the printing plates D. During such movement along the upper surfaces of the picker levers 331, the printing plates D will tend to be forced along a linear path away from the plate cylinder, and to this end the retaining channels 62 are bent outwardly of the plate cylinder and are discontinuous at the plate retracting unit 330. Located above the picker levers 331 in position to engage the upper or printing surface of the plates D are a pair of disc-like friction rollers 342 which rotate with shaft 334. As shown in Fig. 10, the ends of the recesses 59 in the plate cylinder 60 are inclined or cammed upwardly so that the picker levers 331 will be pivoted clockwise away from the plate cylinder 60 as continued clockwise rotation of the latter brings the ends of the recesses 59 into engagement with the corresponding ends of the picker levers 331, in which case the printing plate as D to be retracted will be completely disengaged relative to the fixed mounting pins 68. Concomitantly with such disengagement, the leading edge of the being-retracted printing plate is wedged between the picker levers 331 and the rotating feed rollers 342, and the latter are now effective to advance the printing plates toward the conveyor belts 332. It will be appreciated, in this connection, that the lithographic printing plates of the type adapted to be used in the present instance are relatively thin, as for instance zinc or aluminum foil that possess lithographic properties, and are therefore quite flexible.

The conveyor belts 332 each carry a plurality of spaced-apart mounting pins 338, Fig. 10, that are adapted to engage the centrally located openings 69 in the printing plates and accordingly the pins 338 are spaced-apart on the conveyor belts a distance corresponding to the spacing between adjacent pairs of pins 68 on the plate cylinder 60. In other words, the speed of the belts 332 and the spacing between the pins 338 thereon is such that the pins 338 align themselves with the openings 69 on the sides of the printing plates D as the latter advance between the picker fingers 331 and the feed rollers 342 toward the conveyor belts 332. While the use of retaining or positioning means such as the pins 338 is not absolutely essential, it is to be preferred especially when operating at high speeds. Accordingly, the linear speed of the conveyor belts 332 and that of the feed rollers 342 will be equal to that of the linear speed of the printing plates D on the plate cylinder 60, such speeds being synchronized by proper gear ratios in a known manner.

Thus it will be seen that after each printing plate is coated with preservative by the form roller 311 at the preservative unit 310, the printing plate advances with the plate cylinder 60 until the leading edge assumes an outwardly diverging path as determined by engagement thereof with the upper surfaces of the picker levers 331. Complete retraction of the printing plates from the plate cylinder 60 is accomplished by means of picker levers 331 and feed rollers 340 that together cooperate to sequentially advance the thus-retracted printing plates on to the conveyor belts 332. As a means for collecting and storing the preserved plates D, a magazine S is located adjacent the rearward ends of the frame plates 72 and 73 with its open front facing a pair of superimposed and engaged feed rollers 343 and 344. The rollers 343 and 344, Fig. 10, are adapted to feed the leading-most printing plate D on the conveyor belts 332 in to the magazine S, and hence are so located relative to the ends of the conveyor belts as to assure the rearward-most top pins as 338 feeding the leading-most plate as D into the bight between the rollers 343 and 344. The roller 344 is directly driven through a gear train 361—362—363, Fig. 11, gear 361 rotating clockwise with shaft 340 that carries the pulleys 338. The feed roller 343 is supported for rotation in a pair of spring-urged arms 345 so that roller 343 tends to be driven frictionally counter-clockwise by the associated feed roller 344.

As a means for lowering the magazine S step-wise as the printing plates D are fed sequentially thereto by the rollers 343 and 344, an upstanding rack 351, Fig. 13, is secured to the bottom of this magazine, and pivotally mounted on the frame plate 73 is a pawl 352 that is normally spring-urged into engagement with the teeth of rack 351. Secured to the end of a shaft 346, Fig. 11, which carries the feed roller 344, is a disc 354 and this disc carries a pin 353 which is adapted to periodically engage the vertical arm of the pawl 352. It will be clear that the pin 353 momentarily pivots pawl 352 out of engagement with respect to rack 351 once for each rotation of the disc 354, and accordingly the magazine S is lowered one step on a fixed guide rod 355.

As was noted above, a sprocket 341, Fig. 16, is carried at one end of the shaft 337 and is adapted to drive a chain 371 that in turn drives the members of the plate feeding means generally indicated at 370, Figs. 1, 14, 14A, and 15. The plate feeding means comprises a supply magazine M which rests on a channelled table 379, Fig. 1, this table being supported on a pair of frame plates 70 and 71 that extend rearwardly of the main supporting frame members 42 and 43. The magazine M is only partially closed at the front as shown in Fig. 15, and the printing plates D are advanced one-by-one from the bottom thereof on to the plate cylinder 60 by means including a pair of feed wheels 372 and 373 and a cam-controlled picker pawl 390, Fig. 14, of a known type. These feed means are driven by the chain 371, Fig. 16, which interconnects the sprocket 341 on shaft 337 with another sprocket 374 that is carried at one end of a stub shaft 375. The stub shaft 375 is journalled in the frame plate 70, Fig. 15, and at the other end carries a gear 376. Gear 376 is meshed with a gear 377 that is fast on one end of a shaft 378, the latter being supported for rotation in the frame plates 70 and 71. As viewed from the position in Fig. 15, it will be observed that the shaft 378 is driven counter-clockwise through the intermeshing gears 376 and 377 and the chain-and-sprocket drive 341—371—374.

Rotatable counter-clockwise with shaft 378 are a pair of feed wheels 372 and 373 that are each provided with two sets of upstanding pins as 380, there being three such pins in each set, and it is these pins which guide and feed the printing plates D on to the plate cylinder 60. Carried on shaft 378 intermediate the two feed wheels 372 and 373 is a wheel 381 that has a half-cycle cam 382 fixed thereto. Cam 382 controls the pawl means that feeds the printing devices one-by-one from the bottom of the supply magazine M, and to this end a cam follower 383 is adapted to be engaged twice for each complete rotation of shaft 378. The cam follower 383 is carried at one end of an arm 386 that is free to rock on a shaft 385, and a spring 386S normally urges the follower 383 toward the cam 382. Periodic rocking movement of the arm 386 is imparted to another arm 388 through a link 387, the arm 388 being pivotable on a shaft 389. At the upper end of the arm 388 is a picker pawl 390 of a known type that is adapted to slide along the bottom of the magazine M and beneath the lowermost one of the printing plates positionable therein either while feeding another and different printing plate from the magazine toward the feed wheels or while moving rearwardly of the magazine to engage the trailing of the said lowermost printing plate. As shown in Fig. 14, the picker pawl 390 may be nothing more than a flat plate provided with an upstanding hook or edge of a height equal to or preferably somewhat less than the thickness of one of the printing plates D, and is provided with a depending ear 393 which is connected to the upper end of the arm 388 as by a pin in a known manner. The rear of the magazine M is formed with an opening, Fig. 1, that is aligned with the channel in table 379 in which the picker pawl reciprocates such opening in the magazine permitting partial egress of the picker pawl 390 relative to the magazine M as shown in Fig. 14A so that the hook element of the picker pawl is positioned behind the rearward or trailing edge of the lowermost plate in the magazine. The action of the picker pawl 390 is such that it is adapted to force the lowermost one of the plates D in the magazine M toward and partially through an opening or throat 392, Fig. 14, at the front of the magazine M, thus to locate such a plate in position such that the openings 69L, Fig. 3, therein will be engaged by leading pins as 380L in the sets of pins 380 on the constantly rotating feed wheels 372 and 373. The throat has a width and depth corresponding to the width and thickness respectively of the plates D so as to further assure that the plates are fed and withdrawn one-by-one from the magazine M.

As will be clear from Figs. 14 and 14A, each set of three pins as 380 on the feed wheels 372 and 373 corresponds to a different printing plate being advanced on to the plate cylinder 60; that is to say, two printing plates are fed from the magazine M for each complete rotation of the wheels 372 and 373. As with the pins 338 on the conveyor belts 380, the linear speed of the pins as 380 on the feed wheels will correspond to the linear speed of the retaining pins 68 on the plate cylinder 60, and of course such speed relationship must also hold true for the picker pawl 390. The pins as 380 are spaced apart from each other in each set a distance corresponding to the spacing between the three openings 69, 69L, and 69T provided along each side of the printing plates D, Fig. 3, so that there is one pin for each opening thus assuring an effective advancement of the printing plates on to the plate cylinders. It will be appreciated that the plates D are mounted face up on the plate cylinder 60 and accordingly are stacked face down in the supply magazine M. In Fig. 14, one operating position of the plate feeding means 370 is illustrated, and it will be observed that a printing plate $D_1$ has just been mounted on a retaining pin $68_1$ carried by the plate cylinder 60, the trailing pin 380T in the left set of triple pins 380 being withdrawn, at this time, from the trailing opening 69T, Fig. 14A, in the printing plate $D_1$. Under such conditions, the next printing plate $D_2$ to be mounted on the plate cylinder 60 has been fed through the throat 392 at the front of magazine M by the picker pawl 390, the top side of the latter spacing and holding the next lowermost printing plate away from the bottom of magazine M. This condition is manifest in a high part as 382H of the cam 382 engaging the cam follower 383, Fig. 14. Now, as the cam-carrying wheel 381 rotates counter-clockwise from the position in Fig. 14 to the position in Fig. 14A, a low part as 382L of the cam 382 is brought around toward the follower 383; concomitantly, spring 386S, through link 387, rocks arm 388 clockwise on shaft 389, and the picker pawl 390 is carried backward away from plate D₂ to the limit position shown in Fig. 14A, whereat it is in position to feed a new printing plate through the throat 392. During the time that cam 382 is being turned from a substantially horizontal position to a substantially vertical position, the pins as 380L on the feed wheels 372 and 373 are carried up toward the leading end of plate D₂ which end projects into the path thereof, and such pins engage the openings as 69L in the plate D₂ at about the time follower 383, Fig. 14A, is on the low part 382L of cam 382. Accordingly, continued counter-clockwise rotation of the wheels 372 and 373 causes plate D₂ to be fed toward the mounting pins as 68₂ on the plate cylinder 60, a deflection plate 395 being afforded to curve the thus-fed plates and thereby render the openings as 69L therein more accessible to the mounting pins on the plate cylinder. At about the time the middle pin 380 associated with the pin 380L engages the central opening 69 in the plate D₂, the picker pawl 390 is shifted from right to left as viewed in Fig. 3 to feed the lowermost printing plate in the magazine M to and through throat 392.

It will readily be seen that insofar as the retraction of the printing plates from the plate cylinder and the feeding of the same on to the latter is concerned, it is important that correct timing be maintained between the retracing and feeding units, 330 and 370 respectively. From Fig. 16, it will be appreciated that this aspect of the present invention is manifest in a driving connection 326'—335—336—371 between the two so that assurance may be had that the linear speed of both units will conform to the linear speed of the plate cylinder which mounts the printing plates; that is to say, the linear speed of the plate feeding pins 380 will correspond to that of the plate retracing pins 368 and the latter to the speed of the plate cylinder 67.

Instead of employing a separate unit for applying a repellant solution to the non-imaged areas B of the printing device as D and a separate unit for thereafter inking the imaged areas A, both units may be combined into one as shown in Fig. 18, thereby eliminating the need for the unit 110 previously considered. The combined moistening and inking unit shown in Fig. 18 comprises many of the old elements of the inking unit 180 together with an additional unit 400 that is located below the ink fountain roller 210 and the oscillating roller 183. The aspects of the unit 400 are described in detail in the co-pending application of Franklin E. Curtis, Ser. No. 120,776, filed October 11, 1949, and for present purposes therefore, it may be pointed out that the unit 400 comprises a water fountain 404 having front and back walls 402 and 403 and a bottom wall 401. The fountain may be supplied from a bottle as 405 just as the other fountains in the machine may be similarly supplied. At the end of the fountain 404 is a train of three rotatable rollers 407, 408 and 409 that are in engagement one with another. The lower roller 407 is adapted to be immersed in the fountain while the upper roller 409 engages the oscillating roller 183. Thus it will be seen that water or other aqueous repellant as well as ink will be associated on the roller 183, the greasy image A on the plates as D being receptive only to the ink phase of the water-ink emulsion that will be formed on the roller 183, and the hydrophilic-oleophobic areas B on the plates as D being receptive only to the water phase of the said emulsion.

The roller 409 is in engagement with the oscillating roller 183 and this roller is in spiral form, having a continuous groove 409G and land 409L, such permitting a control over the amount of liquid supplied to the printing plates moving beneath the form roller 181. The mounting shafts for the roller 407, 408 and 409 are each journalled in rectangular bearings that are slidably mounted in opposite and upwardly inclined slots as 410 at the forward end of the fountain 404. In attaining proper control of the amount of repellant solution that is thus supplied through the three-roller train, an adjustment of the pressure between the rollers 407, 408, and 409 may be had. To this end, there is provided a pair of pins as 412 aligned axially with the slots as 410 so that by moving the pins upwardly in the slots 410 and against the bearings of the lower roller, the pressure between the rollers can be adjusted. The other or lower ends of the pressure adjusting pins 412 are bevelled and are adapted to be engaged by similarly bevelled ends of regulating screws as 414, each of the latter being provided with an actuating knob as 416. Thus by turning the regulating screws in, the associated pressure pin is forced upwardly of the slot as 410.

As illustrative of a further embodiment of the present invention, there is shown in Figs. 19–39 a form of machine in which the printing devices travel along a generally horizontal path from a supply magazine at one end of a machine 500 to a receiving or storage magazine at the other end. As the printing devices travel along such a path, they are each exposed to several surface treatments, prior to the transfer of the image on to the blanket cylinder, and are thereafter coated with a preservative so that the delineated greasy image as well as the non-imaged areas of the plate shall be maintained in an ideal lithographic condition during periods of non-use. The flat-bed form is generally indicated at 500 and is supported by vertical legs 501 and longitudinally extending beams 502 and 503 that together comprise the main supporting frame structure of the machine. Extending between the upper oppositely disposed longitudinal ties 503 are a plurality of flanged supports or transverse tie bars as 504 which support most of the machine as will be pointed out hereinbelow, and supported on a platform between the lower oppositely disposed longitudinal beams 502 are two motors, M–1 and M–2, and a pump P that is adapted to supply air to a dryer for the blanket cylinder which will be considered below. The motor M–1 constitutes a drive means for the pump P, while the other motor M–2 constitutes the main source of power for the machine 500.

As indicated descriptively in Fig. 20, lithographic printing plates similar to D, Fig. 3, are advanced by a plate feed from one end of the machine to a plate stacker at the other end by means of paired chains 520 each of which consists of anti-whip guide links of a known type which afford a non-bending horizontal run for the printing plates and yet allow for the usual turning about a sprocket drive 519—521. The plate feed mechanism is adapted to locate the printing devices in spaced relation on the chains 520 with the printing faces thereof being up. Fixed pins located on the chains first carry the plates from the supply magazine to a preservative remover where the protective, preservative-coating that overlies the lithographic surface of each plate is removed prior to the non-imaged areas of the plates being moistened with a repellant of a known type as a repellant fountain. Preferably, a plate cleaner is afforded in order that loosely adherent preservative, lint, or the like that escaped the action of the preservative remover may be purged from the surface of the printing plates. Following the conditioning of the non-imaged areas of the plates, the latter continue to be advanced by the conveyor carriage 520, 520 along a horizontal path to the inking unit whereat the portions of the lithographic plates bearing the original greasy image receive ink, the already moistened, non-printing areas of the plates being incompatible with the lithographic ink whereby ink is restricted to the image areas only. Having been inked, the plates are in condition for the usual off-setting operation and this operation is effected at the offset station where the ink carried by each plate is successively transferred on to a rotating blanket, the plates thereafter each continuing along the aforesaid horizontal path. The rotating blanket carries each offset image to a printing station where copy material from a paper feed is pressed thereagainst by an impression cylinder which defines the printing station of the machine 500. In order that the blanket may be maintained in a clean condition, a blanket cleaner is afforded.

Following engagement with the blanket at the offset station, the plates are next exposed to a preserving action by a plate preserver, and then each plate may be dried by a plate dryer. Finally, the plates are stripped from the carriage 520, 520 at the other end of the machine and stacked in and by a plate stacker.

As will be pointed out in more detail below, the various plate treating units described above are adapted to be mounted in the machine and locked in position while supported on the brackets as 504 that are secured in place between the longitudinally extending beams 503.

Figure 36:
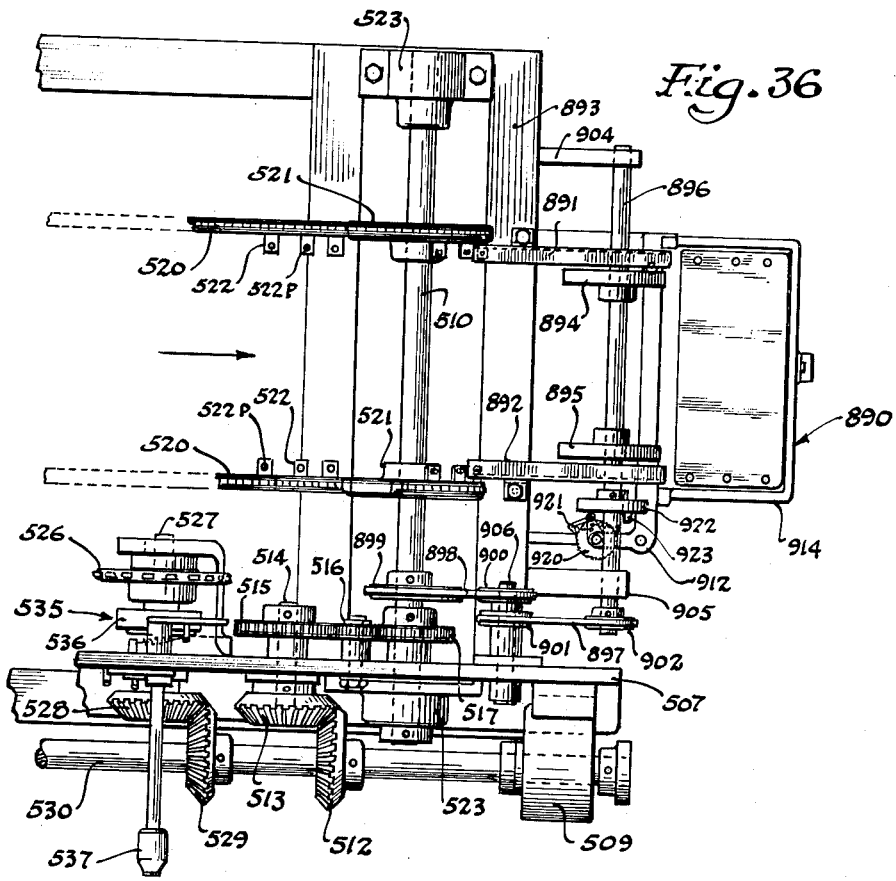
Fig. 36 is a fragmental plan view on an enlarged scale of one end of the machine shown in Fig. 19.

The top run of the conveyor 520, 520 is driven from left to right in the machine as viewed from Figs. 19 and 20 so that the printing plates thereon will be advanced one by one past the various units arranged in tandem, along the top run of the conveyor, opposite ends of the conveyor being looped about rotatable sprockets 519 and 521. The left sprocket 519 is an idler sprocket in contrast to sprocket 521 which is adapted to be driven by means including a chain and sprocket drive 526—525 that is driven from the motor M-2 as indicated in Figs. 19 and 20 and in more detailed respects in Figs. 33, 36, and 37. Thus, as best shown in Fig. 36, two end sprockets 521, 521 are fast on a shaft 510 that is journalled in a pair of bearings 523, 523 mounted on fixed supports in the machine, and this shaft 510 is adapted to be driven clockwise as viewed in Fig. 37 to thereby drive the top run of the chain conveyor 520, 520 from left to right in the machine and the bottom run thereof in the opposite direction.

Figure 37:
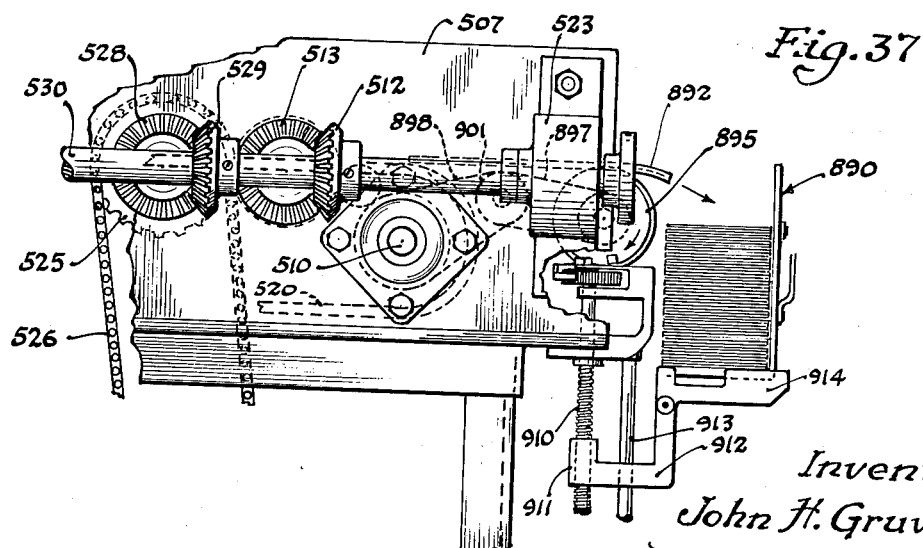
Fig. 37 is a fragmentary elevational view corresponding to Fig. 36.

The drive to shaft 510 is taken from a main drive shaft 530 that extends from one end of the machine to the other, opposite ends of the main drive shaft 530 being journalled in respective bearing plates 508 and 509 that are mounted at opposite ends of the machine on a rigid frame plate as 506 and 507 secured to the main supporting structure of the machine. As best shown in Figs. 36 and 37, the chain 526 is driven clockwise by the motor M-2 and accordingly sprocket 525 carried on a shaft 527 is driven clockwise. On the end of the sprocket shaft 527 away from the sprocket 525 fixed thereto is a bevel gear 528 that is driven clockwise thereby as viewed in Fig. 37 and this gear is in mesh with another bevel gear 529 that is fixed to the main drive shaft 530 so that the latter will normally be rotated in a counterclockwise direction when viewed from the left end of the machine as in Fig. 19. As will be appreciated from the description to follow, most of the driven units in the machine take their respective drives from the drive shaft 530, and in this connection it might be pointed out that there is provided a main clutch generally indicated at 535 which is adapted, when disengaged, to interrupt the drive to the shaft 530 thereby disabling all operating or driven units in the machine. The manner in which the clutch as 535 is adapted to operate will be described below in connection with one of the plate treating units, there being several such clutches throughout the machine all functioning in an identical manner with the exception of the direction of rotation of certain of the associated parts.

Located to the right of the directly driven bevel gear 529 on the main drive shaft 530 is another bevel gear 512 which rotates with the latter and which is in mesh with a paired-off bevel gear 513. The latter gear is fixed to one end of a stub shaft 514 which carries a pinion gear 515 at its other end, and it will readily be seen that the pinion gear 515 will be rotated in a clockwise direction with its associated bevel gear 513 as viewed in Fig. 37. The pinion 515 is located behind the frame plate 507 and constitutes one of a train. Thus, there is provided a second pinion gear 516 fixed to a stub shaft 518, Fig. 33, and a third pinion 517 that is fixed to one end of the shaft 510 mentioned above as being adapted to drive the sprockets 521, 521 for the chain conveyor clockwise as viewed in Fig. 37.

The conveyor 520 thus being driven from one end of the machine, the printing plate feeding means may be conveniently located at the other end of the machine in position to receive a drive from the main drive shaft 530. Referring now to Figs. 19-24, the plate feed means is generally indicated at 540 as comprising a supply magazine SM in which the lithographic printing plates as PL, Fig. 23, are adapted to be stacked one upon another with the imaged faces up. The plates PL are each adapted to be fed one by one from the bottom of the magazine SM by a picker pawl 541 that is so configured as to cooperate with other parts to feed only the lowermost one of the plates in the magazine on to the conveyor 520. The picker pawl thus describes reciprocating movements at the bottom of the supply magazine, and a means is afforded whereby the action of the picker pawl may be interrupted or disabled at will, and of course it will also be appreciated that disengagement of the main clutch 535 mentioned above interrupts the drive to all units such as the plate feed 540.

Figure 21:
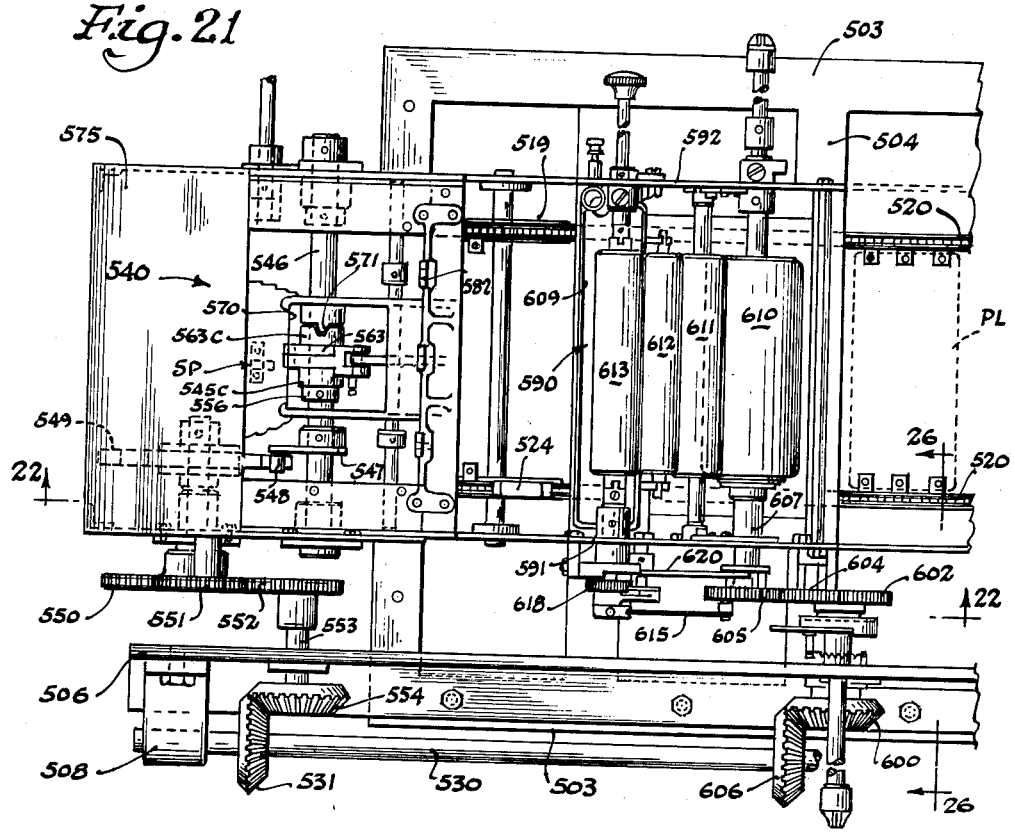
Fig. 21 is a fragmental plan view on an enlarged scale of one end of the machine shown in Fig. 19.

As best shown in Fig. 23, the supply magazine SM comprises four elongated, vertically extending corner posts as 581 and 583 which are spaced apart from one another a distance to accommodate the lithographic printing plates as PL in stacked relation, and this magazine is afforded at the top of a housing 575, Fig. 21, that is located at the extreme left hand end of the machine. The housing 575 accommodates and supports most of the plate feeding mechanism to be described in detail presently. During such time that the picker pawl 541 reciprocates at the bottom of the stacked printing plates in the magazine SM, the picker pawl will feed the lowermost one of such plates through a throat 584, Fig. 23, afforded at the front or forward end of the supply magazine whereby such a thus-fed plate as PL will be located above the left loop or right of the conveyor belt 520 in position such that the openings as PL-0 formed therein shall be aligned with pins or printing plate holders 522P carried on small brackets 522 which are mounted in spaced-apart relation on each of the conveyor chains 520, 520. Being thus positioned so as to project forwardly of the throat 584, the forward end of such a plate as PL will be picked up by the pins on the conveyor chains, so that when fully withdrawn from out of the throat 584 by these pins the plate will be carried by six such pins 522P as shown in Fig. 21; that is to say, there are three openings as PL-0 aligned along either side edge of the printing plate each opening being adapted to be engaged by one of the six pins.

The picker pawl 541 itself is carried at the rear end of a reciprocable plate member 542 which is slotted or grooved as shown in Fig. 24 so as to be adapted to slide back and forth along a pair of oppositely disposed longitudinal rails that are provided in the top of the housing 575, Fig. 24. The distance between, as well as the length of, such rails defines generally an opening 570, Fig. 21, in the top of the housing 575 above which opening the printing plates may be stacked so that the trailing end of the lowermost plate at the bottom of the stack in the supply magazine may be engaged by the picker pawl when the plate 542 is reciprocated fully rearwardly in relation to the opening 570. Thus, as the picker pawl 541 is carried rearwardly by the plate 542 as viewed in Fig. 23, it will slide along the bottom of the lowermost printing plate arranged in the magazine SM, and when the picker pawl reaches the dotted line position indicated in Fig. 23 said lowermost plate will drop down on to the top of the reciprocable plate 542. As the plate 542 is again advanced forwardly of the magazine in relation to the opening 570, the picker pawl will force or push this lowermost plate out through the throat 584 as indicated.

As a means for reciprocably driving the plate 542 and the attached picker pawl 541 to feed printing plates one by one from the supply magazine on to the belt conveyor, there is provided a vertically extending arm 545 that is formed with a yoke at the top which is adapted to embrace and be connected to a link 544, the latter which in turn is connected to a lug 543 depending from the underside of the forward portion of the plate 542. The link 544 is of course pivotably connected to the lug 543 as well as to the yoke on the arm 545, and thereby any oscillating movement of the latter will be imparted to plate 542 which in turn will be moved accordingly along the aforesaid rails which are provided in the top of the housing 575 and along either side of the opening 570. Such oscillating movement of the arm 545 is controlled through a star cam 549 and a cam follower 548 carried at one end of another arm 547, the latter arm being fixed to a rock shaft 546 that is journalled in, and extends transversely of, the housing 575. The star cam 549 is driven in a counter-clockwise direction as viewed in Fig. 22 by a train of gears 550, 551, 552, and 554, Fig. 21, the latter gear of this train being beveled and in mesh with the beveled gear 531 at the extreme left hand end of the main drive shaft 530. Gears 552 and 531 are carried on a shaft 553. It follows, therefore, that the beveled gear 554 will be rotated in a counter-clockwise direction as indicated in Fig. 21, and accordingly the star cam 549 is driven in a similar direction, being fixed to, and therefore rotatable with, a shaft 555 which mounts the gear 550 of the aforesaid gear train. The rock shaft 546 above referred to is located forwardly of the shaft 555 in substantial parallel relation thereto, and a pin 558 which is tensioned between a pin fixed in the housing 575 and another pin carried on the arm 545 tend to draw the latter backward toward the shafts 555 and 576. Arm 547 is fixed to the rock shaft 546 in such location that the cam follower 548 carried at the upper end thereon is aligned with the five cam lobes as 549L on the rotating cam member 549, and it will be seen that as these cam lobes each turn past the cam follower 548, arm 547 will be rocked clockwise as viewed in Fig. 22 against the action of the spring 558, which, as will be appreciated from the description to follow, also normally tends to locate the upper end of arm 547 inwardly of the cam member 549, that is, spring 558 tends to locate the cam follower 548 in the recesses or low parts 549R lying between adjacent cam lobs 549L of the cam member 549. It will be seen, therefore, that during the time that the cam member 549 turns through a complete revolution, the rock shaft 546 will normally describe five complete rocking or oscillating movements as a result of the cooperating action of arm 547 and spring 558.

The arm 545 is formed with a sleeve 545C, Fig. 24, that is freely journalled on the rock shaft 546, and is located on the latter between a fixed bushing or collar 556 and an abutting arm 563 that is substantially coextensive in length with arm 545. Arm 563 is formed with a similar sleeve 563C journalled on the rock shaft 546, and this latter sleeve constitutes the driven member of an over-load release clutch 565 that is adapted to normally impart clockwise rocking movement of the rock shaft 546 to the arm 563 and from the latter to the arm 545, the upper end of the arm 563 being drivingly connected to arm 545 immediately below the yoke portion of the latter by means as a screw 557, Fig. 22, that permits a relative adjustment between the arms 563 and 545 as will be described below. The driving member of the clutch 565 is in the form of a collar 560 which is keyed to the rock shaft 546 as by a key 561, Fig. 24, that is adapted to prevent relative rotative movement of, but permits relative axial movement of, the driving member 560 with respect to the drive or rock shaft 546. The driving element 560 is formed with a clutching projection or element 571, Fig. 21, that is adapted to fit into a similarly configured notch in the driven element 563C of the arm 563. A spring 560S which is concentric to the rock shaft on the side thereof away from the arm 545 normally urges the driving member 560 toward the driven member 563C to maintain clutch 565 engaged. In this manner, it will be seen, the shifting movement of the rock shaft 546 may be directed up to the plate 542, and as the cam follower 548 drops from an uppermost position indicated in Fig. 22 to a lowermost position between corresponding cam lobes as 549L, the picker pawl will be carried rearwardly of the magazine SM simultaneously with the counter-clockwise movement of the rock shaft 546. On the other hand, when arm 547 is rocked clockwise as viewed in Fig. 22, from a lowermost to an uppermost position during the time that a new cam lobe as 549L is rotated past the cam follower 548, the plate 542 and therefore the picker pawl 541 will be carried forwardly of the supply magazine by the arm 545 which shifts or rocks accordingly as does, and simultaneously with, the rocking arm 547.

Figure 22:
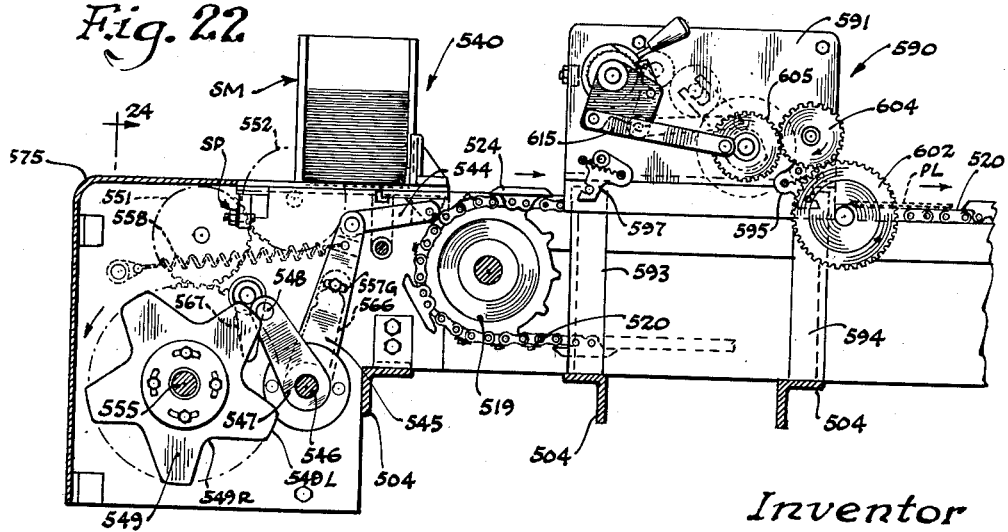
Fig. 22 is a sectional view taken on the line 22—22 of Fig. 21.

In order that the drive to the picker pawl may be disabled as desired, a lever 566 carried on one end of the rock shaft 546 is adapted to shift and rock with the latter, and as shown in Fig. 22, the lever 566 is provided with a notch adjacent the top rear side thereof. Located on the left side of the housing 575 is a manually operable lever 567 that is carried on a shaft 569 which may be manually turned by means of a handle 568. The length of the lever 567 is such that when this lever is turned counterclockwise as viewed in Fig. 22 the end thereof is adapted to engage the aforesaid notch in the lever 566 at the time when the picker pawl 541 or plate 542 is in its forwardmost position. Being thus engaged by the end of lever 567, the lever 566, and therefore the arms 563 and 545, is prevented from undergoing a return or counter-clockwise movement under the influence of spring 558. Under such conditions, successive cam lobes as 549L will simply rotate past the cam follower 548 which is being held stationary in its forwardmost or uppermost position, and the rock shaft 546 will remain stationary. Upon releasing the lever 567 by turning the same clockwise back to the position indicated in Fig. 22, lever 566 is no longer held locked, and spring 588 being unbalanced will be effective to urge arm 545, and therefore the rock shaft 546 through the clutch 565, rearward or in a counter-clockwise direction as viewed in Fig. 22.

In order that assurance may be had that the extent of movement of the picker pawl 541 under the influence of the cam 549 will be such as to accurately advance the lowermost printing plate in proper time sequence from the bottom of the magazine SM into position to be engaged by the conveyor pins 522P, the portion of the arm 545 opposite the screw 557 carried by the arm 563 is arcuately slotted as indicated at 557G in Fig. 22 whereby, upon loosening screw 557, arm 545 can be turned on the rock shaft 546 and thereby re-located relative to the arm 563 so that in effect the reciprocable plate 542 is re-located. That is to say, while the extent of rocking movement of the rock shaft 546 is constant in accordance with the configuration and spacing of the cam lobes 549L, the limit of forward, or clockwise, movement of the arm 545 can be adjusted within the limits of the aforesaid arcuate slot 557G thus to determine or locate the corresponding forwardmost position of the picker pawl 541. In this same regard there is also provided, Figs. 21 and 22, a fixed stop pin generally indicated at SP, which is adjustably located behind and in alignment with the yoke portion of the arm 545. It will be seen, therefore, that the latter can be rocked to the rear, or counter-clockwise, only so long as it does not engage the stop means SP, and in this manner assurance may be had that the picker pawl is not moved substantially beyond the trailing edge of the lowermost printing plate in the supply magazine during the time that spring 558 is effective to re-locate arm 547 following the positioning of an immediate preceding printing plate on the conveyor chains 520, 520.

As best shown in Fig. 24, three blades as 582 are located at the immediate front of the magazine SM, and the bottoms of these blades locate the top of the throat 584 through which the plates PL are fed on to the conveyor pins 522P. The blades are adjustable through screws 582A and accordingly the size of the throat 584 may be adjusted.

As the printing plates are advanced one-by-one by the plate feed means into position on the related locating pins carried by the conveyor means, such plates are each in a preserved or protected condition to the extent that a protective coating overlies the printing faces thereof to protect such faces against corrosion, oxidation, scratches and the like deleterious effects that may be occasioned during non-use and particularly in cases of prolonged storage. Accordingly, and to the end that such plates may be initially prepared for lithographic printing, the plates are advanced one-by-one by the conveyor 520, 520 to the first plate treating unit, a preservative removing unit indicated generally at 590, Figs. 21, 22, 25 and 26. This preservative removing unit is housed between a pair of frame plates 591 and 592 that are rigidly interconnected and located behind the left hand main frame plate 506 as indicated in Fig. 19. The plate preservative unit 590 is adapted to be removably mounted in the machine as follows: Four posts are paired off as are 593 and 594, Fig. 22, and are vertically supported on an adjacent pair of the transverse tie bars 504. The bottom edges of the frame plates 591 and 592 are turned inwardly as shown in Fig. 26 to afford flanges that may be extended between the tops of the aforesaid vertical posts 593 and 594. Associated with each pair of vertical posts as 593 and 594 are spaced apart screws as 598, Fig. 26, having enlarged heads projecting from the underside of the flanged portion of the frame plates 591 and 592, and these projecting screw heads are adapted to fit snugly in corresponding slots provided at the tops of the vertical posts, thus locating the preservative removing unit 590 relative to the machine as a whole. On the outside of each of the frame plates 591 and 592 are a pair of pivotal, slotted lock elements as 595 and 597 that are adapted to abut against the outside faces of the paired vertical posts as 593 and 594, as indicated in Fig. 26, to engage pins as 593P and 594P which project out from the related posts 593 and 594. The pivotal lock elements 595 and 597 are each adapted to be pivoted against the action of a spring as 595S, Fig. 25, which is tensioned between a pin 589 fixed to the lock element 595 and another pin 599 fixed to and projecting outwardly of the frame plate 591. The springs normally urge the lock elements into firm engagement with the pins 593P and 594P whereby the particular plate treating unit is maintained in place. Accordingly, by turning the lock element 595, for instance, clockwise about its pivot 596 as viewed in Fig. 25, the lower extension thereof may be rotated out of abutting relation with respect to the outside of the associated vertical post 594, and when all such lock elements are thus turned to a releasing position the unit 590 may be moved from out of the machine.

In mechanical construction and operation, the unit 590 is practically identical to the unit 110 considered hereinabove in connection with the rotary form of Figs. 1–18, the exception being that the unit 590 is to apply a solution to the surface of each printing plate so that the preservative coating thereon may be dissolved or etched away, and in function or effect therefor the present unit 590 corresponds to the scrubbing unit 100, Fig. 2. Thus, the unit 590, comprises a form roller 610, a distributor roller 611, a ductor roller 612, and a fountain roller 613, the form roller being directly driven, the distributor roller 611 being frictionally driven by engaging the form roller, the ductor roller 612 being mounted for rocking or shifting movement, and the fountain roller being mounted for stepwise movement in its fountain 609, Fig. 21. The dissolving or etching solution that is contained in the fountain 609 will be picked up by the ductor 612 when the latter is shifted into engagement with the fountain roller 613 and then will be transferred or relayed to the form roller 610 which applies the same to the coated printing faces of each printing plate as PL moving therebeneath on the conveyors 520 as best illustrated in Fig. 26. The fountain roller 610 is rotated clockwise across the face of each of the printing plates by means including a gear train 600, 602, 604, and 605, Figs. 21 and 22. The gear 600 is a bevel gear that is meshed with another bevel gear 606 carried on the main drive shaft 530. Gear 600 is fixed on one end of a shaft 599 and the latter is adapted, through a clutch 635, to turn the pinion gear 602 in a counter-clockwise direction as viewed in Fig. 22. The pinion gear 602 in turn is meshed with another pinion gear 604 carried on a stub shaft 603 in the frame plate 591, and the latter pinion gear is meshed with gear 605 that is fixed to one end of a drive shaft as 607 for the form roller 610. Since the shaft 607, when driven by the aforementioned gear train, is adapted to drive the form roller 610 in a manner identical to that considered above in connection with the form roller 110 of the rotary form in Figs. 1–18, it will be unnecessary to consider the unit 590 any further in this regard, and since the other rollers in the unit 590 are also operated as in the unit 110 above, a brief reference only will be had to the various parts and driving members of the embodiment shown in Figs. 19–39.

Thus, a pin 614 is eccentrically mounted on the gear 605, and a drive arm 615 is journalled at one end to the pin 614 and at the other end is journalled on a pin projecting from a lower extension of a pawl carrier plate 616 associated with the fountain roller drive mechanism. The pawl carrier 616 is journalled for shifting movement on a shaft projecting outwardly from the frame plate 591 of the unit 590 and carries a pawl 617 that is spring urged toward a ratchet 618 so as to be capable of driving the latter. The ratchet 618 is fixed to one end of a shaft that is adapted, when turned, to rotate the fountain roller 613 stepwise in the fountain accordingly as the pawl 617 turns the ratchet 618 a predetermined distance counter-clockwise as viewed in Fig. 25. That is to say, when the pawl carrier 616 is rocked counter-clockwise as viewed in Fig. 25, the pawl 617 will turn the ratchet 618 in a similar direction to the extent that a roller 617R, Fig. 26, carried by the pawl is free to drop inwardly of a slot 619S formed in an adjustable shroud plate 619. Thus, the location of the slot 619S determines the effective stroke of the pawl 617.

Instead of being actuated so as to rotate stepwise in a fixed location as is the fountain roller, the ductor roller 612 is mounted for shifting movement from one limit position whereat it engages the fountain roller 613 at the time the latter is turned counter-clockwise in the fountain 609 to another limit position engaging the distributor roller 612 which is rotated continually in a clockwise direction as viewed in Fig. 25. To this end, a symmetrical cam 621 is carried on the shaft 607 which is adapted to drive the form roller, and associated therewith is a cam follower or roller 625 carried at one end of a rocking arm 620. The other end of the arm 620 is fixed at one end to a rock shaft 622, Figs. 25 and 26, and the latter mounts a pair of vertically disposed yokes as 623 between and in which the ductor roller is freely journalled. In operation, as the high part of cam 621 is brought around toward the cam follower 625, the yoke members as 623 fixed to the rock shaft 622 carry the ductor roller 612 from a position engaging the distributor roller 611 to a position engaging the fountain roller 613, and this while shaft 622 is rocked counter-clockwise by the arm 620. Movement of the ductor in the opposite direction should be clear.

In order that the preservative removing means 590 may be disabled at will, there is provided a clutch generally indicated at 635, Figs. 26 and 35, that is adapted to couple the drive of shaft 599 to a sleeve 601 which carries the large pinion gear 602. As shown in Figs. 26 and 35, the clutch 635 comprises a disc-like member 636 which is formed with an annular flange so as to be somewhat cup-like in outline. Disc 636 constitutes the driven member of the clutch 635, and is connected to the large spur gear 602 through the sleeve 601 so that in effect the driven member 636 and gear 602 are one member. As the driving member of the clutch 635, a hub 637 is pinned to the shaft 599 which carries at one end the bevel gear 600, and the hub 637 is located centrally of the driven member 636 as indicated in Fig. 35. Formed in the outer periphery of the hub or driving member 637 is a notch N that is adapted to receive the toe T of a lever 638 pivoted on a pin 639 which is carried by the member 636. The lever 638 constitutes the element that is adapted to couple the drive which the hub 637 receives from the shaft 599 to the driven member 636, such drive being accomplished, it will be seen, through the cooperating notch N and toe T and the pin 639. The coupling element or lever 638 is normally held in the engaged relation indicated in Fig. 35 by a spring 636S that is tensioned between one end of the lever 638 and a pin 636P fixed to the disc-like driven member 636, and thus the clutch is normally engaged. Projecting through an opening afforded in the flange portion of the driven member 636 is a heel H of the coupling lever 638, and it will be seen that if and when the heel H engages a fixed stop during the course of its counterclockwise movement at the time when the clutch 635 is engaged, the coupling lever 638 will be caused to pivot clockwise about the pin 639 thereby effecting a disengagement between the toe T and the notch N whereupon the clutch 635 is disabled and the drive to the pinion gear 602 interrupted. Such a fixed stop in the present instance is in the form of a clutch disengaging lever 641 that is formed at one end with a right-angled projection 641H adapted to be moved into the path traced out by the rotating heel portion H of the coupling lever 638. Lever 641 depends from one end of a shaft 645 that extends outwardly of the main frame plate 506, there being a handle 645H at the other end of the shaft 645 whereby this shaft may be turned in either direction as required. Also fixed to the shaft 645 is a latch member 642 that is located flush against the outside face of the frame plate 506 so that the latch element 642 will be turned accordingly as the handle 645H is turned. The latch 642 is formed with two notches, namely, an upper notch E and a lower notch D, each of which is adapted to be engaged by the nose portion of a pawl 643 that is spring urged counter-clockwise about a pivot pin 645 by a spring 643S. Thus, by cooperating with the latch 642 the pawl 643 tends to hold the clutch disengaging lever 641 in either of the two positions corresponding to the notches D and E so that by turning the handle 645H counter-clockwise against the action of spring 643S as viewed in Fig. 35, the clutch disengaging lever 641 may be moved from the position corresponding to notch E whereat the clutch 635 is maintained engaged to a position corresponding to notch D whereat the stop element 641H is moved into the path of the heel element H on the coupling lever 638 to engage the same and effect a disengagement of the clutch 635. A spring 640S tends to locate the lever 641 in a clutch disengaging position.

It will be recalled that attention was earlier directed to a main clutch 535, Fig. 33, that is adapted to disable the main drive shaft 530. The clutch 535 is similar to the clutch 635 except that in this instance the disc-like member 536 associated therewith is the driving member, being connected to the sprocket 525 and, as will be clear from Figs. 33 and 36, is adapted for clockwise drive in contrast to the clutch 635. These being the only differences between the two clutches, no further description of operation is necessary other than to point out that the clutch 535 may be manually disengaged by turning a handle 537.

Following the removal of the preservative coating from the printing surface of the lithographic printing plates passing from left to right in the machine 500, the plates are next advanced sequentially one by one from the unit 590 to a plate cleaning unit 650, Figs. 19 and 20, where a unit mechanically similar to the previous unit 590 is adapted to further clean the printing surfaces of the plates and thus prepare them for the initial lithographic treatment of the non-imaged areas at the next unit 670 which is adapted to apply a conventional repellent solution or both to the printing plates prior to their being inked. As with the cleaning unit 650 the moistening or repellent unit 670 is mechanically similar to the preservative removing unit 590 and hence a general description only will be had of the units 650 and 670.

In contrast to the form roller 610 which is driven in a counter-clockwise direction across the surfaces of the printing plates passing therebeneath, the form roller 652, Fig. 20, of the plate cleaning unit 650 is rotated in a direction that is opposed to the movement of the printing plates passing therebeneath so that the cleaning action of the form roller 652 will be as effective as possible. Accordingly, two pinion gears, 653 and 654 are afforded for driving the form roller 652 in a clockwise direction as viewed in Fig. 20. Thus the pinion gear 653 is adapted to directly drive the form roller 652 and is meshed with the other pinion gear 654, the latter gear being driven by intermeshing bevel gears 649 and 651, Fig. 19, and a normally engaged clutch 655 which is similar in all respects to the manually operable clutch 635 discussed in detail above.

The drive mechanism for the moistening or repellant unit 670 is similar in all respects to that for the plate preserving unit 590 since the form roller 664, Fig. 20, is preferably to be driven counter-clockwise as viewed in Fig. 20. Therefore, three pinion gears are afforded, namely, 659, 663, and 662, Fig. 20. Gear 659, being driven counter-clockwise, is adapted to drive the form roller 664 in a similar direction, and the pinion gear 662, the third of the train, is driven in the same direction by intermeshing bevel gears 660 and 661, Fig. 19 and another normally engaged clutch 665.

From the foregoing it will be seen that as printing plates are advanced one by one from the supply magazine SM, they are first moved beneath a form roller 610 which is adapted to scrub the surfaces thereof with a solution capable of dissolving the preservative coating which has been applied thereto, then are advanced by the conveyor chains 520, 520 to the next form roller 652 whereat a final cleaning action is accomplished, and then finally to a third form roller 664 which applies the repellent solution to the non-imaged areas of each of the printing plates. With regard to the third treatment, it will be appreciated that the repellent solution applied to the surface of the printing plates will be restricted to the non-imaged areas of the plate by the greasy original image delineated on the surface of each plate, and thus as the printing plates leave the third unit 670 each is in condition to receive an ink treatment which, due to the peculiar condition of lithographic printing plates, is restricted to the image-bearing areas of the plates as is well known in the art.

The inking unit embodied in the machine 500 is indicated generally at 680 and is practically identical to the inking unit 180 considered in connection with the rotary form previously considered. The form rollers of the inking unit 680 will, of course, assume a generally horizontal disposition in contrast to the somewhat vertical disposition of the form rollers in the inking unit 180, and in addition pressure rollers are afforded in the present instance. Another distinction between the units 680 and 180 lies in the fact that the unit 680 employs two ink trains instead of one, and also a different clutching arrangement is present. As shown in Figs. 20, 27, 28, and 29 the inking unit is constructed with two trains arranged in tandem, 680A and 680B. Each of the trains or sub-units 680A and 680B comprises a pair of form rollers as 681 and 682 in the unit 680A arranged directly above the chain conveyor in position to roll across the upwardly disposed printing surfaces of the printing plates as PL passing therebeneath, and a pair of pressure rollers as 683 and 684 are disposed directly beneath the conveyor in alignment with the respective form rollers 681 and 682. Most of the elements comprising each of the sub-units 680A and 680B are arranged between a pair of plates 730 and 731 which, as in each of the units 590, 650, and 670 and as described in detail for the unit 590, is adapted to be releasably locked in position in the machine. Since both of the ink sub-units are identical in operation and are similar in construction to the unit 180 considered in connection with the rotary form, a brief description only will be had in connection with unit 680A.

Located in position to engage and thereby frictionally drive the form rollers 681 and 682, is an oscillating roller 685 that is driven clockwise by a gear 712 the drive to which will be described presently. Pivotally mounted at either end of the supporting shaft for the oscillating roller 685 are arms 691 and 692, Fig. 27, and arms 693 and 694, Fig. 29. The lower ends of the pair of arms 691 and 693 rotatably support the forward-most form roller 681, and the other form roller 683 is similarly carried by the pair of arms 692 and 694. By rocking either pair of arms, the associated form roller can be lifted away from or pressed toward, as the case may be, the conveyor 520 and in this manner, inking pressure may be adjusted. Such adjustments may be made by means as eccentric shafts 695 and 696 shown as associated with the form rollers in the forwardmost sub-unit 680B. Eccentric nuts may also be afforded for adjusting either end of the form rollers and since an identical arrangement has previously been described in detail in connection with the rotary form of the present invention, further description here is believed to be unnecessary.

As with all other units in the machine 500, the drive for the inking units emanates from bevel gears fixed to the main drive shaft 530, in this instance bevel gears 700 and 720 for the units 680A and 680B respectively. Gear 700, in cooperation with another bevel gear 701 with which it is meshed, is adapted to drive the ink unit 680A, and considering this drive alone, a clutch 705, similar in all respects to the clutch 635, is arranged to impart the drive of the bevel gear 701 and its shaft 702 to a pinion gear 703 when a clutch disc 706 is coupled to the shaft 702 in a manner identical to that described hereinabove in connection with the clutch 635. Another pinion gear 708 is meshed with the gear 703 and is thereby adapted to drive a third pinion 709 counter-clockwise as viewed from Fig. 29. The pinion 709 is fast on a shaft 710 that is journalled in the frame plate 730 and which carries another gear 711 in mesh with the gear 712 for the oscillating roller 685 of ink unit 680A. In each ink train there is a ductor roller as 686 and a fountain roller as 687. The ductor 686 is adapted to shift between the fountain roller 687 and the oscillator roller 685 to relay ink from the former to the latter, and the fountain roller 687 is adapted to rotate step-wise in its fountain 689. Thus it will be recognized that the action of the ductor 686 and the fountain roller 687 is similar to that for the corresponding rollers 215 and 210, Fig. 9, there being a pair of cams 714 and 715 on the shaft 710 for controlling the operation of these two rollers by means identical with the means associated with cams 227 and 228, respectively, Fig. 9A.

The other ink train, 680B, is driven in a similar manner through bevel gears 720 and 721, a clutch disc 726 of a clutch 725, and a train of gears including the pinions 728 and 729 which are adapted to transmit motion from shaft 530 to the oscillating roller associated with this second of the two inking units.

After leaving the inking unit 680, the printing plates are finally in condition for effecting impressions by means including a rotating blanket that first receives the images from the plates at one point and then carries the images to another point where they are transferred directly to the material to be printed. A blanket cleaner means is afforded to assure that the blanket is maintained in a clean condition following the transfer of images therefrom, and this blanket cleaner means is operated in a step-wise fashion to conserve the amount of blanket-cleaning material required. It will be appreciated of course that the images on the blanket cylinder will be in spaced-apart relation to one another.

Cooperating with the blanket cylinder is an impression cylinder 752, Fig. 19, which presses copy material as WP against the image-carrying blanket thereby to effect ink transfer from the blanket to the copy material. A supply roller SR and a take-up roller TR are afforded for the copy material, and the manner in which these rollers operate will be pointed out below.

Insofar as the manner of travel of the printing plates past each of the plate conditioning units 590, 650, 670, and 680 is concerned, it will be observed that the conveyor or plate carriage 520, 520 is analogous to the plate cylinder or carriage 60 of the rotary machine considered hereinabove, the principal distinction being that in the former instance the path of printing plate travel is generally arcuate whereas in the machine 500 a generally horizontal path is afforded. Therefore, the off-set station, Fig. 20, instead of being defined by an engagement between a rotating plate cylinder and a rotating blanket cylinder is defined by a blanket cylinder 740 that rotates a blanket 741 in engaging relation across the printing faces of the plates as PL which move along a true tangential path in relation to the blanket cylinder, a pressure cylinder 750 being disposed below the conveyors 520, 520 in true vertical alignment with the blanket cylinder 740.

Figure 30:
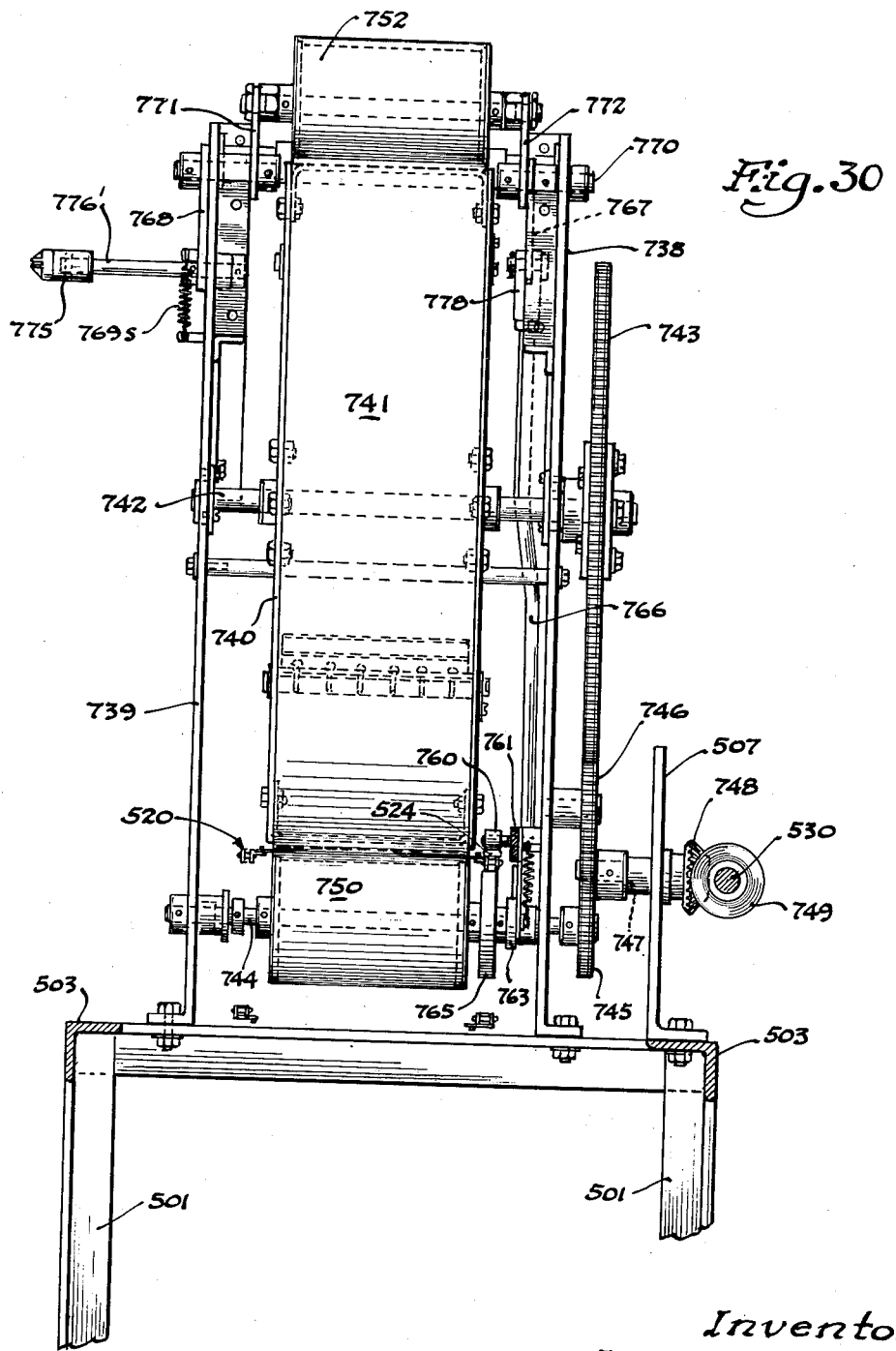
Fig. 30 is a sectional view taken on the line 30—30 of Fig. 27.

As shown in Fig. 30, both the blanket cylinder 740 and pressure roller 750 are housed between a pair of upstanding frame plates 738 and 739 secured to the main supporting framework of the machine. The blanket cylinder is mounted on a shaft 742 that is journalled in the frame plates 738 and 739, and this shaft carries a large gear 743 by which the blanket cylinder is driven. Similarly, the pressure roller 750 is mounted on a shaft 744 that is driven by a gear 745. The drive for both of the gears 743 and 745 emanates from the main drive shaft 530, and to this end a bevel gear 749, Fig. 33, is located on the main drive shaft 530 in position to mesh with and drive counter-clockwise, as viewed in Fig. 19, another bevel gear 748. The bevel gear 748 is carried at one end of a stub shaft 747, Fig. 30, which carries a pinion gear 758 at its other end in position to mesh with, and therefore drive clockwise, another pinion gear 746 which, as shown in Fig. 27, is adapted to drive gear 743, and therefore the blanket cylinder 740, counter-clockwise. In addition to being meshed with gear 743, the pinion 746 is also meshed with another pinion gear 751, Fig. 27, that is thereby adapted to rotate the gear 745, and therefore the pressure roller 750, clockwise. From this it will be obvious that as long as the main drive shaft is driven, both the blanket cylinder and pressure cylinder are constantly driven in a direction that may be considered to be parallel to the path of the printing plates advancing with the carriage 520, 520 from the inking unit 680. Thus, as the printing plates progressively enter the bight between the blanket cylinder 740 and pressure roller 750, inked images are at the same time progressively off-set on to the blanket 741 (which is of a conventional type) in spaced relation, and such off-set images are then in position to be carried counter-clockwise by the blanket cylinder upwardly and away from the printing plates emerging at the right of the off-set station. As the blanket cylinder 740 continues its counter-clockwise movement, the images on the blanket 741 are brought around and up toward the impression cylinder 752 which presses the copy material such as the web WP against the blanket, and in this manner the web WP is progressively printed.

It will be recalled that in the rotary form of the present invention described in connection with Figs. 1–18 that the rotating plate cylinder or carriage 60 carried a plurality of spaced-apart cam plates that cooperated with flange or disc elements carried at the ends of the ink form rollers to hold the latter away from the periphery of the plate cylinder 60 during such time as bare areas of the plate cylinder were disposed beneath the ink form rollers, thus to assure that those portions of the plate cylinder between successive printing plates located thereon were maintained free of ink. However, since the printing plate conveyor in the present instance assumes the form of parallel spaced-apart conveyor chains it will be seen that it is not necessary to so hold the ink form rollers as 681 and 682 away from the conveyor 520, 520 between successive printing plates, there being little likelihood of the blanket 741 receiving ink in any form other than the successive off-set images themselves, especially since the ink form rollers are no wider than the printing plates and in any event of less width than the outside distance between the conveyor chains 520, 520. As was noted above, the printing station is generally defined by the impression cylinder 752 located adjacent the top of the blanket cylinder 740 in position to press the copy material against the surface of the blanket 741, and thus at the time of printing or ink transfer from the blanket 741 on to the copy material WP the latter must necessarily be pressed against the image-carrying blanket. At the time of printing, therefore, the paper web WP will be frictionally drawn from the supply roller SR as the result of such engagement between the paper web WP and the rotating blanket 741. In the present instance such engagement between the copy material and blanket is an intermittent one as will be described in detail below, in which case it follows that the copy material WP will be withdrawn in short runs from the supply roller.

While the matter adapted to be printed by the machine in Figs. 19 to 37 may be in practically any form commensurate with the type of data carried by the printing plates PL, one widely used form particularly adaptable to the present arrangement consists of a series of addresses to be successively transferred on to the web material WP which will then constitute a mailing strip containing such addresses. The mailing strip thus prepared will subsequently be severed or cut into individual address labels, and it will be seen therefore that it is unnecessary to have the printed addresses on the strip WP spaced apart as the off-set images on the blanket image 741 are spaced apart from each other. Accordingly, there is provided a means whereby the copy material is drawn from the supply roller SR only so long as an off-set image on the blanket 741 is located beneath the impression cylinder 752 at the printing station. That is to say, the impression cylinder 752 will be urged toward the blanket cylinder 741 to press the sheet to be printed against the blanket 741 only so long as an image is located beneath the impression cylinder, the latter otherwise being normally held away from the blanket 741 between successive off-set images. In the present instance, such means for thus controlling movement of the impression cylinder include lugs as 524, Fig. 28, located on one of the conveyor chains 520 between successive printing plates PL, and as shown in Fig. 22 for instance, these lugs project above the plane of the conveyor 520, 520 and the opposite ends thereof are cammed downwardly toward the conveyor. Located behind the vertically extending frame plate 738 which partially houses most of the printing means is an arm 761, Fig. 27, which is pivoted at 764, Fig. 28, and which carries a roller 760 at one end thereof. Positioned below the chain 520 in opposed relation to the roller 760 is a pressure disc 765, Fig. 30. The roller 760 constitutes, in effect, a cam follower which is adapted to be engaged by each of the cam lugs 524 which are carried by the chain carriage and positioned thereon between successive printing plates so that the arm 761 will be periodically rocked about its pivot 764 as successive cam lugs 524 pass beneath the cam follower 760. Linked to the arm 761 by a link 762 is another arm 763 positioned below the arm 761 in a general parallel relation thereto. The arm 763 is pivoted about the shaft 744, so that when arm 761 is rotated counter-clockwise as viewed in Fig. 27 by a lug 524 passing beneath the cam follower 760, arm 763 will also be rocked counter-clockwise about its pivot at shaft 744. This counter-clockwise rocking movement of arm 763 is manifest in the impression cylinder 752 being raised away from the continuously rotating blanket cylinder 740, and to this end an adjustable link 766 is connected to the end of arm 763 away from the link 762 as by an attachment 776 that is pivotably connected thereto. As shown in Fig. 27, the attachment 776 is provided with a nut in which the lower end of the link 766 is threaded. The upper end of the link 766 is connected to another attachment 778 through a similar thread and nut arrangement, and the attachment 778 is pivotally connected to the lower end of a downwardly extending arm 767 that is secured at its upper end to a rock shaft 770. Arm 767 is normally urged downward as by a spring 777. Also secured to the rock shaft 770 and at the opposite ends thereof are a pair of arms 771 and 772 which carry and rotatably support the impression cylinder 752. Thus, when arm 763 is rocked counter-clockwise as viewed in Fig. 27, link 766 is pushed upwardly against the action of spring 777 and this causes arm 767 to rotate the rock shaft 770 whereby the arms 771 and 772 carry the impression cylinder 752 upwardly, away from and out of engagement with the blanket cylinder 740. From this it will be seen that the cam lugs 524 control the raising and lowering of the impression cylinder 752 so that when the cam follower 760 is unengaged by any such cam lug, the impression cylinder presses the copy material as the web WP against the image carrying blanket 741; on the other hand, as a lug 524 passes beneath the cam follower 760 concomitant actuation of the link 766 is effective to overcome the action of spring 777 and the weight of the impression cylinder.

In order that the impression cylinder 750 may be maintained completely out of engagement with respect to the blanket cylinder 740 for extended periods of time as may be desired, another arm 768 corresponding to the arm 767 is secured to the other end of the rock shaft 770 and this arm is under control of a cam 776C carried at one end of a shaft 776', Fig. 30. A handle 775 is fixed to the outer end of the shaft 776' and by turning handle 775 clockwise as viewed in Fig. 27 against the return action of a spring 769S cam 776C may be brought to bear against the under side of arm 768. Continued movement of handle 775 in this direction forces the arm 768 upwardly, and shaft 770 is accordingly rocked to cause arms 771 and 772 to locate the impression cylinder 752 in an inoperative position whereby the printing station is disabled.

Paper or copy material being withdrawn from the supply roller SR, it is, of course, necessary to afford a means for driving the take-up roller TR simultaneously therewith. This may be conveniently accomplished through the chain-and-sprocket arrangement and belt-and-pulley arrangement as shown in Fig. 19. The supply roller SR is supported for rotation on a shaft 1000 that is free to rotate while supported between horizontally extended plates as 1003 which are each connected to the upstanding frame plates 738 and 739. Carried at one end of the shaft 1000 is a sprocket 1001 that is interconnected with another sprocket 1004 through a chain 1002. The sprocket 1004 is fixed to the outer end of a stub shaft 1006 which is journalled on the plate or support 1003 and also at the outer end of the stub shaft is a pulley 1005. The take-up roller TR is also mounted for rotation between the plate as 1003, and in this instance a shaft 1008 is mounted for rotation. A pulley 1007 is carried at the outer end of the shaft 1008 for the take-up roller and is interconnected with pulley 1005 through a belt 1009. In this manner, the take-up roller TR will be driven concomitantly with the supply roller SR.

Figure 31:
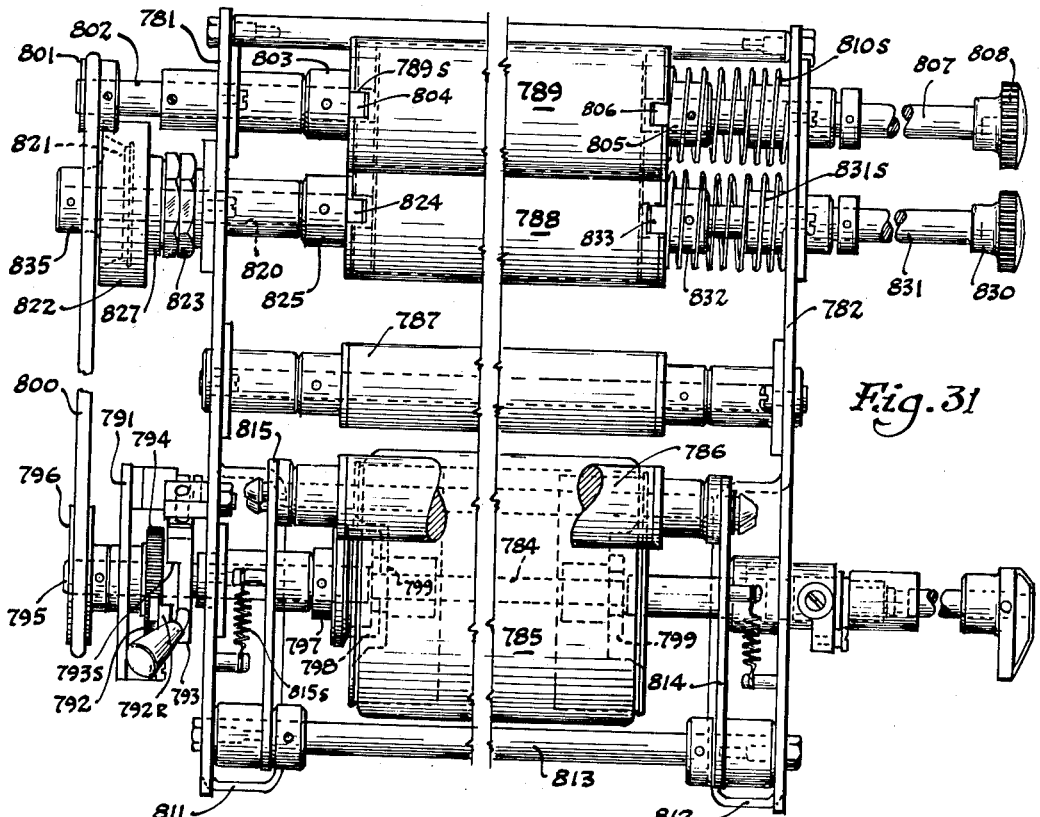
Fig. 31 is a plan view, broken away in part, and being taken on the line 31—31 of Fig. 27.
Figure 32:
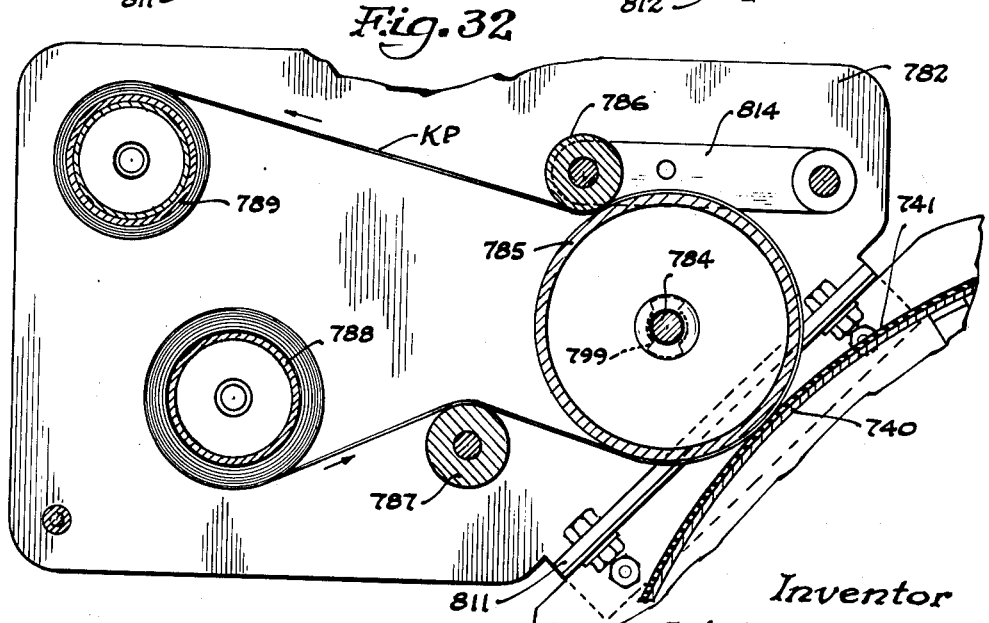
Fig. 32 is a sectional view illustrating the means for cleaning the blanket of the machine shown in Fig. 19.

As each address or the like on the blanket 741 is printed on or transferred to the copy material, continued counter-clockwise rotation of the blanket cylinder 740 as viewed in Fig. 27 carries the blanket 741 toward a blanket cleaning unit generally indicated at 780 whereat a strip of cleaning material KP, Fig. 32, is adapted to be rubbed or brushed against the surface of the blanket 741. The sheet material KP is of a loosely woven type such as embodied in the so-called Kleenex tissue, and in this manner the blanket 741 is progressively brushed clean of latent images so to speak. The scrubbing action at the blanket cleaning station 780 is also under control of the rocking arm 761 and thus the quantity of cleaning tissue KP is conserved in a manner similar to that of the material WP being printed at the printing station. The blanket cleaning mechanism is housed between a pair of relatively small frame plates 781 and 782, Fig. 32, that project horizontally from and are secured to the top of the frame plates 738 and 739 respectively which house the blanket cylinder 740. Such mounting is afforded by inwardly bent flanges 811 and 812, Fig. 31, which may be secured to similarly shaped flanges provided on the frame plates 738 and 739 as indicated in Fig. 27.

As shown in Fig. 32, the cleaning material KP is adapted to be pressed against the surface of the blanket 741 by a rotatable roller 785, the cleaning strip being supplied from a roller 788. A lower guide roller 787 is afforded for the lower run of the cleaning material and is located intermediate the supply roller 788 and the main roller 785. An upper pressure roller 786 is adapted to maintain the cleaning material KP relatively tight on the roller 785 as well as relatively taut during its run to a take-up roller 789. The roller 785 is adapted to be driven in a step-wise manner counter-clockwise as viewed in Fig. 32, by a link 790, Fig. 27, as will be described in more detail below, and this step-wise drive is to be imparted to the take-up roller 789 by means of a spring belt 800. From this it will be seen that the cleaning material KP will be rubbed against the surface of the blanket cylinder 741 in a direction opposite to the rotating path of the latter, and in this manner an effective cleaning action on the blanket 741 may be had.

As with many of the units already considered hereinabove, the blanket cleaning unit 780 is adapted to be driven step-wise by means of a pawl and ratchet arrangement best shown in Fig. 31, and to this end a ratchet 794 is located outside the frame plate 781 on a drive shaft 795. As a means for actuating the ratchet 794 and the drive shaft 795, a plate 791 which carries a pawl 792 is journalled on the drive shaft 795 intermediate the ratchet 794 and a pulley 796 which will be considered hereinbelow. As shown in Fig. 27, a link 790 extends upwardly between one end of the arm 761 which carries the cam follower 760 and the side of the pawl carrier 791 away from pawl 792. It follows that when arm 761 is rocked counter-clockwise by a cam lug 524 passing beneath the cam follower 760, link 790 will be pulled downwardly as viewed in Fig. 27 thereby causing the pawl carrier 791 to turn counter-clockwise about the shaft 795. The pawl 792 is spring-urged toward the ratchet 794, and such counter-clockwise turning of the pawl carrier 791 by the link 790 represents an effective stroking of the pawl 792 against the ratchet 794 as follows:

Freely journalled relative to the shaft 795 and located thereon behind the ratchet 794 is an adjustable shroud plate 793 that is adapted to be positioned relative to a roller 792R carried by the pawl. The shroud plate 793 is slotted at 793S, and this slot is in alignment with the roller 792R so that by turning the shroud plate 793 the slot 793S can be located relative to the roller 792R to thereby regulate the effective stroke of the pawl 792. Thus, the pawl is not effective to turn the ratchet 794 until the roller 792R is located above the slot 793S in which case the pawl is then spring-urged downwardly of the slot 793S to engage and turn the ratchet. Fixed to the inner end of the shaft 795 is a collar 797 formed with a disc-like member from which project a pair of fingers as 798 and these fingers are adapted to bear against opposite sides of a segmental drive plate 799 plugged in either end of the cylinder 785. It will be seen, then, that as the pawl 792 effects a turning of the ratchet 794 during the time that the drive link 790 is pulled downwardly, the collar 797 will rotate with the shaft 795 and the fingers 798 that are formed integral therewith will effect a turning of the cylinder 785 about the shaft 784 on which this cylinder is journalled. When cylinder 785 turns in this manner, a corresponding amount of cleaning material KP is pulled from the supply roll 788 and the same amount is wound up by the take-up roller 789 as follows:

At the extreme outer end of the shaft 795 is a pulley 796 which turns with shaft 795 accordingly as the latter is turned by the ratchet 794. Running around this pulley and about another pulley 801 is a spring belt 800 and it follows that as a turning of pulley 796 causes a turning of the belt 800, the latter will turn the pulley 801. Pulley 801 is carried at one end of a drive shaft 802 that is adapted to rotate the take-up roller 789 counterclockwise as viewed in Fig. 32. So, at the other end of the drive shaft 802 a collar 803 is fixed thereto adjacent one end of the take-up roller 789. Rotatable with the collar 803 are a pair of fingers as 804 which engage slots as 789S formed in the corresponding end of the take-up roller, and in this manner movement of the spring belt 800 is imparted to the take-up roller 789 so that the latter is turned in a step-wise fashion accordingly as and concomitantly with the roller 785.

The take-up roller 789 may be manually turned by a knob 808 fixed at one end of a shaft 807, the other end of the shaft 807 being provided with a collar 805 and fingers as 806 integral therewith by which motion of the shaft 807 will be imparted to the take-up roller. A spring 810S is located concentric to the portion of shaft 807 lying between the frame plate 782 and the corresponding end of the take-up roller, and thus the latter is normally firmly pressed into driving engagement with the flange or finger elements 804.

As shown in Figs. 31 and 32, the guide roller 786, preferably knurled, is journalled at and between the ends of a pair of arms 814 and 815 that are pivotally mounted on a tie bar 813 extended between the frame plates 781 and 782. Springs 815S normally urge the guide roller 786 toward the roller 785 about which the strip of cleaning material KP runs.

From the above it will be seen that both rollers 785 and 789 receive intermittent, direct drives and therefore tend to intermittently pull short lengths of cleaning material KP from the supply roller 788 which, in contrast, is not a driven roller but is simply mounted for free rotative movement in the housing defined by the frame plates 781 and 782. In order, however, that the tension on the strip material KP may be regulated, a means is associated with the feed roller 788 to thus control feeding of the strip KP and such means comprises a brake in the form of a pair of complementary friction discs 821 and 822, Fig. 31.

The brake consisting of the engageable discs 821 and 822 is adapted to control the speed or the ease with which the strip of cleaning material KP is withdrawn from the roller 788, bearing in mind of course that the length of such material thus withdrawn will always depend upon the length of the effective stroke of the pawl 792. In many respects, therefore, the supply and take-up means resemble a wind-and-feed reel assembly in that the strip of cleaning material KP may be attached at either end to the rollers 788 and 789, a direct drive to the latter being effective to pull the strip KP from the lower roller 788. The disc 821 of the brake is normally a rotating or driven member in that it is formed with a hub 835 which is fixed to the outer end of a shaft 820 which turns accordingly as the roller 788 is turned. Thus, integral disc elements are formed at either end of the roller 788 and these discs are slotted so as to receive flanges as 824 and 833 which in turn are formed integral with collars 825 and 832 respectively. The collar 825 is fixed to the shaft 820, and it will be seen that the shaft 820 is adapted to be driven by the roller 788.

The other collar 832 is carried on a shaft 831 one end of which carries a knob 830 by means of which the supply roller 788 can be manually rotated as in the case of the take-up roller 789. Shaft 820 will of course be driven through the roller 788 in this instance also. In effect, therefore, the roller 788 and the associated shafts 820 and 831 may rotate as one member.

A spring 831S normally presses the roller 788 against the fingers 824 associated with the collar 825, and it will be seen that whether the roller 788 be turned manually or by the withdrawn strip KP, shaft 820 will turn with collar 825. Accordingly, disc 821 will turn. The other disc 822 of the brake is stationary so that depending upon the extent to which the complementary surfaces of the discs 821 and 822 engage, the shaft 820 will rotate relatively fast and easy on one hand or relatively slow and hard on the other hand. In order that the amount or area of contact between the engageable discs 821 and 822 may be regulated, disc 821 is carried on a sleeve 827 and this sleeve is threaded on to another sleeve mounted concentric to the shaft 820 and in which the shaft 820 is free to turn. The end of sleeve 827 away from the disc 822 is formed with a nut whereby the disc 822 may be turned toward or away from the fixed disc 821, a lock nut 823 being afforded to prevent rotation of the disc 822. It follows, therefore, that the effectiveness of the brake in retaining the action of the roller 788 may be regulated by adjusting disc 822 relative to disc 821.

Figure 28:
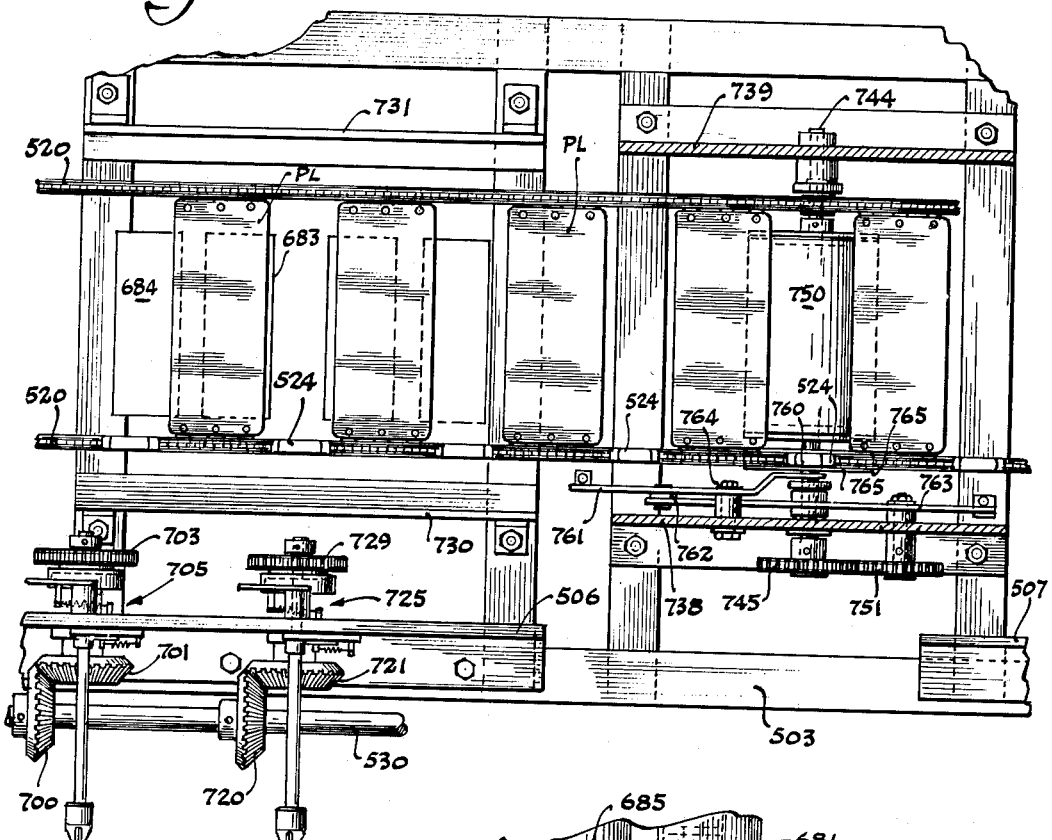
Fig. 28 is a plan view corresponding to Fig. 27 with certain parts shown in Fig. 27 removed.
Figure 29:
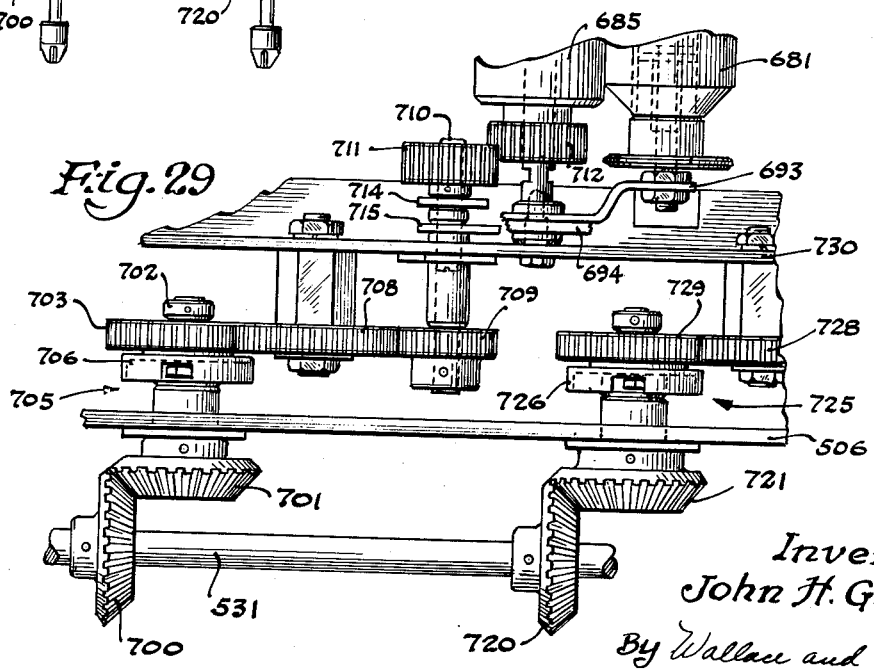
Fig. 29 is a fragmental plan view on an enlarged scale of the means for driving the inking unit shown in Fig. 27 and being stretched out along a horizontal line to more clearly show the arrangement of parts.

Considering then the related operations at the off-set station, the printing station, and the blanket cleaning station, and assuming that spaced-apart images are located on the blanket and that a new printing plate is on the conveyor 520 immediately to the left of the bight between the blanket cylinder 740 and the pressure cylinder 750 as would be the condition illustrated in Fig. 28 wherein the cam roller 760 will have been raised by the cam lug 524 therebeneath, continued movement of the plate conveyor or carriage to the right causes the aforesaid cam lug 524 to pass to the right from beneath the roller 760 whereupon cam 761 is free to pivot clockwise as viewed in Fig. 27, link 766 is drawn down by spring 777, and the impression cylinder 752 is lowered into engagement with the blanket 741. Just as the aforesaid new plate engages the blanket 741 rotating counter-clockwise thereacross as viewed in Fig. 27, an off-set image on the blanket 741 is, at the same time, moved beneath the impression cylinder 752, and the web WP is printed during the time that the aforesaid new plate continues to off-set ink on to the blanket 741 to delineate a new image thereon. On the other hand, downward movement of the link 766 is accompanied by an upward movement of link 790, and this latter action causes the pawl carrier 791 to turn clockwise as viewed in Fig. 27 during which time the pawl 792 exercises no influence on the ratchet 794. Accordingly, it will be seen that during the time a new image is being transferred on to the blanket 741 and printing is being effected at the printing station, the cleaning material remains stationary on the roller 785, a given portion thereof engaging the blanket 741 as shown in Fig. 32. Therefore, a portion of the blanket 741 which normally does not carry an image should be passing beneath the cleaning roller 875 at this time in view of the fact that the strip of cleaning material is stationary at this time, and this of course is preferably the case.

Now, as the aforesaid new printing plate passes to the right from beneath the blanket cylinder 740 toward the plate preservative unit, a new cam lug engages the cam follower 760, link 766 is therefore pressed up against the action of spring 777, and link 790 is concomitantly drawn down as the arm 761 pivots counter-clockwise. Accordingly, the impression cylinder 752 is raised up and away from the blanket cylinder 740, the pawl carrier 791 is rocked counter-clockwise as viewed in Fig. 27, and pawl 792 is effectively or drivingly moved into engagement with the ratchet 794. Effective movement of the pawl 792 is imparted to the shaft 795 whereupon a length of cleaning material corresponding to the length of the effective stroke of the pawl 792 is wound up on roller 789 and withdrawn from roller 788. Thus, assuming that an area on the blanket cylinder 741 previously occupied by an image is being rotated beneath the cylinder or roller 785 at this time, it follows that successively new elemental lengths of material KP will be rubbed over and across such an area to clean any minor amounts of ink that may remain following the printing operation corresponding to such an area. The length of the effective stroke of the pawl 792 will, of course, depend upon the positioning of the shroud plate 793, but in any event will not continue past the lower limit of movement of the link 799 as determined by the counter-clockwise limit position of arm 761.

If desired, an air dryer 850, Figs. 19 and 20, may be located above the inking units and below the blanket cleaning unit in a position adjacent the blanket 741. This dryer may be supplied from the air pump P previously referred to as being adapted to be driven by the motor M-1. The air dryer 850 is adapted to evaporate the last traces of any liquids that may yet remain on the blanket 741 after the action of the cleaning material KP.

Immediately as the lithographic plates emerge from the transfer station, they are carried on the plate conveyor directly to a plate preservative station 870 whereat the printing surface of each plate is coated with a solution of a known type capable of protecting such surfaces during storage of the plates. In the manner of general arrangement and operation, the unit 870 shown in Figs. 19 and 20 is precisely like the preservative unit 310, Fig. 5, previously considered, and therefore it need only be pointed out that a rotating form roller 866 directly contacts the printing surfaces of the plates PL as the same pass therebeneath while carried on the conveyor 520, 520. The preservative solution is relayed from a fountain roller 869 to the form roller 865 by means of a ductor roller 868 which shifts between the fountain roller and a distributor roller 867, the latter engaging the form roller at all times.

The unit 870 is driven through a train of pinion gears 863, 864, and 865. The gear 865 directly drives the form roller, the gear 863 is a driven gear, and gear 864 is an intermediate or transmitting gear. As shown in Fig. 33, the gear 863 is adapted to be driven in a counter-clockwise direction through a clutch 875 and a pair of meshed bevel gears 860 and 861. Gear 860 is fast on the drive shaft 530, and gear 861 is associated with the driving means for a clutch 875 that is associated with this particular plate treating unit. On the other hand, the pinion 863 is associated with the driven means of the clutch 875 so that this preservative unit is driven only when the clutch 875 is engaged. The clutch 875 may be controlled by means including a handle 876 precisely in the same manner as was described in detail in connection with clutch 635.

The plate preservative unit 870 represents the last unit that is adapted to operate directly on the printing plates, since once the printing surfaces of the plates have been protected against storage it is only necessary to "set" such coatings as by a drying treatment. Such drying treatment with heat in the present instance occurs at a plate drying unit generally indicated at 880 in Figs. 19 and 20, and such may include electrical resistance elements or blowers for air from the pump P, or a combination of both that will thereby afford an atmosphere of hot air impinging upon the surfaces of the plates. The conveyor 520, 520 extends through and past the plate dryer 880, and as the printing plates emerge therefrom they are in final condition for storage in a magazine 890, Figs. 36 and 37.

It will be recalled that in connection with the rotary form of the present invention, the printing plates were retracted one-by-one from the plate carriage and then carried by a conveyor to a storage magazine that was lowered step by step in timed relation to such retractions of the printing plates. In the present instance, the use of a positively acting retracting means is not necessary. Thus, since the chains 520 turn at the right hand end of the machine as shown in Fig. 37 to describe a lower horizontal run, such turning of the chains automatically accounts for a withdrawal of the mounting or locating pins 522P from out of the openings as PL–0 which are arranged on either side of the printing plates. Located immediately to the right of the sprockets 521, Fig. 36, and in alignment with the mounting pins 522P are a pair of plate guide members 891 and 892 which are formed into oppositely disposed channels that are arranged to confine and bound the side edges of the printing plates. The plate guides 891 and 892 are supported on the horizontal tie 893 located at the extreme right hand end of the frame of the machine.

Thus, the ends of the channel guide members 891 and 892 which face away from the storage magazine 890 are located in position to receive the leading edge of a printing plate as the mounting pins 522P corresponding thereto are disengaged from the printing plate and turn with the chains 520 about the sprockets 521 and toward their lower run. At the moment the printing plate is thus located on the plate guide members, the plate of course is still being positively driven to the right along the guides 891 and 892 by the remaining four mounting pins 522P which still engage such printing plate in pairs at either side edge. Continued movement of the plate conveyor 520 about the sprockets 521, therefore, results in a feeding of such a printing plate along the aforesaid channel guides, and such feeding continues until the opposite set of pins 522P corresponding to the trailing edge of such a printing plate are withdrawn from the related set of plate mounting openings PL–0 formed therein. The trailing edge of the printing plate thus located on the plate guides 891 and 892 projects toward and is in alignment with the next following plate located on mounting pins on the chain conveyor 520, 520. Therefore, as this next printing plate is automatically stripped from the conveyor, the leading edge thereof will engage the aforesaid trailing edge of the preceding plate and the latter will be forced further along the guides 891 and 892 toward the magazine 890. Such forcing of the preceding printing plate along the plate guides continues so long as the trailing edge thereof continues to be pushed by the leading edge of the following plate.

It is undesirable to have more than two such printing plates located on the plate guides 891 and 892 at any one time since there is present the possibility of jamming. To the end that this may be prevented, a pair of continuously rotating friction discs or wheels 894 and 895 are located within the path of the forwardmost pushed-along printing plate on the plate guides, and the effect of these friction members is to skip this forwardmost plate into the magazine 890. The friction wheels 894 and 895 are, of course, located so as to engage the underside of the forwardmost plate located and being pushed along the guides 891 and 892. These wheels are each fixed to a shaft 896 that is supported in bearing members as 904 and 905 extended from the frame of the machine. As a means for turning the shaft 896, and therefore the wheels 894 and 895, in a clockwise direction as viewed in Fig. 37, two drive belts 897 and 898 are arranged to transmit a drive from the shaft 510 which carries the sprockets 521, 521. Thus, a pair of pulleys 900 and 901 are fixed on a stub shaft 906 that is adapted to turn in the main frame plate 507. A pulley 899 is carried on the shaft 510 so as to be driven therewith, and this pulley is connected to the pulley 900 by the belt 898. So long as the clutch 535 is engaged, therefore, pulley 901 will be driven constantly in a clockwise direction as viewed in Fig. 37. The friction wheels 894 and 895 are driven accordingly by means of the belt 897 which interconnects the pulley 901 with a pulley 902 carried at one end of the shaft 896 to which the friction wheels 894 and 895 are fixed.

As the printing plates are each passed sequentially across the top of the feed discs 894 and 895 and into the storage magazine 890, the latter is lowered automatically by a means including a rotatable screw 910 located slightly forwardly of the magazine 890 and slightly to one side thereof as shown in Figs. 36 and 37. A nut 911 is threaded to the screw 910 and an extension 912 projects rearwardly therefrom to slide on a guide rod 913 extended parallel to the screw 910. A platform 914 for mounting the magazine 890 is secured to the rearward end of the extension 912 on the nut 911, and accordingly the magazine may be lowered by turning screw 910 in the proper direction in nut 911.

In order that the screw may be turned automatically during operation of the machine, a ratchet and pawl assembly, including a ratchet 920 fast on the upper end of the screw 910, is located underneath the shaft 896 which, it will be recalled, is rotated by means including the belt 897 and the pulleys 901 and 902. The pawl 921 is pivotally mounted at the top of the ratchet. A spring, including a known arrangement, normally holds the pawl against the ratchet in operative position. Fixed to shaft 896 is a cam-carrying disc 922 that carries a cam lug 923 adjacent the outside edge thereof. The carrier 922 is so located on the shaft 896 that the cam lug 923 is in position to engage a heel portion on the pawl to urge the pawl into effective engagement with the ratchet 920 with each rotation of the shaft 896. That is, with each rotation of the cam carrier, the cam 923 brushes the heel of the pawl 921 and the pawl and ratchet 920 turn counterclockwise as a unit as viewed in Fig. 36. Accordingly, the screw 910 is turned in the nut 911 and the magazine 890 is lowered.

It will be seen from the foregoing that the present invention affords a lithographic printing machine which is adapted to automatically perform every operation connected with this type of printing without need for manually handling the printing plates, this including the preserving of the plates at the end of a printing operation and the removal of the preservative coating prior to commencing the printing operation. The printing plates are automatically advanced from a supply station and, on the other hand, are automatically fed to storage.

While I have shown and described several embodiments of the present invention, these are capable of variation and modification.

I claim:

1. In a printing machine through which a series of individual printing devices each bearing a lithographically reproducible image may be passed one by one, a printing device carriage for transporting a plurality of spaced printing devices through the machine, a supply magazine adapted to hold a supply of such printing devices, means for withdrawing printing devices one-by-one from the supply magazine and feeding such printing devices to the carriage in succession, driving means operable to drive the printing device carriage at a constant speed in a predetermined direction, the speed of the withdrawing means corresponding to the speed of the carriage, rotating means disposed at respective points along the path of the printing device carriage adapted to clean and moisten the surface of each printing device, rotating means disposed at another point along the path of the printing device carriage and operable to apply ink to the image bearing surface of each printing device after the same has been cleaned and moistened, a rotating blanket disposed at a point along the path of the printing device carriage and defining a transfer station at which the blanket is adapted to make a rolling contact with the image bearing surface of each printing device as such printing device is advanced beyond the inking means by said carriage, a platen means associated with the blanket and defining a printing station at which the platen means may press an advancing sheet to be printed against the blanket to effect ink transfer from such blanket on to such sheet, a blanket cleaning means operating on the blanket between the printing station and the transfer station whereby the blanket may be cleaned after printing is effected and before a new image is off-set on to the blanket, a preservative applying means disposed at a point along the path of the printing device carriage and operable to apply a coating of preservative to each printing device after the same has passed beyond the transfer station, and a collecting magazine in position to receive the printing devices after the same have been operated on by the preservative applying means and removed from the carriage by the withdrawing means.

2. In a printing machine through which a succession of lithographic printing devices may be passed one-by-one, a constantly driven blanket adapted to receive successive off-set images from the printing devices, a platen roller operatively associated with the blanket and affording a printing station, a blanket cleaning unit operatively associated with the blanket to clean the blanket after the same has rotated past the printing station, an endless printing device carriage having a plurality of spaced holders thereon for locating the printing devices in predetermined spaced relation and adapted to advance the printing devices into off-setting relation with respect to the blanket, means for moving the printing devices from a supply magazine on to the carriage and for mounting individual printing devices on the holders, means successively operable for cleaning, moistening, and inking such printing devices as they are carried by the carriage from the mounting means to the blanket, and means for applying a preservative to the printing devices as they advance from the blanket.

3. In a printing machine through which a series of lithographic printing devices may be passed one-by-one while located on a conveyor means, an off-set blanket mounted for constant rotation, a platen means associated with the blanket and defining a printing station, a blanket cleaning unit associated with the blanket and operable to clean the blanket after the printing portions thereof pass the printing station, a supply magazine for the printing devices, means for advancing the printing devices one-by-one from the supply magazine on to the conveyor means, a collecting magazine in which the printing devices may be collected after passing through the machine, means defining a printing device cleaning station at a point along the path of the conveyor means and adapted to clean the printing surfaces of the printing devices, means defining a plate moistening station at a point along the path of the conveyor means and including a constantly driven form roller adapted to engage the printing surface of the printing devices to apply moisture thereto, means defining a printing device inking station at a point along the path of the conveyor means whereat the printing devices are inked subsequent to being moistened and prior to engaging the blanket, and means at a plate preserving station at a point along the path of the conveyor means for applying a coating of preservative to the plates after the images have been off-set from the plates on to the blanket.

4. In a printing machine of the kind described, an endless conveyor for advancing lithographic printing devices one by one through the machine, means on the conveyor to which the printing devices are to be removably mounted, reciprocating feed means for advancing such printing devices in succession on to said mounting means on the conveyor at one point, an off-set blanket cylinder located at a point along the path of the conveyor to rotate in engaging relation across the printing face of each printing device on the conveyor, a series of units arranged along the path of the conveyor on one side of the blanket to respectively clean, moisten, and ink the printing face of each printing device prior to the time that such printing devices engage the blanket, a unit along the path of the conveyor on the other side of the blanket to apply a preservative coating to the printing faces of the printing devices as such printing devices are advanced by the conveyor from engaging relation with respect to the blanket, and a printing device retracting means adapted to remove the printing devices from the conveyor after the same have been coated with preservative and to convey the same to a storage magazine.

5. An off-set lithographic printing machine comprising a plate cylinder having spaced apart holders thereon adapted to maintain a plurality of individual lithographic printing plates in spaced relation thereon, a printing plate feed means located adjacent the path of the plate cylinder and including mechanism to advance the printing devices one-by-one from a supply magazine on to the holders on the plate cylinder in timed sequence to the passage of such holders past the feed means, a plate cleaning means located adjacent the plate cylinder next clockwise from the plate feed means to scrub the plates and expose the printing surfaces thereof for lithographic treatment, a plate moistening unit located adjacent the plate cylinder next clockwise from the plate cleaning means to apply moisture to the non-printing areas of the printing plates, an inking unit located adjacent the plate cylinder next clockwise from the moistening unit to apply ink to the printing areas of the printing plates, a blanket cylinder carrying a blanket which is adapted to rotate over the printing face of each printing plate to receive the inked images on such plates, a platen roller disposed in printing relation with respect to the blanket cylinder and adapted to press copy material against the blanket whereby ink images on the blanket may be transferred on to the copy material, a blanket cleaning unit adapted to continuously clean the surface of the blanket following the transfer of images therefrom on to the copy material, a preservative unit located adjacent the plate cylinder next clockwise from the blanket cylinder and adapted to apply a coating of preservative to the printing plates following the transfer of ink therefrom to the blanket, means located adjacent the plate cylinder next clockwise from the plate preserving unit to pick the preserved printing plate off the plate cylinder, and a conveyor means to convey the thus-retracted and preserved printing plates to a storage magazine.

6. An off-set lithographic printing machine comprising an endless conveyor having a horizontal run for transporting lithographic printing plates from one end of the machine to the other, a plate feed mechanism located adjacent the said one end of the machine to feed lithographic printing plates one-by-one from a supply magazine on the conveyor for transportation through the machine, a plate retracting conveyor at the other end of the machine to advance such printing plates from the endless conveyor to a storage magazine, a blanket cylinder located at an intermediate point along the endless conveyor and mounted for constant rotation directly above the path of the conveyor whereby a blanket on the blanket cylinder may receive successive images from the lithographic printing plates transportable by the endless conveyor past and beneath the blanket cylinder, a platen means operatively associated with the blanket cylinder to press copy material against the blanket to thereby effect printing of the copy material, an intermittently operated blanket cleaning means associated with the blanket cylinder to clean the blanket following printing, a series of printing plate treating units located above the endless conveyor and between the blanket cylinder and plate feed mechanism, the said units being operable to first clean the printing plates and then to moisten the same and finally to ink the same, and a unit adapted to coat the printing plates with a preservative and being located between the blanket cylinder and the plate retracting conveyor.

7. In a printing machine for printing on an endless web comprising a rotatable blanket cylinder and a carriage for advancing spaced-apart printing plates into timed engagement with a blanket mounted on the cylinder, a platen means mounted for intermittent movement toward and away from engagement with the blanket cylinder, means to supply an endless web for printing to the bight between said platen means and blanket cylinder, an intermittently operable blanket cleaning means for wiping residual ink from the surface of the blanket, and means to operate the platen means and blanket cleaning means synchronously in timed relation to the rotation of the blanket cylinder so that said web is intermittently pressed against said blanket and said cleaning means is caused to intermittently wipe those portions of the blanket cylinder containing an off-set image.

8. In a printing machine comprising a rotatable blanket cylinder and a carriage for advancing spaced-apart printing plates into timed engagement with a blanket adapted to be mounted on the cylinder, a platen means mounted for movement toward and away from the blanket cylinder, a blanket cleaning means for removing residual ink from the surface of the blanket, and means to operate the platen means and blanket cleaning means in timed relation to the rotation of the blanket cylinder, the last-named means including spaced-apart cam lugs on the carriage, a cam follower for the cam lugs, and a driving connection between the cam follower and the platen means on one hand and the cam follower and the cleaning means on the other.

9. In a printing machine for printing on an endless web comprising a printing member operable to present images to be printed on said web and a platen means movable toward said printing member to a printing position to press portion of said web to be printed against the printing member accordingly as successive images are presented to said web, an intermittently operable cleaning means operable to wipe areas of the printing member occupied by said images after the same have been printed, and a control means for intermittently lowering the platen means from a raised position to said printing position and for intermittently operating the cleaning means automatically in timer synchronous relation to the platen means so that said web is intermittently pressed against said printing member to be printed and said cleaning means is operable to wipe those portions of the printing member having an off-set image.

10. In a printing machine comprising a printing member operable to present images to be printed on copy material and a platen means movable toward said printing member to a printing position to press the copy material against the printing member accordingly as successive images are presented to the copy material, a cleaning means operable to clean the areas of the printing member occupied by said images after the same are printed, and a control means for intermittently lowering the platen means from a raised position to said printing position and for intermittently operating the cleaning means in timed relation to the platen means, said control means including an element periodically shiftable from one position to another and then back in timed relation to the speed of the printing member, and means for respectively transmitting the motion of the shiftable element to the platen means and to the cleaning means.

11. In a printing machine having a carriage for removably mounting individual printing plates in spaced relation thereon, and in which machine said plates are to be sequentially mounted on and removed from said carriage, a plurality of spaced apart holders on said carriage to locate and position the printing plates, a supply station adjacent said carriage for maintaining a supply of printing plates to be located on the carriage, feed means to advance said plates one-by-one from the supply station on to said holders, a storage station adjacent said carriage for receiving used printing plates, a pivotally mounted finger-like plate retractor having one end normally freely engaging the outer surface of the carriage in position to lift the leading edge of a used printing plate outwardly away from holders on said carriage, a rotatable disc associated with said retractor to engage the upper face of and advance the thus-retracted used plate along the top of said retractor, and a conveyor for receiving the thus-retracted used plate to convey the same to said storage station, said carriage having recesses in the outer surface thereof adapted to underlie the leading end of each such printing plate mounted on said holders and sufficiently in advance of said leading ends of such printing plates as to assure that said retractor is well below the leading end of a printing plate to be retracted.

12. In a printing machine of the type wherein lithographic printing plates each bearing a lithographically reproducible image are advanced one-by-one during successive printing runs forwardly along a path extended from a supply station for the plates to a storage station for the plates, means along said path to apply a preservative coating to the printing face of each plate after said plate has been used in one run for effecting reproduction of the image carried thereby and before the plate is advanced to said storage station, and means along said path effective to remove, from the printing surfaces of the printing plates, during the next printing run the preservative coating applied thereto during the previous printing run, the last-named means being operative on the plates before the same are used to effect printing in said next printing run.

13. In a printing machine of the type wherein lithographic printing plates each bearing a lithographically reproducible image are advanced one-by-one during successive printing runs forwardly along path extended from a supply station for the printing plates to a storage station for the printing plates, a fountain in the machine adapted to hold a preservative solution to be applied to the image-carrying surface of each printing plate before storage thereof and after said plates have been used for printing, means operative to relay preservative from said fountain to the image bearing surfaces of said plates, another fountain in the machine adapted to hold a solution which is effective to remove said preservative from the printing plates after the preservative has been applied thereto, and means operative to apply the second-named solution to the printing plates.

14. In a printing machine of the type wherein lithographic printing plates each bearing a lithographically reproducible image are advanced one-by-one by a conveyor during a printing run past a station whereat the plates cooperate with other means in the machine to effect reproduction of the images carried by the plates, means in the machine to apply a preservative coating to the image-carrying surface of each of said plates following the passage of said plates past the first-named means, said preservative-applying means including a reservoir for maintaining a supply of preservative, and means for engaging the image-carrying surface of each plate to apply preservative thereto, another conveyor leading from the first-named conveyor to a storage station whereat the plates may be stored one-by-one following the treatment of the plates with preservative, means to effect transfer of the printing plates from one conveyor to the other, a supply station in position to locate a supply of printing plates to be used for printing adjacent the first-named conveyor, means to advance printing plates sequentially one-by-one from said supply station on to the first-named conveyor, and means in the machine to apply a solvent for said preservative to the image-carrying surface of each of the plates prior to subjecting the plates to said other means for effecting reproduction of the images carried by the plates.

15. In a printing machine of the type wherein individual printing plates are positioned one-by-one in spaced relation on accurately spaced holders provided on a main conveyor for transporting the plates through the machine, a supply station for printing plates to be used adjacent one end of said conveyor and a storage station for used printing plates adjacent the other end of said conveyor, plate advancing means for advancing printing plates one-by-one from said supply station accurately on to the respective holders on said conveyor, another conveyor in position to transport used printing plates retracted from said main conveyor to said storage station, transfer means to transport such retracted printing plates from said main conveyor to said other conveyor, and means to drive said conveyors, said plate advancing means, and said transfer means synchronously in accurately timed sequence whereby printing plates may be continuously and accurately advanced to and transferred from the holders on said main conveyor.

16. A lithographic printing machine comprising a rotatable plate cylinder on which a plurality of individual printing plates having openings therein may be located in determined spaced relation to one another on accurately spaced pins provided on the plate cylinders that are adapted to project through said openings, means for so locating said printing plates on said plate cylinder, means for applying a coating of preservative to the image-carrying surface of each of the printing plates after said plates effect image reproduction, a conveyor for transporting printing plates which have been coated with preservative from the plate cylinder to a storage station, and a retractor mechanism for removing preserved printing plate from the pins on said plate cylinder and locating the same on said conveyor, said retractor mechanism including a blade-like element having an end normally engaging the surface of said cylinder to intercept the leading edges of the printing plate mounted thereon whereby continued rotation of said plate away from said pins and cylinder forces a thus-intercepted printing plate along said blade-like element, said blade-like element being aligned substantially with the run of said conveyor whereby a printing plate removed from the pins on said plate cylinder by the cooperation between the blade-like element and the movement of the cylinder may be advanced along the top side of said blade-like element and on to said conveyor, and means for advancing printing plates along said blade-like element to said conveyor, said cylinder being provided with recesses adapted to underlie the leading end of each such printing plate on the cylinder and sufficiently in advance of such leading edge to assure that said blade-like element is well below the leading end of a printing plate to be retracted from said plate cylinder.

17. A lithographic printing machine comprising a rotatable plate cylinder on which a plurality of individual printing plates having openings therein may be located in determined spaced relation to one another on accurately spaced pins provided on the plate cylinder that are adapted to project through said openings, feed means for advancing said plates one-by-one from a supply station on to said plate cylinder, means in the machine to cooperate with said printing plates to effect reproduction of the images carried thereby, means for applying a coating of preservative to the image-carrying surface of each of the printing plates after said plates effect image reproduction, a conveyor for transporting printing plates which have been coated with preservative from the plate cylinder to a storage station, a retractor mechanism for removing preserved printing plates from said plate cylinder and locating the same on said conveyor, said retractor mechanism including a blade-like element having an end normally engaging the surface of said cylinder to intercept the leading edges of the printing plates mounted thereon and being advanced from the means for applying preservative thereto whereby continued rotation of said plate cylinder forces a thus-intercepted printing plate away from said pins on said plate cylinder in a direction along said blade-like element, said blade-like element being aligned substantially with the run of said conveyor whereby a printing plate removed from the pins on said plate cylinder may be advanced along the top side of said blade-like element and on to said conveyor, means for advancing printing plates along said blade-like element to said conveyor, and means for driving said plate cylinder, said feed means, and said conveyor at the same speed, said cylinder being provided with recesses adapted to underlie the leading edge of each such printing plate on the cylinder and sufficiently in advance such leading edge to assure that said blade-like element is well below the leading end of a printing plate to be retracted from said plate cylinder.

18. A lithographic printing machine comprising an endless conveyor having a horizontal run for transporting individual printing plates one-by-one past a rotatable off-set blanket adapted to engage each of the printing plates, a constantly rotating moistening unit and a constantly rotating inking unit on one side of said blanket in position to treat, lithographically, each of said printing plates before the same are passed to said blanket, a preservative unit on the other side of said blanket including means for maintaining a supply of material adapted to preserve the image-carrying surface of each of said plates and also including a constantly rotating roller for engaging each of said plates to apply said preservative thereto, a storage magazine at one end of the machine whereat said plates may be stored in a preserved condition, means for transporting preserved plates from said endless conveyor to said storage magazine, feed means at the other end of the machine for advancing printing plates in a preserved condition one-by-one on to the endless conveyor, a unit in the machine located between said feed means and said moistening unit to apply to each of said plates a solvent for said preservative, and a main drive shaft extended from one end of the machine to the other and adapted for driving the endless conveyor, each of said units, the blanket, the feed means, and said means for transporting preserved plates from the endless conveyor to the storage magazine.

19. In a lithographic printing machine including means to effect reproduction of images carried by individual lithographic printing plates during a printing run, a preservative applying means located in the machine to apply a coating of preservative liquid to the image-carrying surface of said plates subsequent to the operation of the first-named means on said plates, a preservative removing means located in the machine to apply a solvent to said plates to remove preservative applied to said plates during a prior printing run, said preservative removing means being operable on said plates in advance of the first-named means, and means in the machine operable to apply lithographing liquids to the printing surfaces of said plates, the last-named means being located between said preservative removing means and the first-named means.

20. A lithographic printing machine according to claim 19 in which all of said means are arranged in tandem along a horizontal line along which said lithographic printing plates may be advanced, a main drive shaft extended from one end of the machine to the other, each of said means being driven from said main drive shaft, and a clutch for said main drive shaft whereby the drive to each of said means may be interrupted simultaneously.

References Cited in the file of this patent

UNITED STATES PATENTS

| Number | Name | Date |
|---|---|---|
| 1,270,351 | White | June 25, 1918 |
| 1,574,570 | Goulding | Feb. 23, 1926 |
| 1,576,598 | Goulding | Mar. 16, 1926 |
| 2,033,383 | Marchev | Mar. 10, 1936 |
| 2,163,492 | Kelly | June 20, 1939 |
| 2,359,851 | Hueber | Oct. 10, 1944 |
| 2,511,921 | Keuper | June 20, 1950 |
| 2,525,982 | Wescott | Oct. 17, 1950 |
| 2,542,073 | Aberle | Feb. 20, 1951 |
| 2,572,450 | Crissy | Oct. 23, 1951 |